(12) United States Patent
Gauger et al.

(10) Patent No.: US 11,798,343 B2
(45) Date of Patent: Oct. 24, 2023

(54) AUTOMATIC FOOD PREPARATION LINE

(71) Applicant: A. J. ANTUNES & CO., Carol Stream, IL (US)

(72) Inventors: Steve Gauger, Crystal Lake, IL (US); Bhupendra Patel, Carol Stream, IL (US); Joe Carone, Darien, IL (US); Chad Elliott, Naperville, IL (US); Robert Jonelis, Crystal Lake, IL (US)

(73) Assignee: A. J. ANTUNES & CO., Carol Stream, IL (US)

( * ) Notice: Subject to any disclaimer, the term of this patent is extended or adjusted under 35 U.S.C. 154(b) by 539 days.

(21) Appl. No.: 16/872,291

(22) Filed: May 11, 2020

(65) Prior Publication Data

US 2020/0357220 A1    Nov. 12, 2020

Related U.S. Application Data

(60) Provisional application No. 62/845,349, filed on May 9, 2019.

(51) Int. Cl.
*A47J 37/08* (2006.01)
*G07F 17/00* (2006.01)
(Continued)

(52) U.S. Cl.
CPC ............ *G07F 11/58* (2013.01); *A21C 15/002* (2013.01); *A23P 20/20* (2016.08); *A47J 37/0864* (2013.01);
(Continued)

(58) Field of Classification Search
CPC .... A47J 44/00; A47J 2201/00; A47J 37/0964; G07F 17/0064; G07F 17/0078; A21C 15/002; A23P 20/20
See application file for complete search history.

(56) References Cited

U.S. PATENT DOCUMENTS

| | | | | |
|---|---|---|---|---|
| 3,859,904 A | * | 1/1975 | Carriazo | ................. G07F 9/105 99/450.7 |
| 4,944,218 A | * | 7/1990 | Cresson | .............. G07F 17/0078 99/356 |

(Continued)

*Primary Examiner* — Timothy R Waggoner
(74) *Attorney, Agent, or Firm* — LAW OFFICES OF STEVEN W. WEINRIEB

(57) ABSTRACT

An automatic food preparation line for automatically preparing bread products for making sandwiches or burgers comprises an automatic bread product handling system containing a plurality of different types of bread products, an automatic toaster appliance for toasting the bread products, an automatic packaging system for automatically dispensing both box and wrapping paper packaging, an automatic sauce dispensing system for dispensing a plurality of different sauces onto the bread product, an automatic non-sauce condiment dispensing system for dispensing one or more different condiments onto the bread product, and an automatic conveyor system for conveying the bread product between the various systems. The entire automatic food preparation line is under the control of a suitable computer, such as, for example, a programmable logic controller (PLC), and a patron may select the type of bread product, the type of sauce, and the type of non-sauce condiment by inputting such selections into a user interface (UI) located at a point-of-sale (POS) location.

18 Claims, 40 Drawing Sheets

(51) Int. Cl.
   *G07F 11/58*     (2006.01)
   *A23P 20/20*     (2016.01)
   *B65B 25/00*     (2006.01)
   *B65B 43/18*     (2006.01)
   *A21C 15/00*     (2006.01)

(52) U.S. Cl.
   CPC ............ *B65B 25/001* (2013.01); *B65B 43/18* (2013.01); *G07F 17/0078* (2013.01)

(56) References Cited

U.S. PATENT DOCUMENTS

| | | | | |
|---|---|---|---|---|
| 5,113,753 | A * | 5/1992 | Robinson | A47J 37/045 |
| | | | | 99/357 |
| 5,540,943 | A * | 7/1996 | Naramura | A21C 9/04 |
| | | | | 426/231 |
| 11,185,105 | B2 * | 11/2021 | Cohen | B26D 3/28 |
| 11,357,254 | B2 * | 6/2022 | Saccone, Jr. | B26D 7/27 |
| 2009/0241481 | A1 * | 10/2009 | Sus | G06Q 50/12 |
| | | | | 53/391 |
| 2012/0185086 | A1 * | 7/2012 | Khatchadourian | G07F 11/70 |
| | | | | 99/345 |
| 2017/0280763 | A1 * | 10/2017 | Nazarian | A21C 9/04 |
| 2020/0000284 | A1 * | 1/2020 | Frio | G07F 11/70 |

* cited by examiner

AUTOMATIC FOOD PREPARATION LINE

CROSS-REFERENCE TO RELATED PATENT APPLICATION

This patent application is a non-provisional conversion of U.S. Provisional Patent Application No. 62/845,349 which was filed on May 9, 2019, the priority benefits of which are hereby claimed.

FIELD OF THE INVENTION

The present invention relates generally to food service equipment, and more particularly to a new and improved automatic food preparation line which is to be utilized in restaurants, particularly fast-food restaurants, in order to quickly and accurately prepare food products, such as, for example, conventional hamburger sandwiches which require two buns, Big Mac® sandwiches which require three buns, in accordance with specific patron orders which may also include various different sauces, condiments, and packaging, as well as other sandwich food items.

BACKGROUND OF THE INVENTION

Conventionally, when preparing specific food orders, particularly in a fast-food restaurant, food preparation personnel must infeed the food products to be cooked, toasted, or the like, in an individual or one-by-one manner into the particular cooking or toasting appliance, and in a similar manner, must likewise remove the food products in an individual or one-by-one manner from the particular cooking or toasting appliance. In addition, each food product may need to have various different sauces or condiments applied thereto, as well as packaged within particular types of packaging, such as, for example, different sized paper packaging, or different box packaging for the various different food items. Obviously, such food preparation, cooking, toasting, condiment and sauce application, and packaging selection procedures, are very inefficient, time consuming, and labor intensive, particularly for fast-food restaurants wherein quick or rapid cooking or toasting food preparation times are required or desirable in order to produce the cooked or toasted food products within relatively short service times which effectively define one of the more important and attractive features or characteristics of fast-food establishments.

A need therefore exists in the art for a new and improved piece of food service equipment. An additional need exists in the art for a new and improved piece of food service equipment which is adapted to prepare specific food items through a complete food preparation process. A still additional need exists in the art for a new and improved piece of food service equipment which is adapted to prepare specific food items through a complete food preparation process which would include, for example, the selection of a specific type of bread or bun for a particular food item as desired, the toasting of such specific type of bread or bun for the particular food item as desired, the selection of specific packaging for a particular food item as necessary, and the selection of specific condiments and/or sauces to be applied to the particular food item. A yet additional need exists in the art for a new and improved piece of food service equipment which can be utilized in various different food establishments. A still yet additional need exists in the art for a new and improved piece of food service equipment which can be utilized in various different food establishments, such as, for example, fast food restaurants. A further need exists in the art for a new and improved piece of food service equipment which can be utilized in various different food establishments, such as, for example, fast food restaurants, wherein quick turnaround time for cooking or preparing food item orders is a highly sought-after feature or characteristic. A still further need exists in the art for a new and improved piece of food service equipment which can be utilized in various different food establishments, such as, for example, fast food restaurants, wherein the equipment is relatively compact and yet efficient in providing the food products prepared in accordance with a patron's particular specifications.

A yet further need exists in the art for a new and improved piece of food service equipment which can be utilized in various different food establishments, such as, for example, fast food restaurants, wherein the appliance is relatively compact, efficient in providing the cooked food products prepared in accordance with a patron's particular specifications, and can be operated by means of a minimum number of food preparation personnel. A still yet further need exists in the art for a new and improved piece of food service equipment which can be utilized in various different food establishments, such as, for example, fast food restaurants, wherein the equipment is relative compact, efficient in providing the cooked food products prepared in accordance with a patron's particular specifications, can be easily operated by means of a minimum number of food preparation personnel, and can be utilized to prepare, cook, or toast numerous food items simultaneously as opposed to being constrained to prepare or process the food items singly, or in a one-by-one fashion. A yet still further need exists in the art for a new and improved piece of food service equipment which can be utilized in various different food establishments, such as, for example, fast food restaurants, wherein numerous food item components can effectively be pre-loaded into the equipment, particularly during lull or relatively slow business hours or times, such that the plurality of food items will then be substantially immediately available for order processing as orders are inputted into the system for patrons at a "point-of-sale" (POS) location as opposed to the food items being constrained to being prepared singly, or in a one-by-one fashion. A last need exists in the art for a new and improved piece of food service equipment wherein the various principal components of the system, such as, for example, the bun handling system, the food packaging system, the sauce dispensing system, and the condiment dispensing system, comprise modular components which may be operatively connected together in order to effectively form an automated operational system as may be desired or required in accordance with spatial or financial constraints.

OVERALL OBJECTIVES OF THE PRESENT INVENTION

Accordingly, a primary objective of the present invention is to provide a new and improved piece of food service equipment. An additional objective of the present invention is to provide a new and improved piece of food service equipment which is adapted to prepare specific food items through a complete food preparation process. A still additional objective of the present invention is to provide a new and improved piece of food service equipment which is adapted to prepare specific food items through a complete food preparation process which would include, for example, the selection of a specific type of bread or bun for a particular food item as desired, the toasting of such specific type of bread or bun for the particular food item as desired, the selection of specific packaging for a particular food item as necessary, and the selection of specific condiments and/or sauces to be applied to the particular food item. A yet additional objective of the present invention is to provide a new and improved piece of food service equipment which can be utilized in various different food establishments. A still yet additional objective of the present invention is to provide a new and improved piece of food service equipment which can be utilized in various different food establishments, such as, for example, fast food restaurants. A further objective of the present invention is to provide a new and improved piece of food service equipment which can be utilized in various different food establishments, such as, for example, fast food restaurants, wherein quick turnaround time for cooking or preparing food item orders is a highly sought-after feature or characteristic. A still further objective of the present invention is to provide a new and piece of improved food service equipment which can be utilized in various different food establishments, such as, for example, fast food restaurants, wherein the equipment is relatively compact and yet efficient in providing the food products prepared in accordance with a patron's particular specifications.

A yet further objective of the present invention is to provide a new and improved piece of food service equipment which can be utilized in various different food establishments, such as, for example, fast food restaurants, wherein the appliance is relatively compact, efficient in providing the cooked food products prepared in accordance with a patron's particular specifications, and can be operated by means of a minimum number of food preparation personnel. A still yet further objective of the present invention is to provide a new and improved piece of food service equipment which can be utilized in various different food establishments, such as, for example, fast food restaurants, wherein the equipment is relative compact, efficient in providing the cooked food products prepared in accordance with a patron's particular specifications, can be easily operated by means of a minimum number of food preparation personnel, and can be utilized to prepare, cook, or toast numerous food items simultaneously as opposed to being constrained to process or prepare the food items singly, or in a one-by-one fashion. A yet still further objective of the present invention is to provide a new and improved piece of food service equipment which can be utilized in various different food establishments, such as, for example, fast food restaurants, wherein numerous food item components can effectively be pre-loaded into the equipment, particularly during lull or relatively slow business hours or times, such that the plurality of food items will then be substantially immediately available for order processing as orders are inputted into the system for patrons at a "point-of-sale" (POS) location as opposed to the food items being constrained to being prepared singly, or in a one-by-one fashion. A last objective of the present invention is to provide a new and improved piece of food service equipment wherein the various principal components of the system, such as, for example, the bun handling system, the food packaging system, the sauce dispensing system, and the condiment dispensing system, comprise modular components which may be operatively connected together in order to effectively form an automated operational system as may be desired or required in accordance with spatial or financial constraints.

SUMMARY OF THE INVENTION

The foregoing and other objectives are achieved in accordance with the teachings and principles of the present invention through the provision of a new and improved automatic food preparation line which comprises a bun handling system, which is disposed in conjunction with bun toasting equipment, for preparing sandwich buns or similar food products wherein, in lieu of food preparation personnel having to handle multiple food item components in an individual or one-by-one manner, such as, for example, two or three buns depending upon the particular type of end food product being prepared, the bun handling system of the present invention comprises a system that enables multiple food item components to be inserted into the bun handling system in a pre-loaded manner, the particular food item components to be subsequently dispensed in accordance with particular specifications selected by a patron at a point-of-sale (POS) location, and inserted into suitable toasting equipment. In addition, the automatic food preparation line also includes other food equipment systems or assemblies which perform various additional operations in order to efficiently and accurately produce numerous food items in accordance with patrons' orders. For example, one of the other food equipment systems or assemblies may comprise an automatic packaging dispensing system wherein the system is adapted to dispense either packaging boxes or wrapping paper packaging, again depending upon the particular food item to be packaged. Still further, another one of the other food equipment systems or assemblies may comprise an automatic sauce dispensing system wherein the system is adapted to dispense different sauces or sauce-type condiments, such as, for example, mustard, ketchup, mayonnaise, and the like, onto the food item in accordance with a particular patron's order. Still yet further, another one of the other food equipment systems or assemblies may comprise an automatic condiment dispensing system wherein the system is adapted to dispense different non-sauce condiments, such as, for example, shredded lettuce, shredded onions, shredded cheese, and the like, onto the food item in accordance with a particular patron's order. It is lastly noted that all automatic operational systems of the overall automatic food preparation line are under the control of a programmable logic controller (PLC) or some other similar central control unit or system, and that a user interface (UI) may be located at the point-of-sale (PO) location whereby a patron may input the specific particulars of his or her food item order including, for example, the type of bun for the sandwich, hamburger, or Big Mace, the particular sauce condiments, and/or the particular non-sauce condiments.

BRIEF DESCRIPTIONS OF THE DRAWINGS

Various other features and attendant advantages of the present invention will be more fully appreciated from the following detailed description when considered in connection with the accompanying drawings in which like reference characters designate like or corresponding parts throughout the several views, and wherein.

Figure 4:
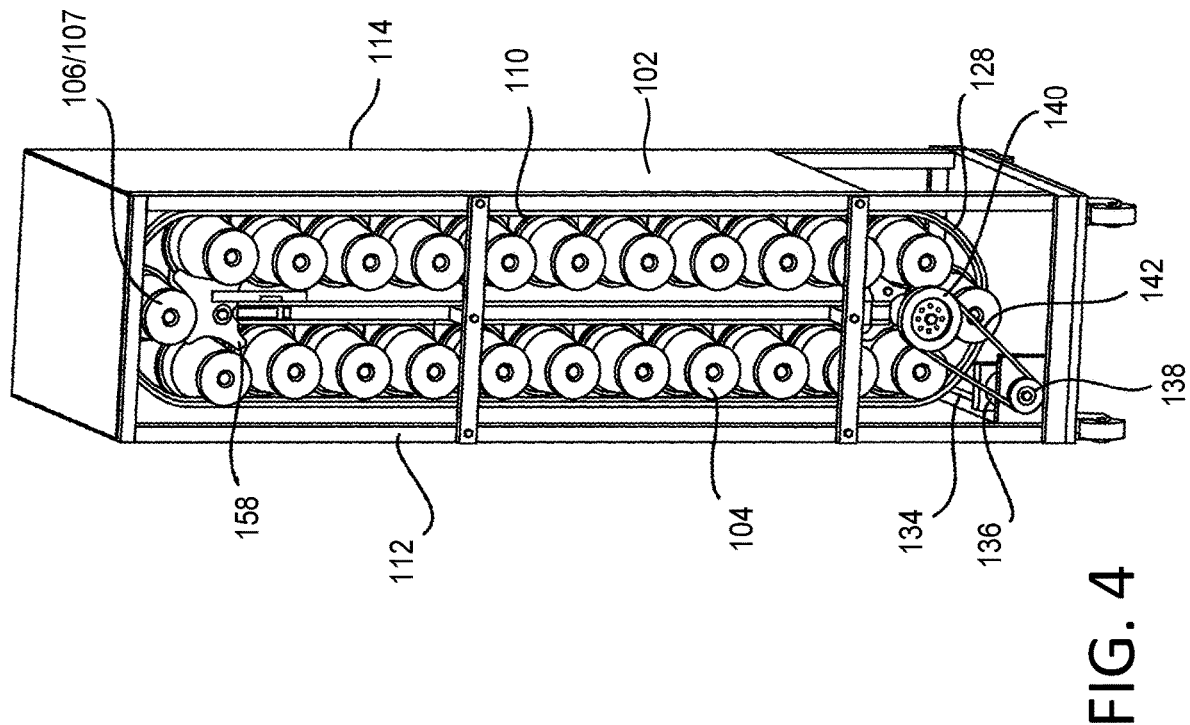
FIG. 4 is a front, right side, top perspective view of one of the cabinets housing one of the vertically oriented carousel or endless conveyor mechanisms of the new and improved automated bun feeding system as disclosed within FIGS. 1 and 2.
Figure 5:
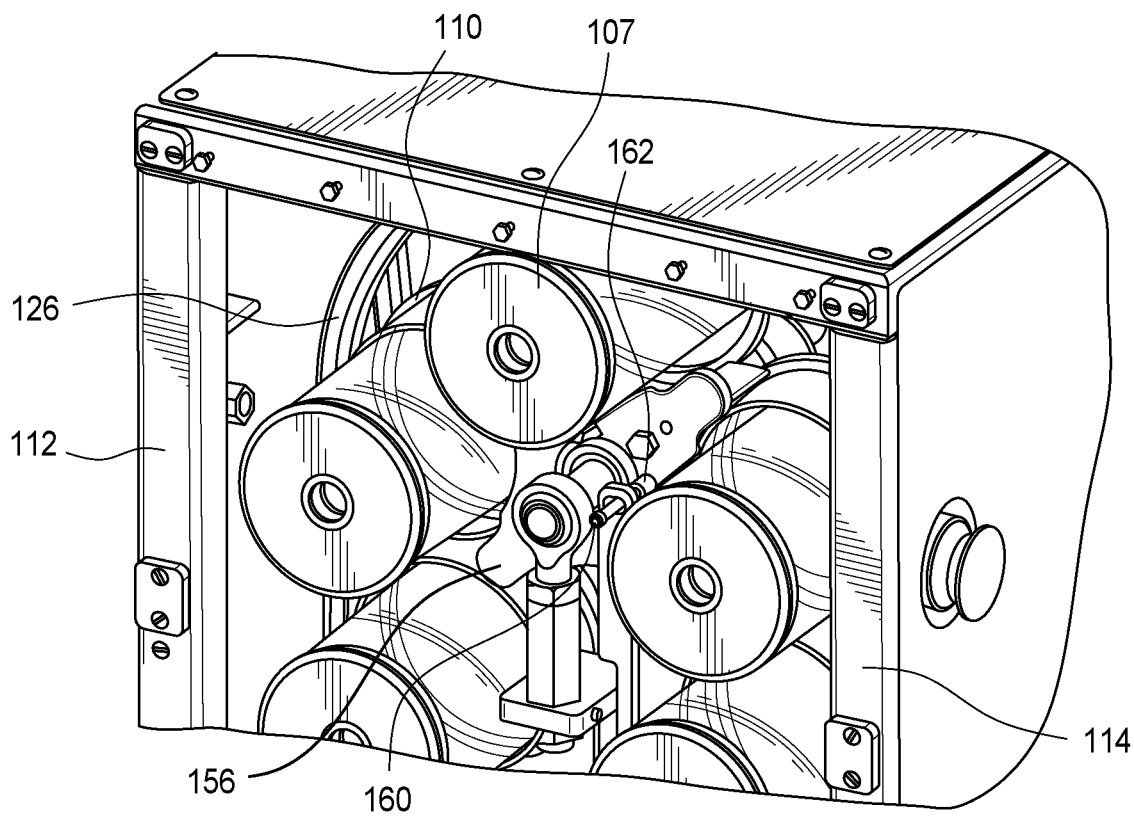
Figure 6:
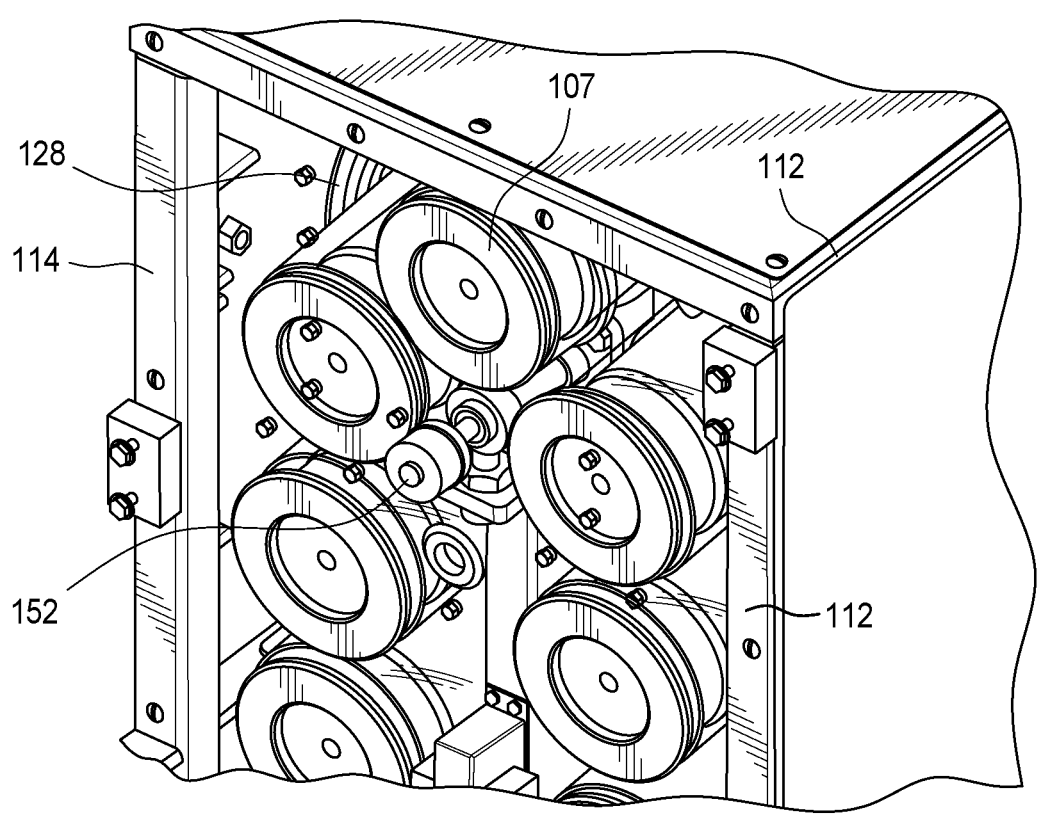
Figure 7:
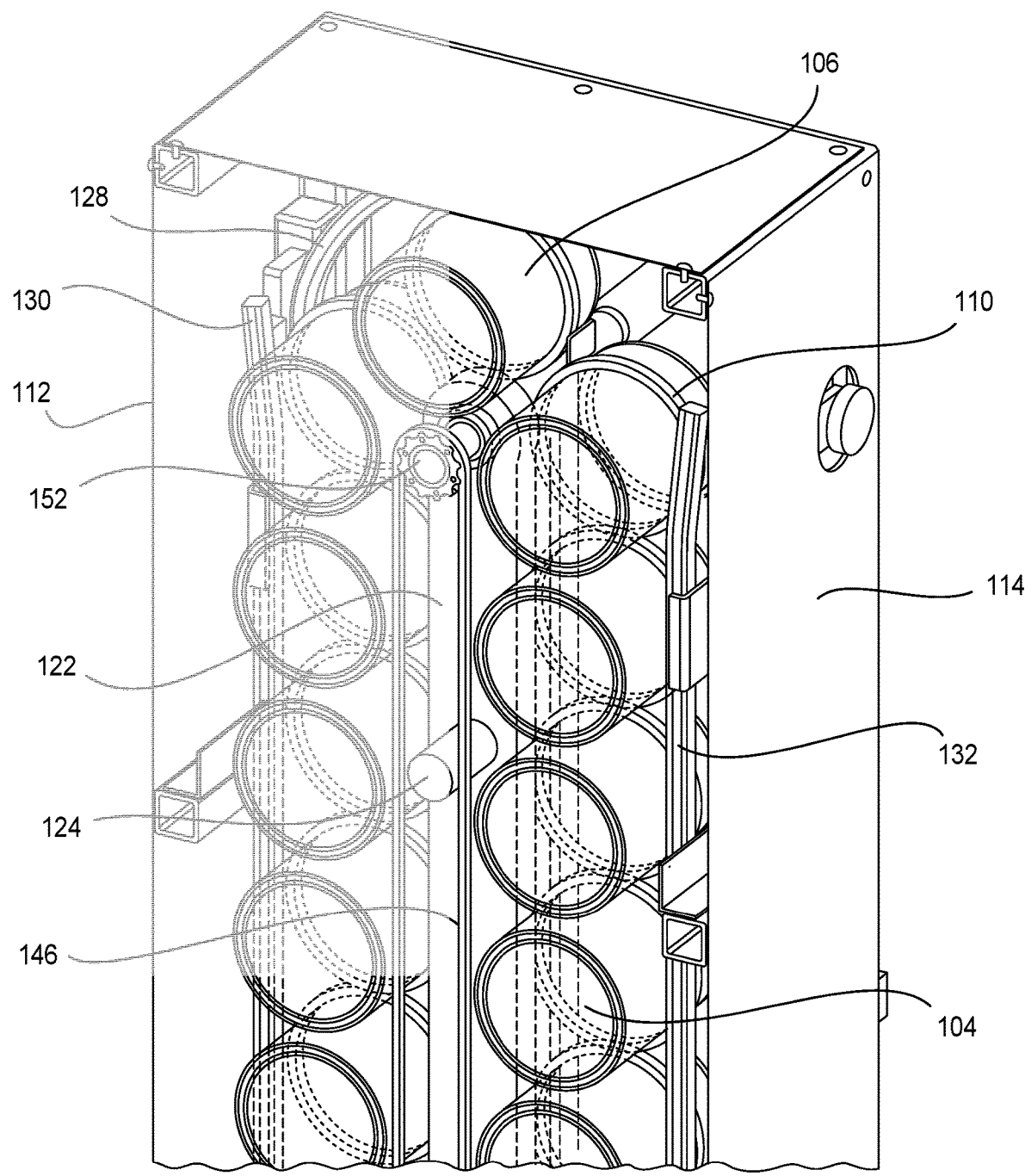
Figure 8:
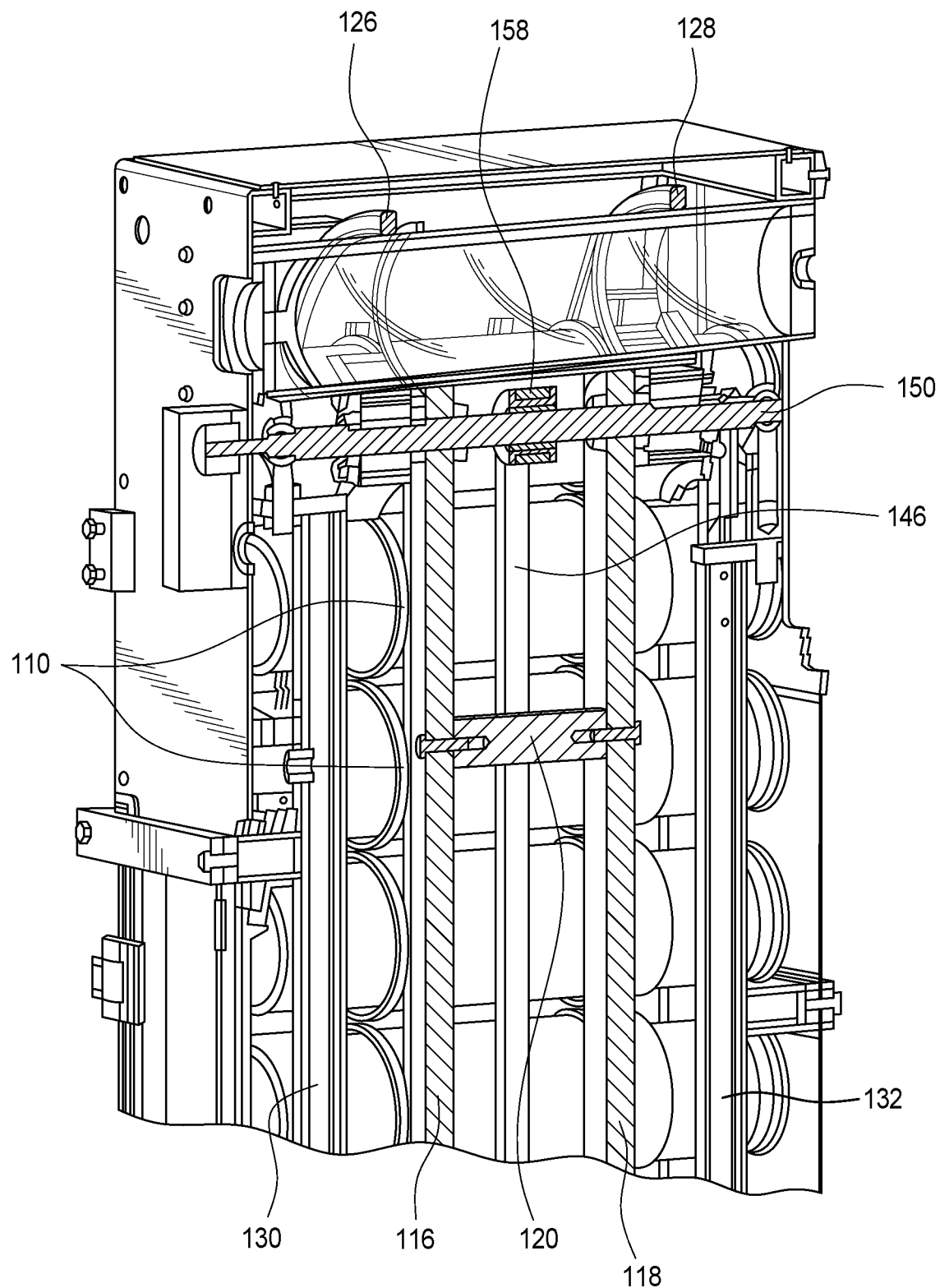
Figure 9:
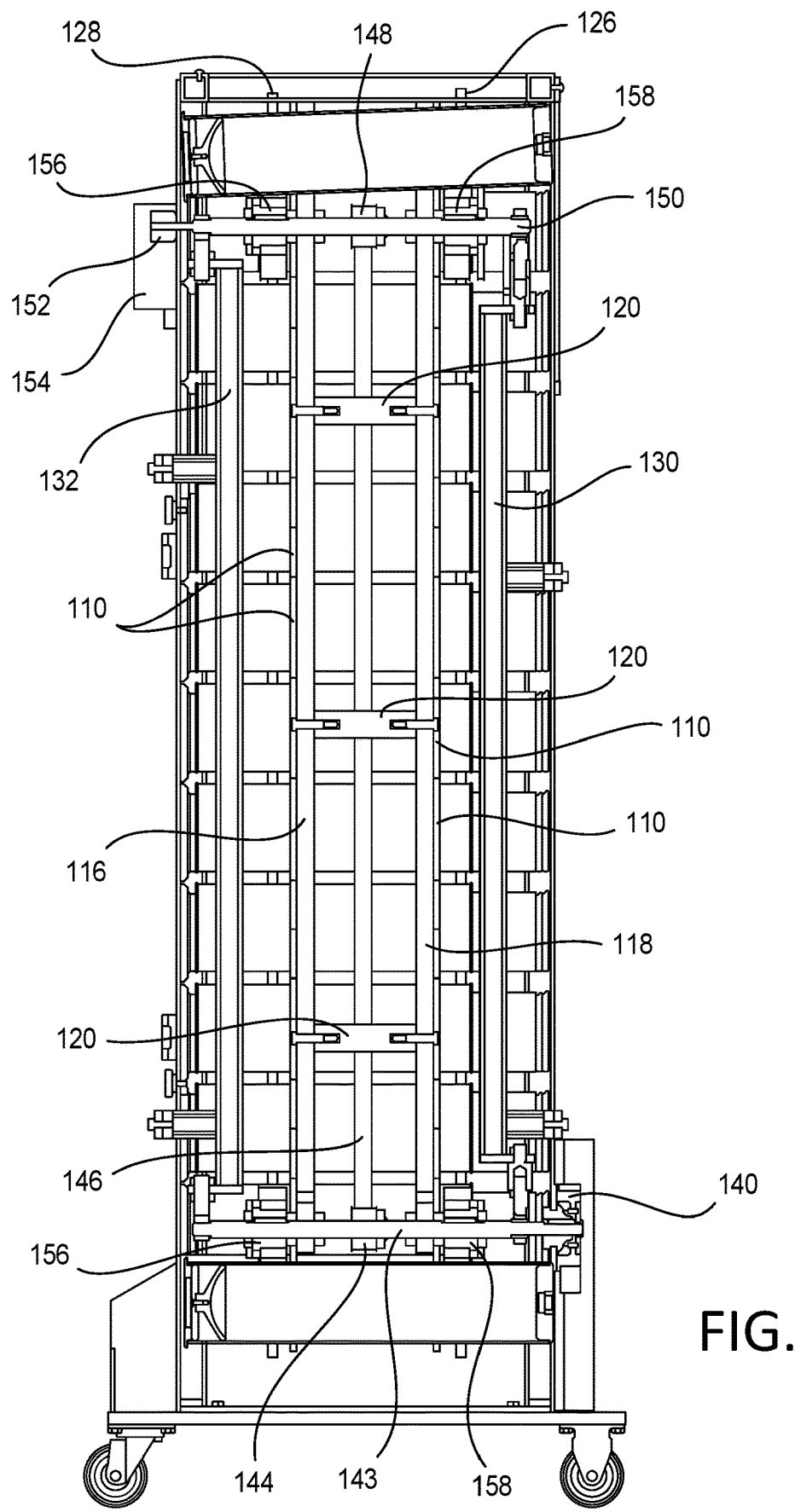
Figure 10:
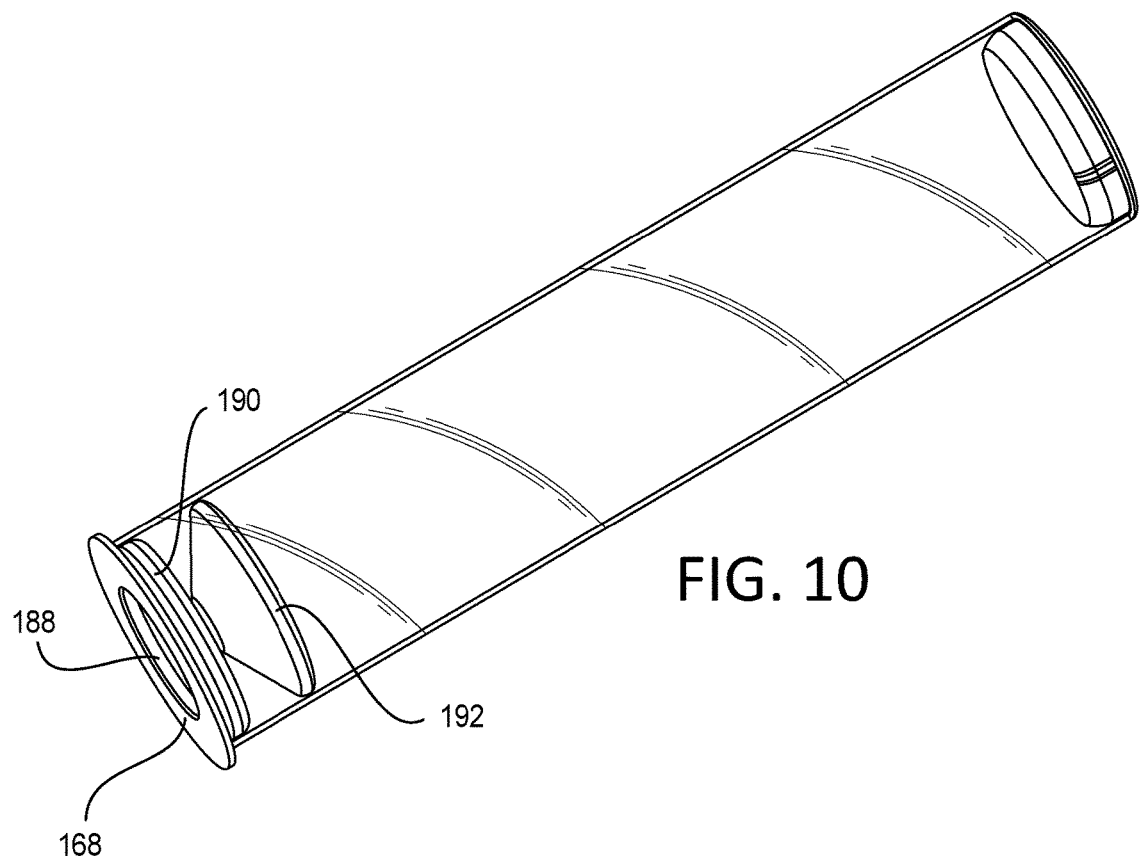
Figure 11:
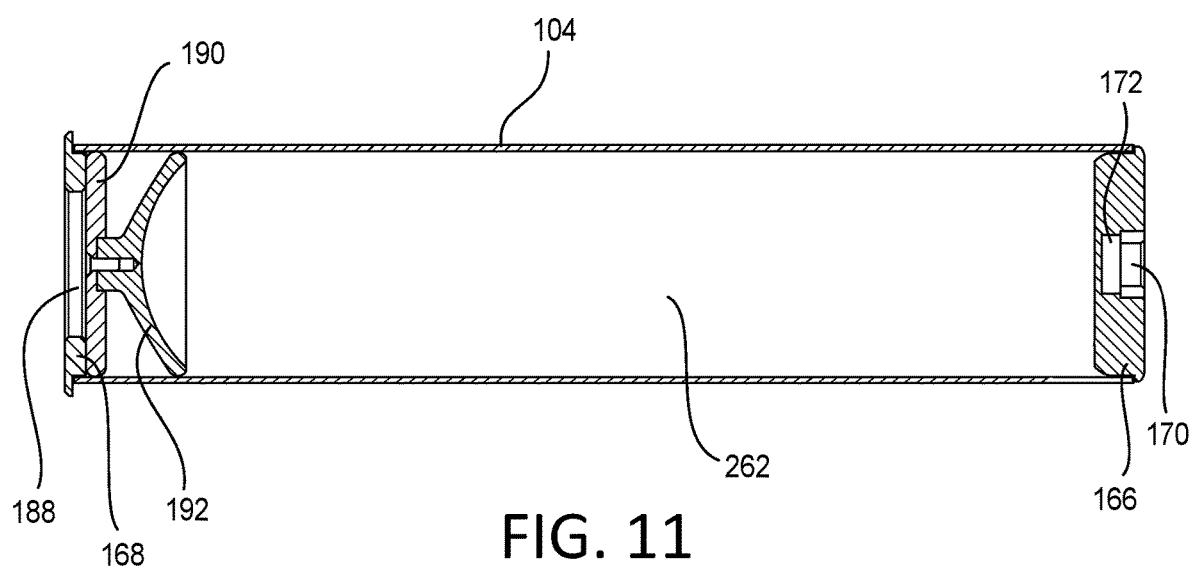
Figure 14:
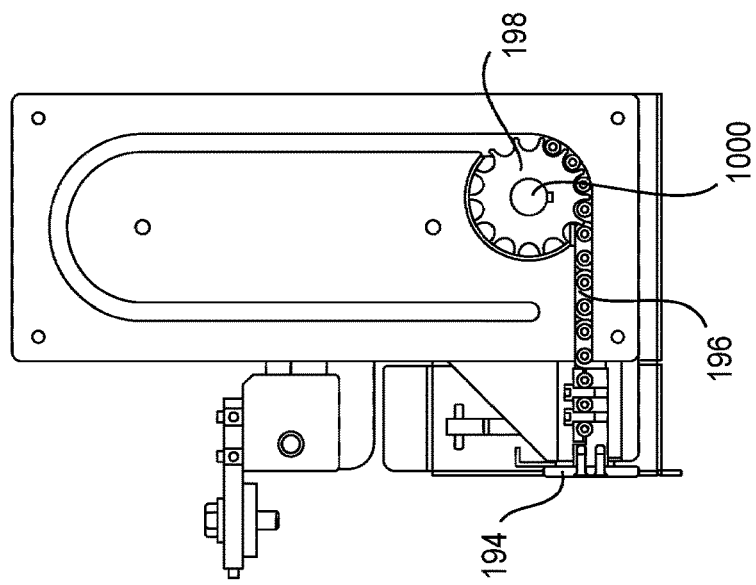
Figure 13:
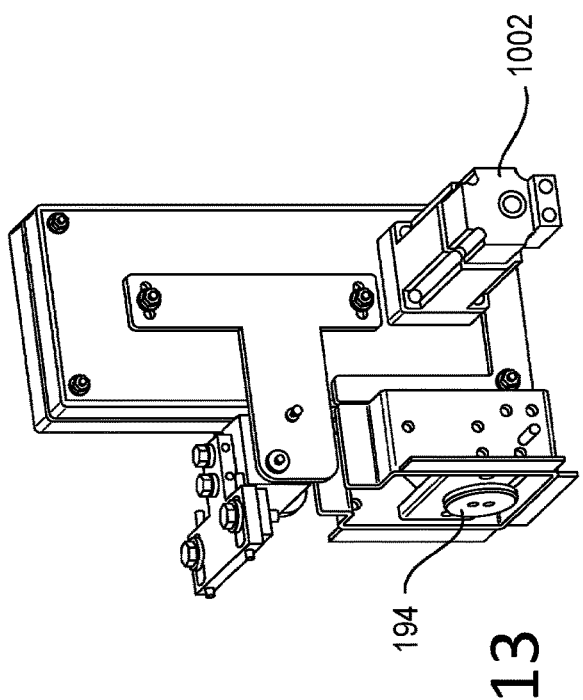
Figure 12:
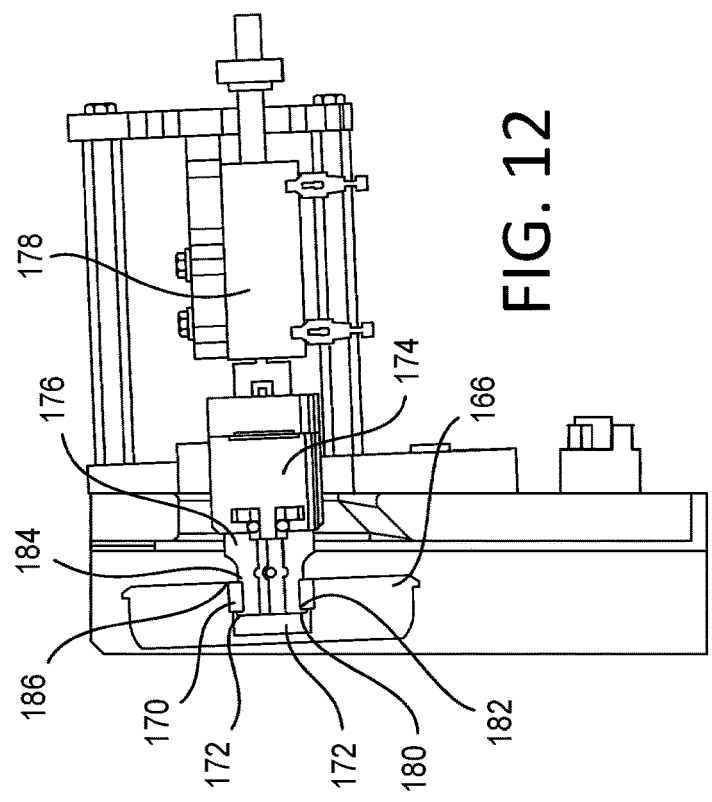
Figure 15:
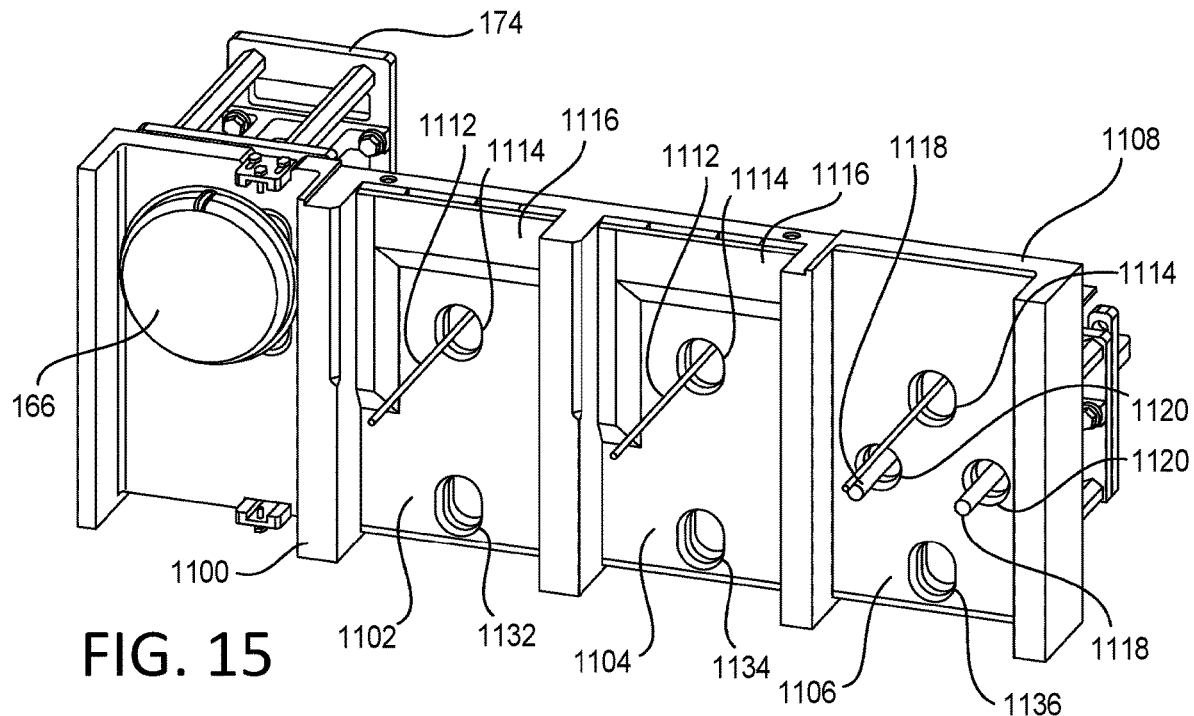
Figure 18:
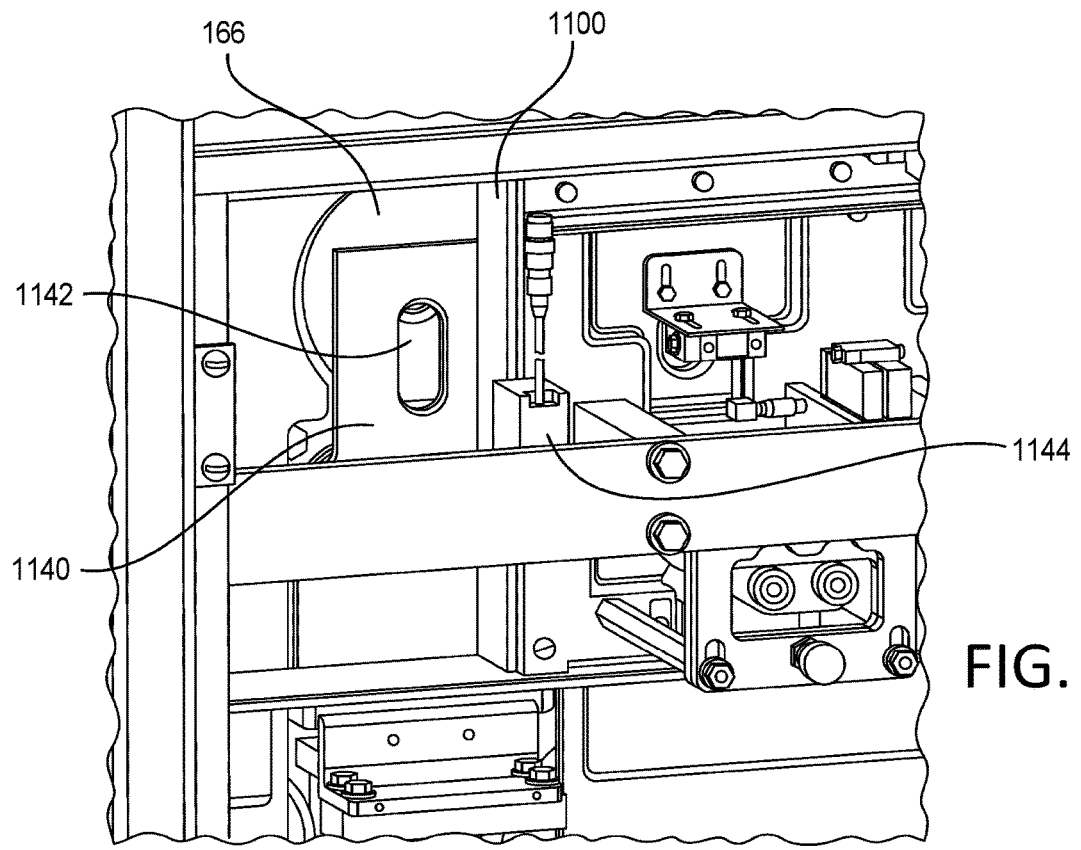
Figure 16:
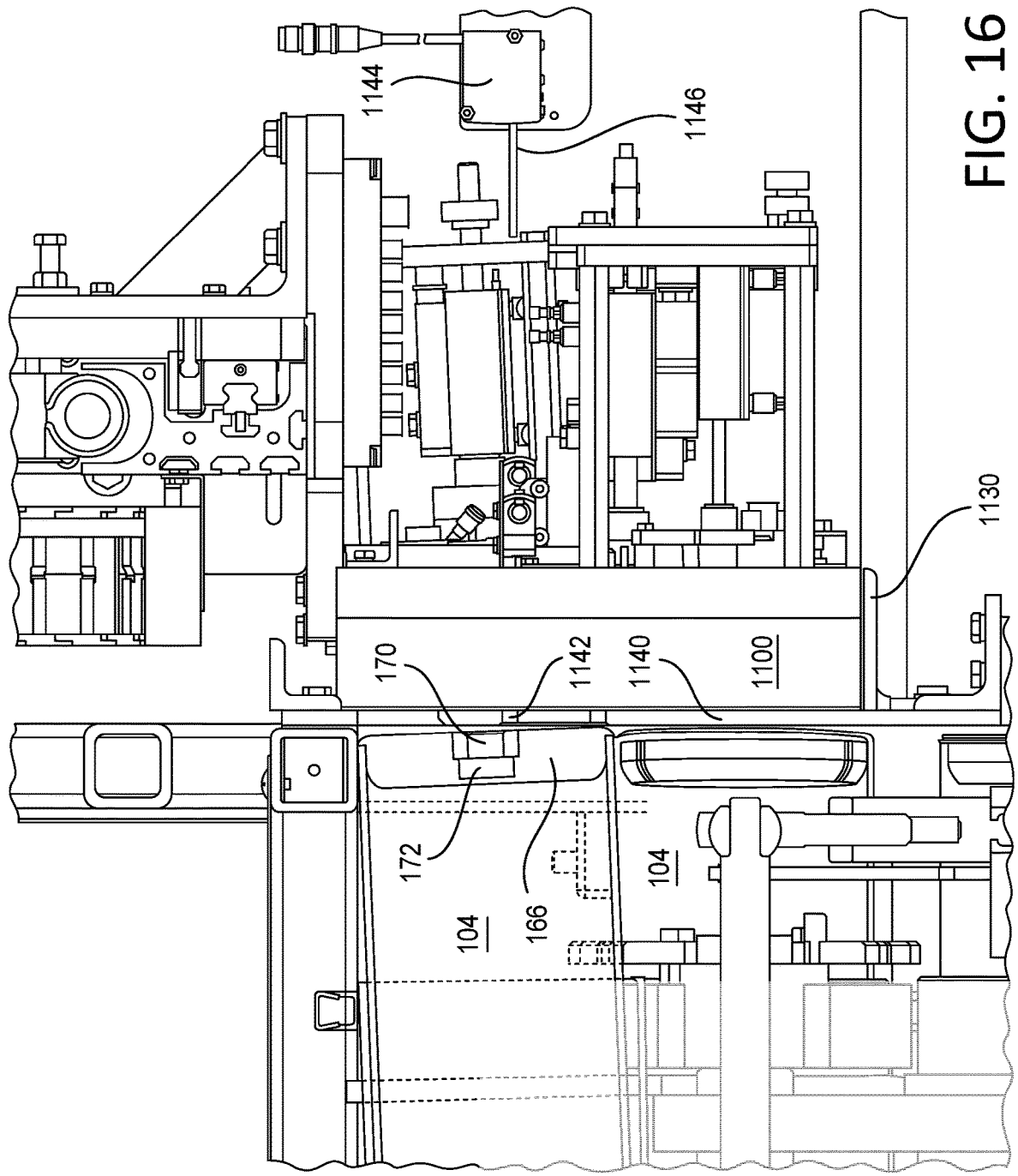
Figure 17:
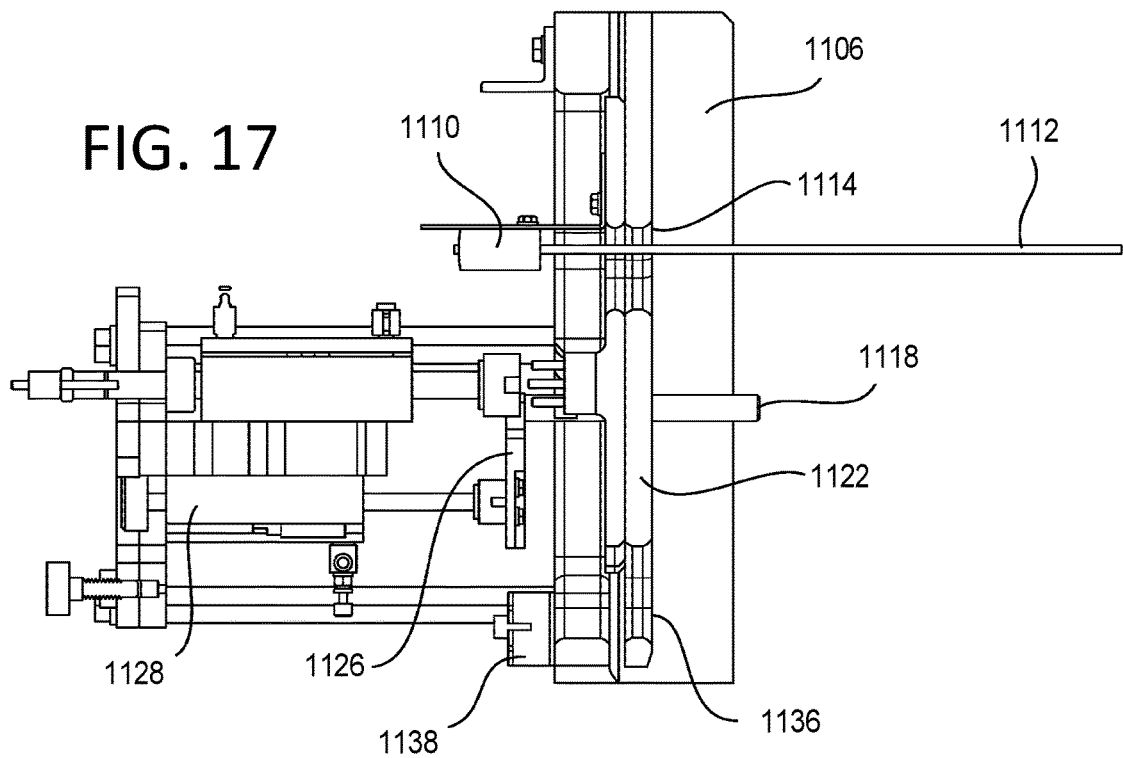
Figure 19:
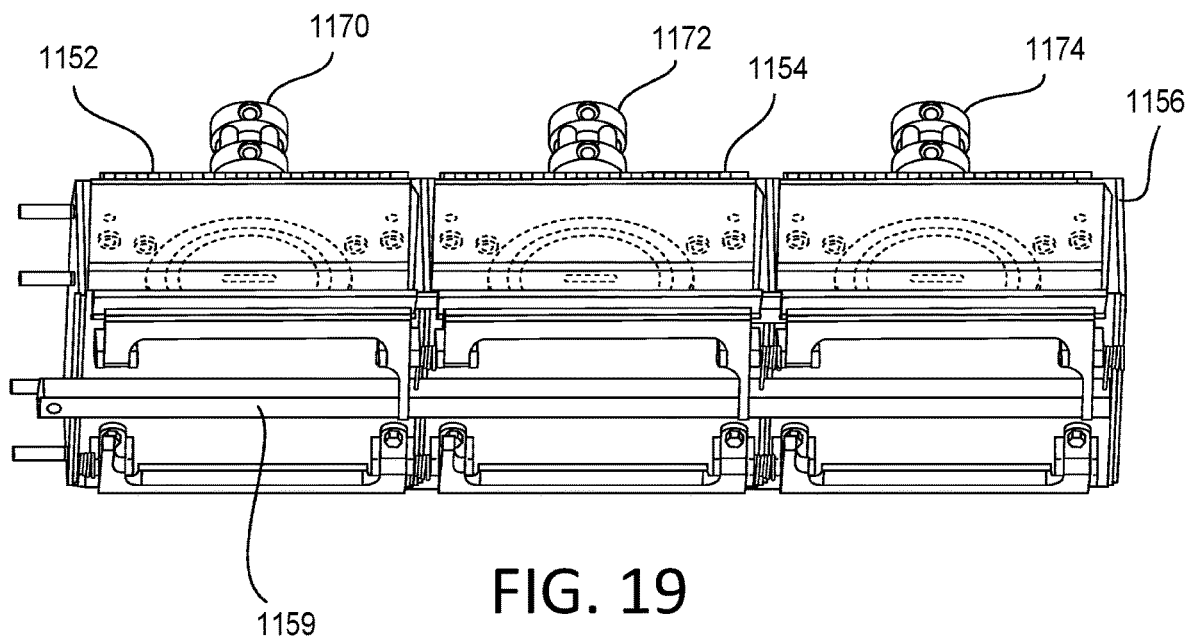
Figure 20:
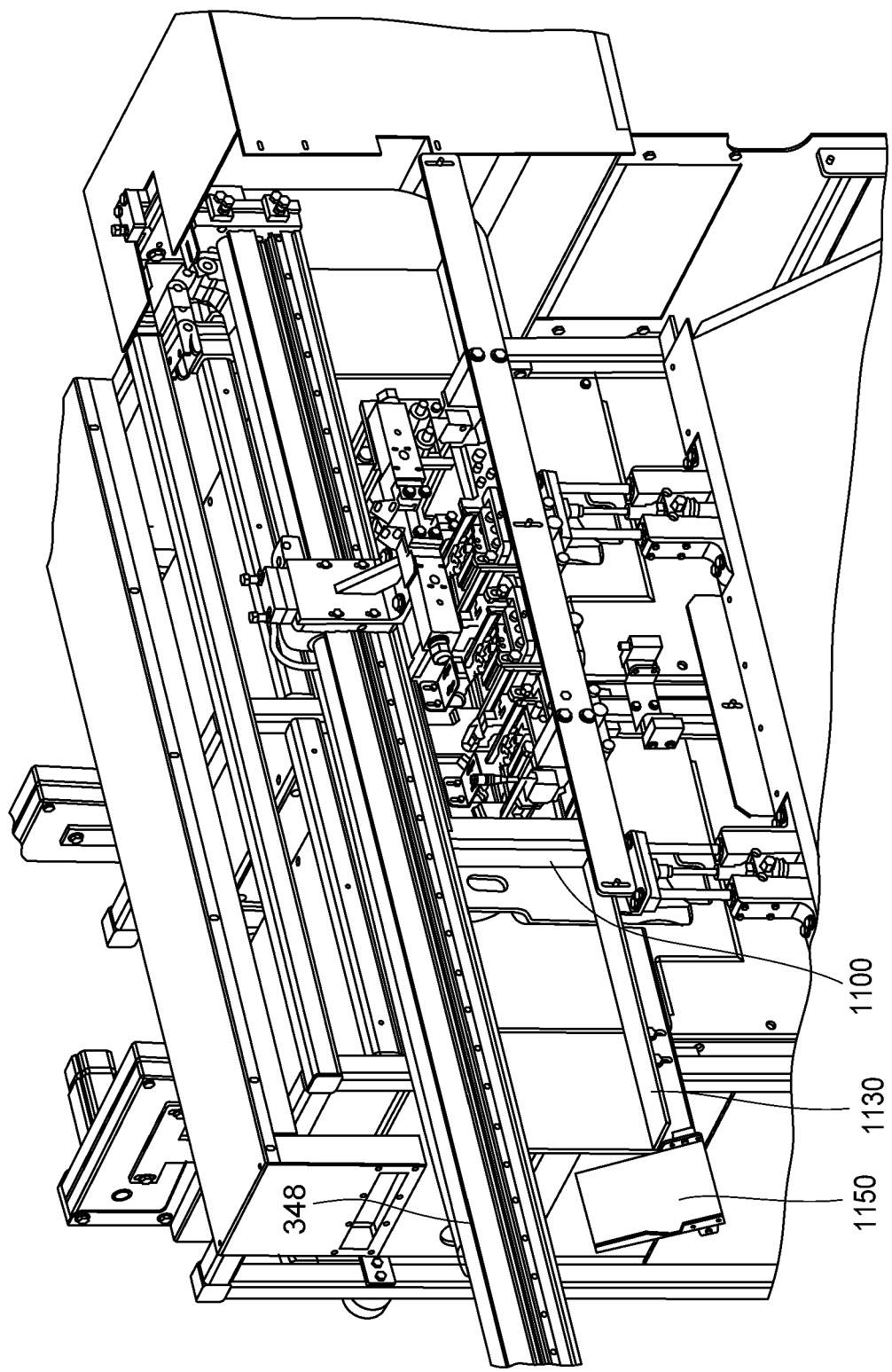
Figure 21:
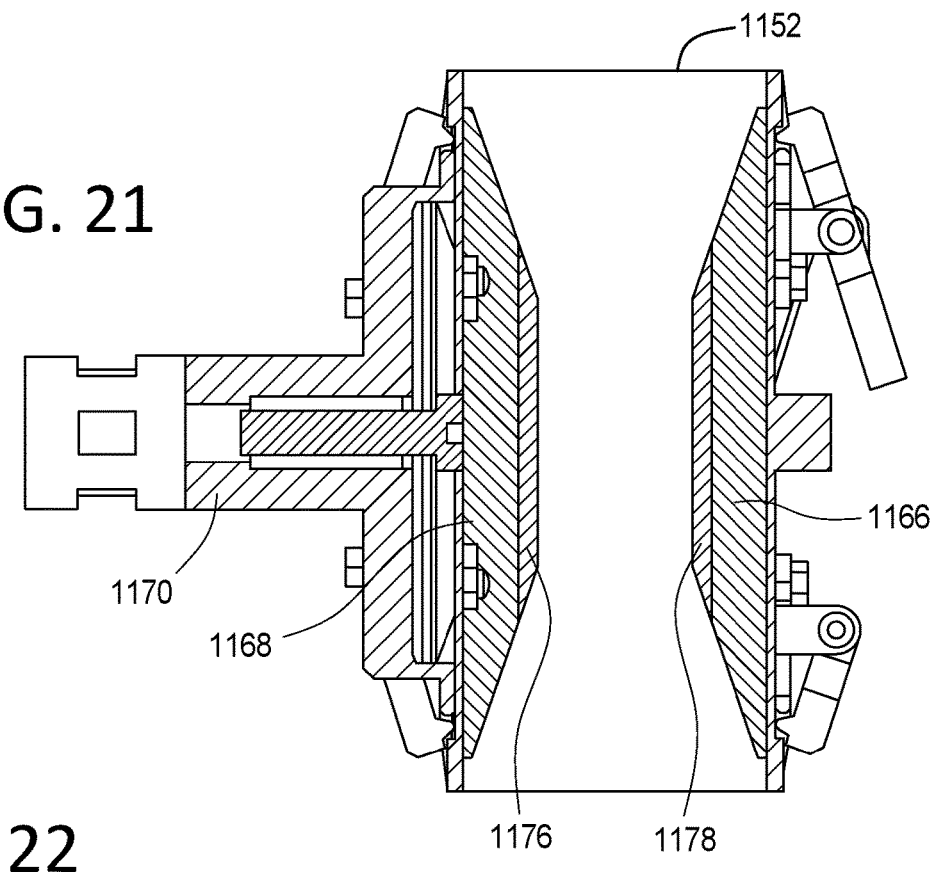
Figure 22:
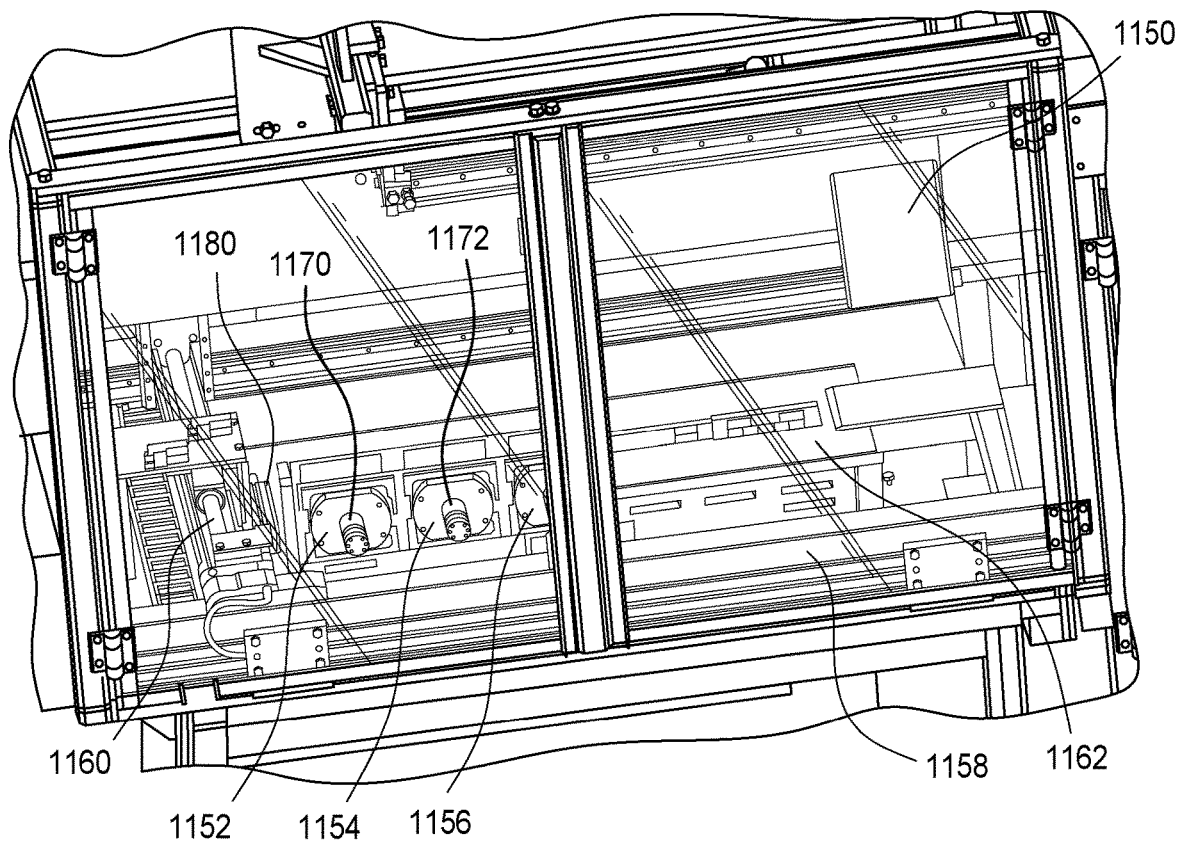
Figure 23:
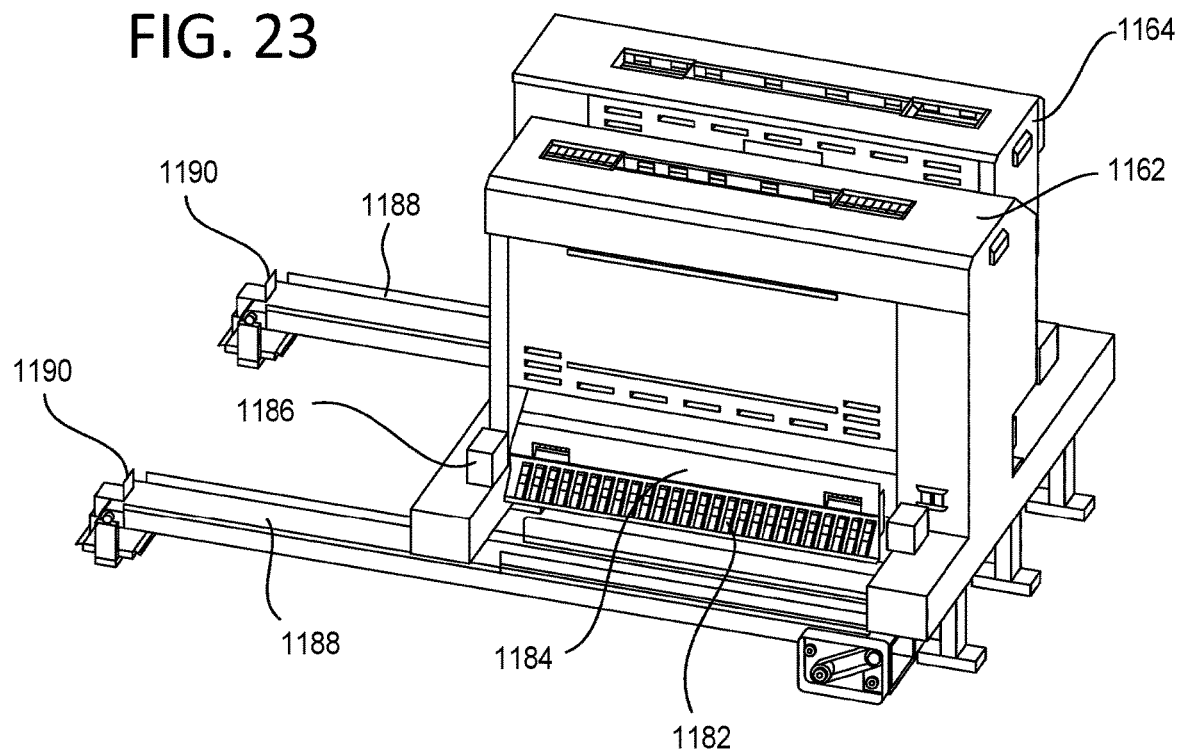
Figure 24:
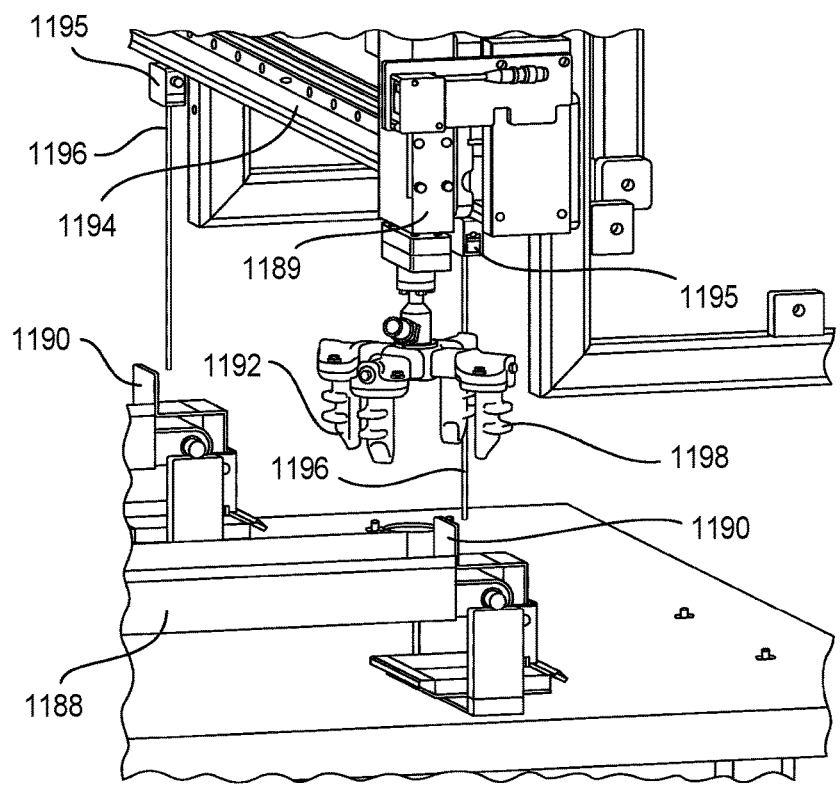
Figure 26:
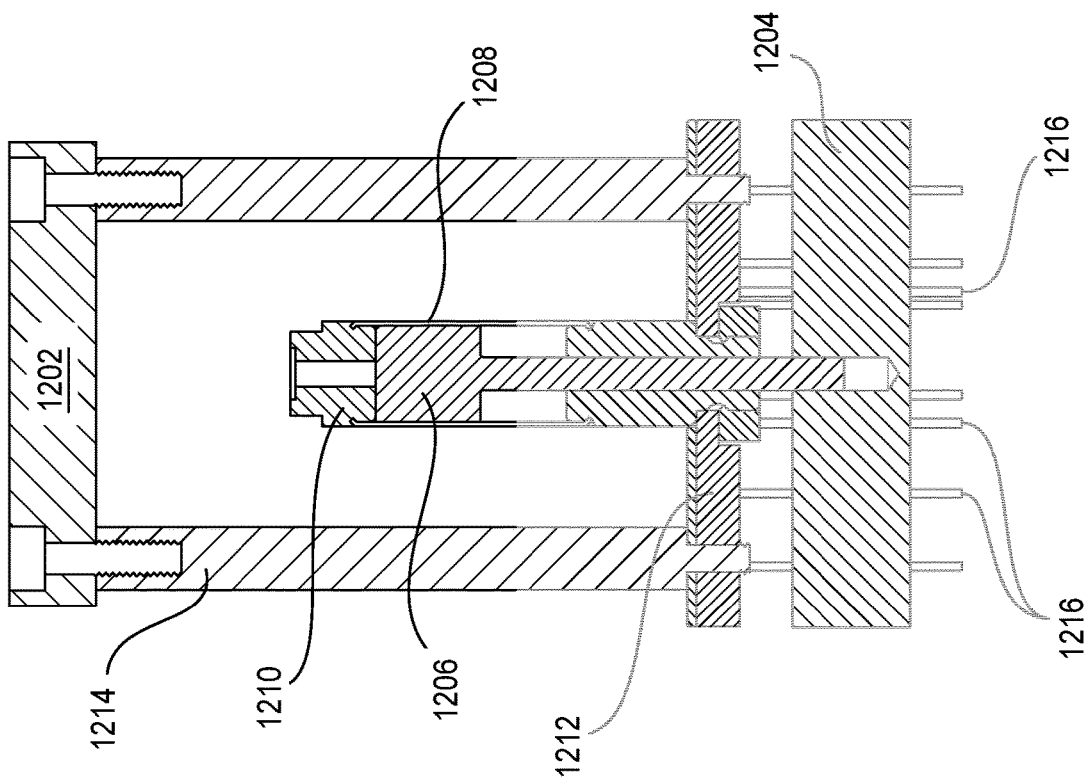
Figure 25:
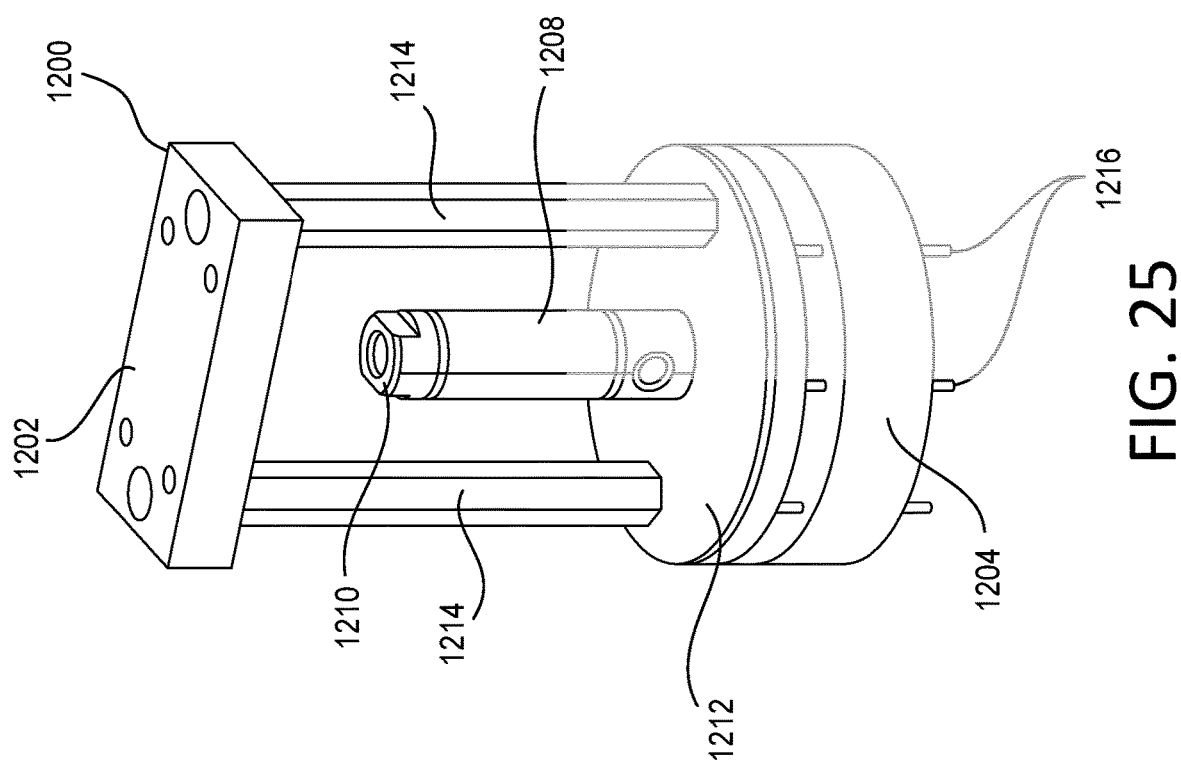
Figure 27:
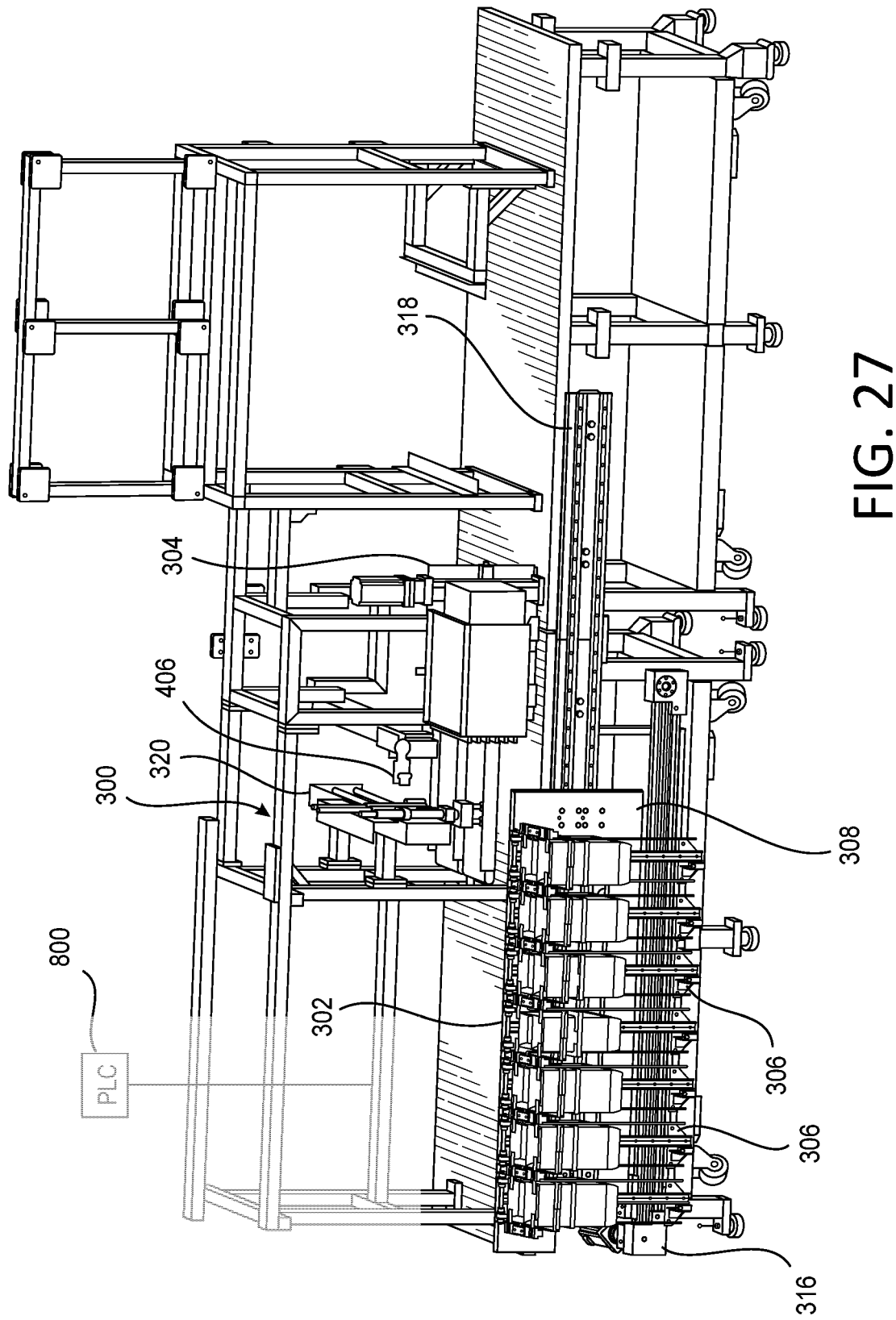
Figure 28:
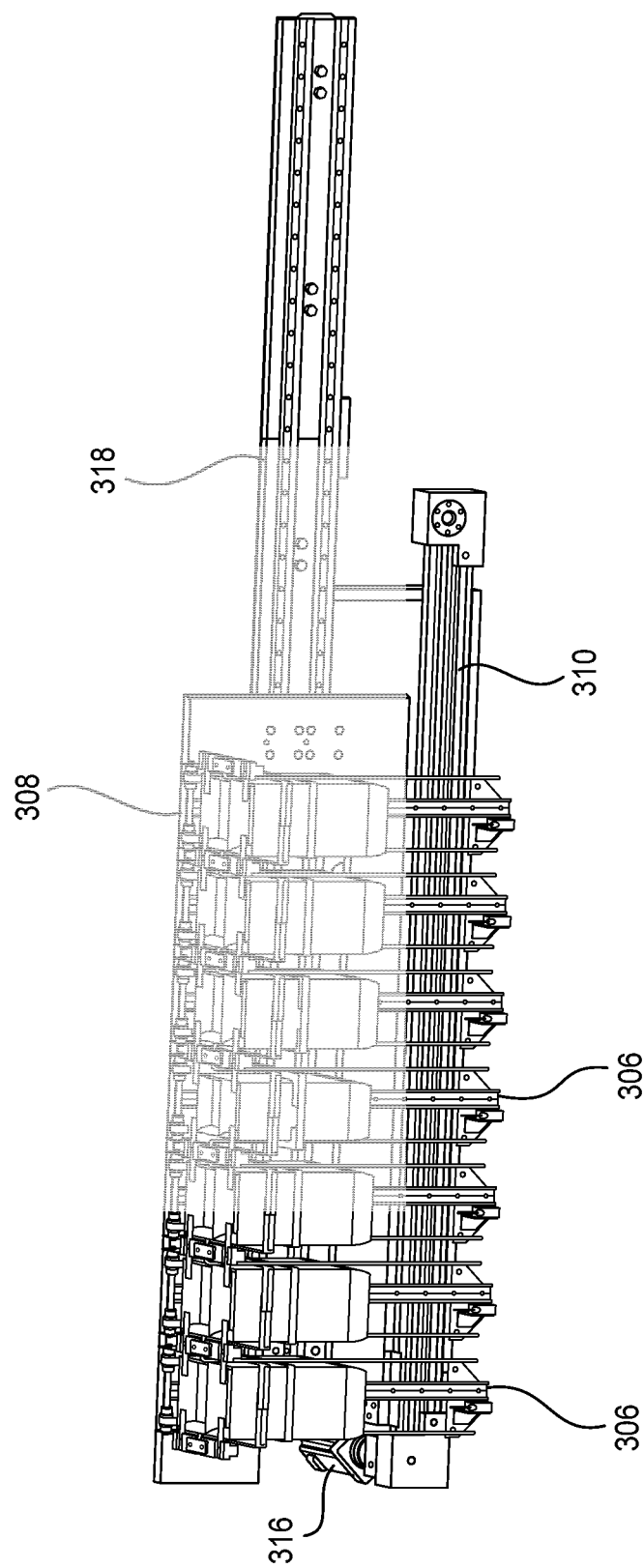
Figure 29:
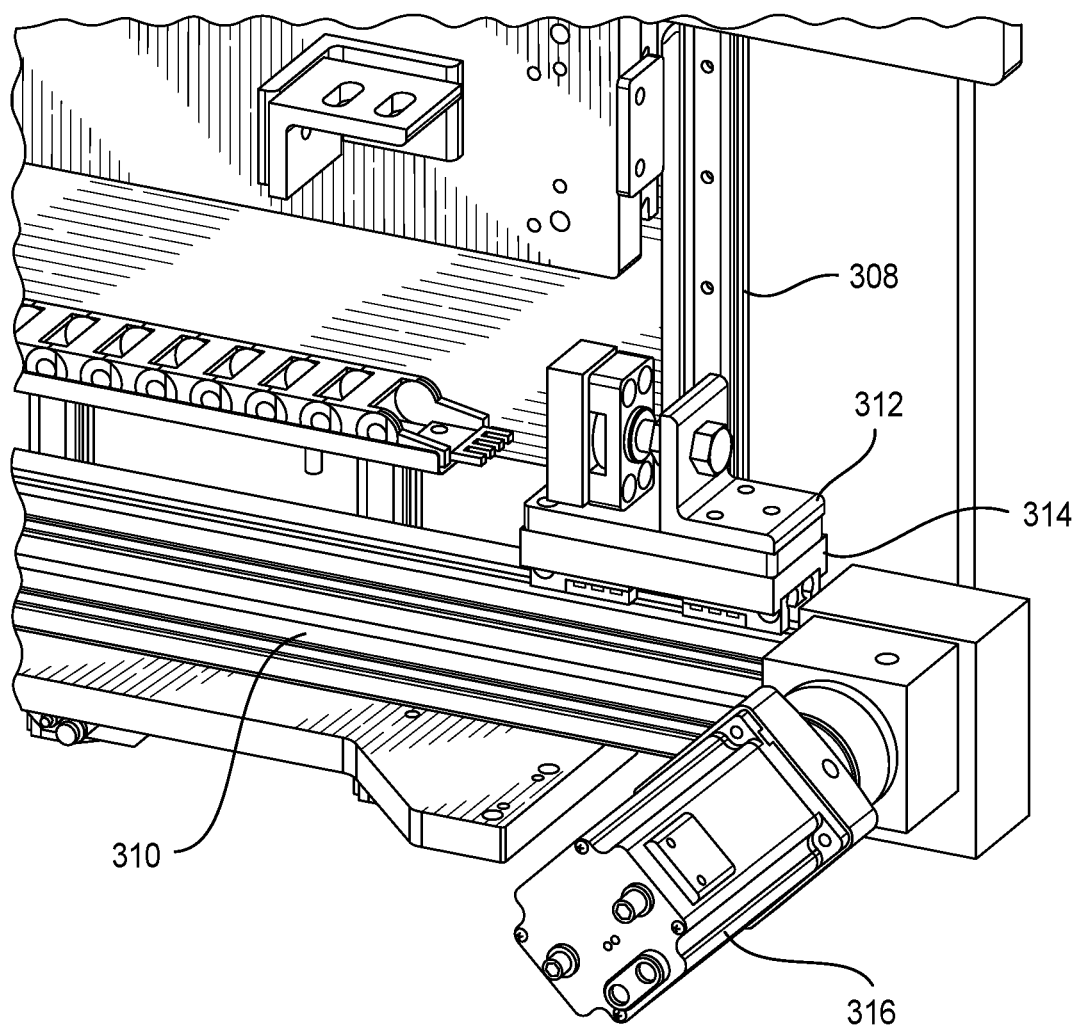
Figure 30:
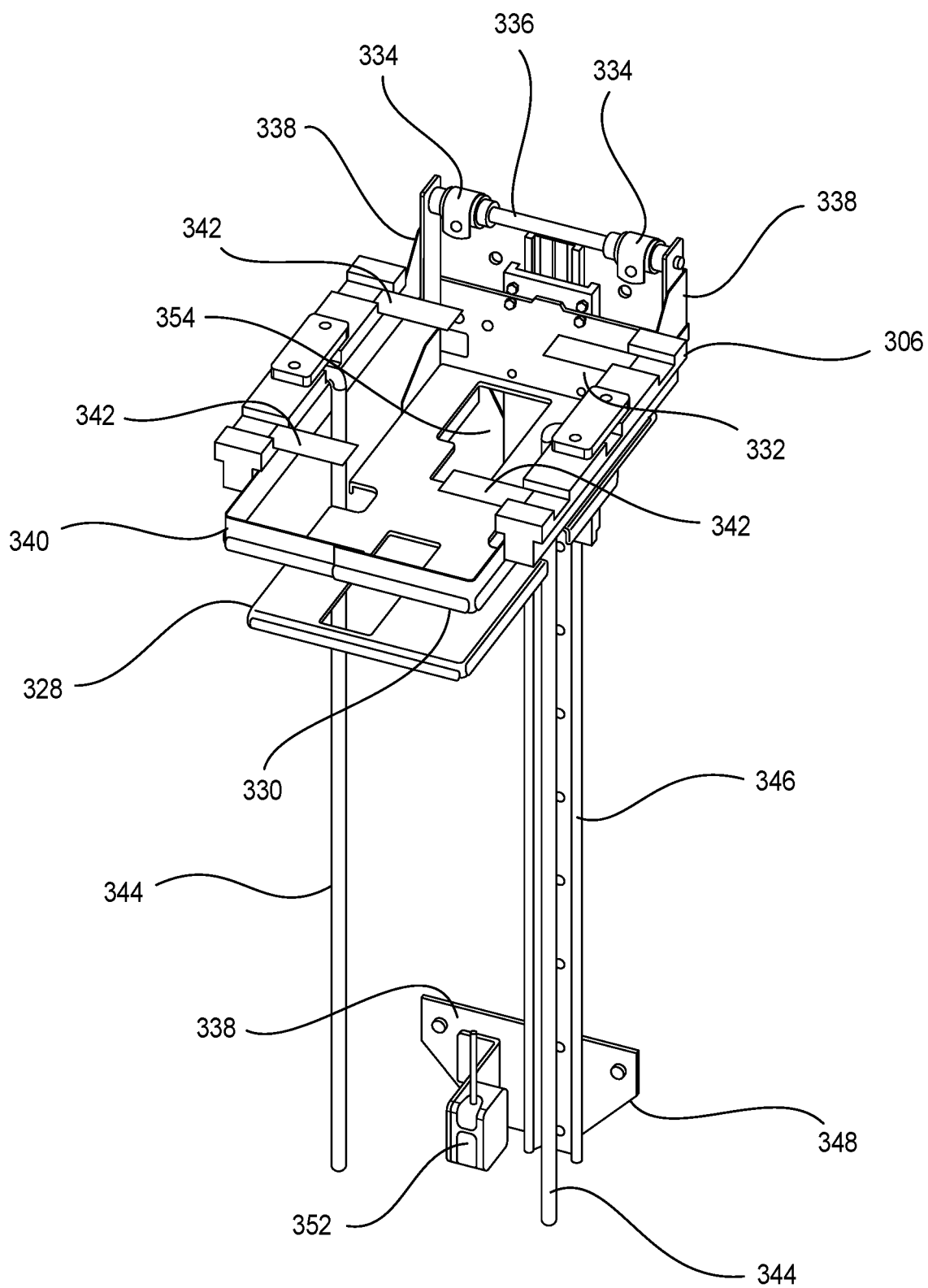
Figure 31:
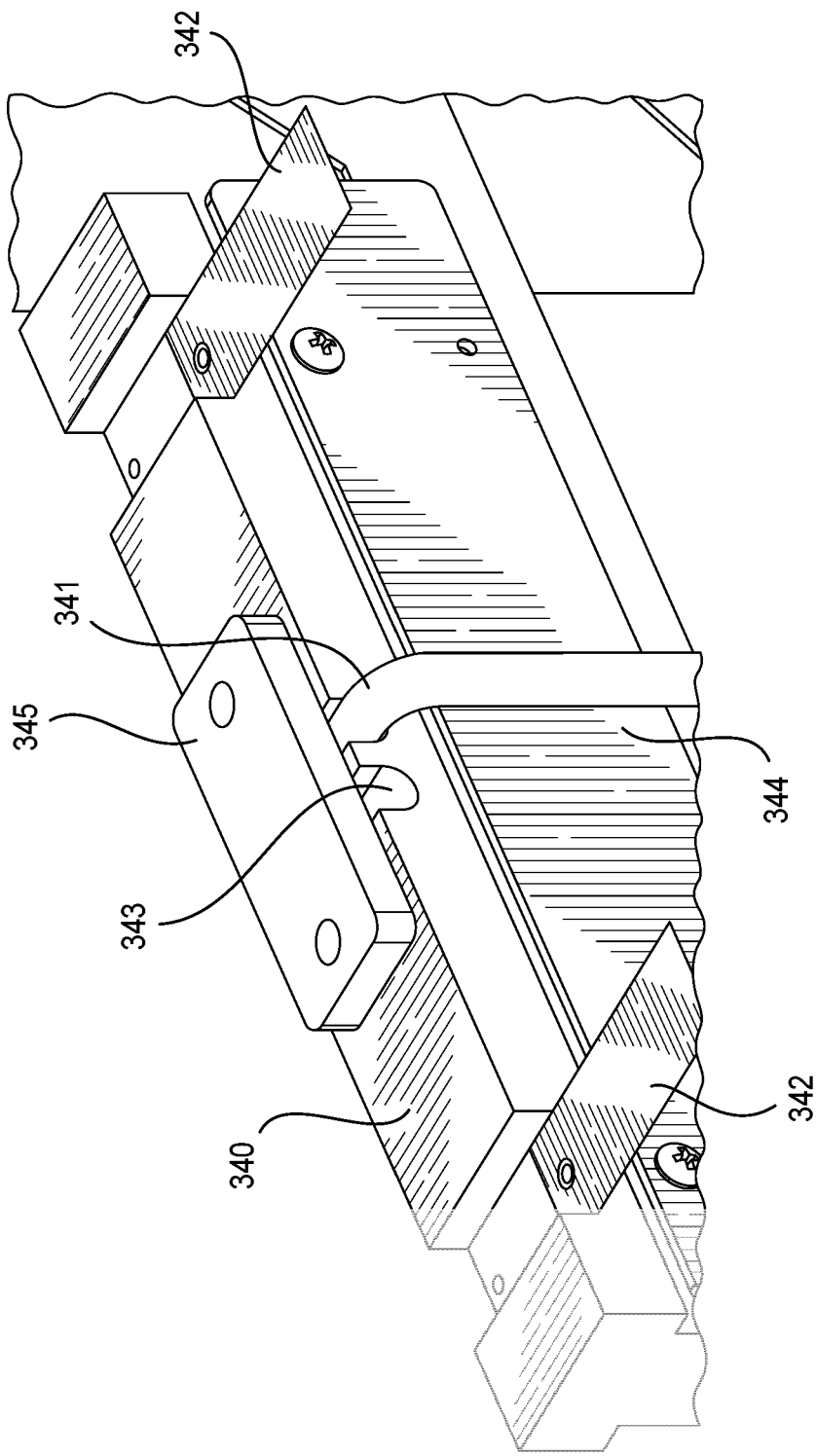
Figure 32:
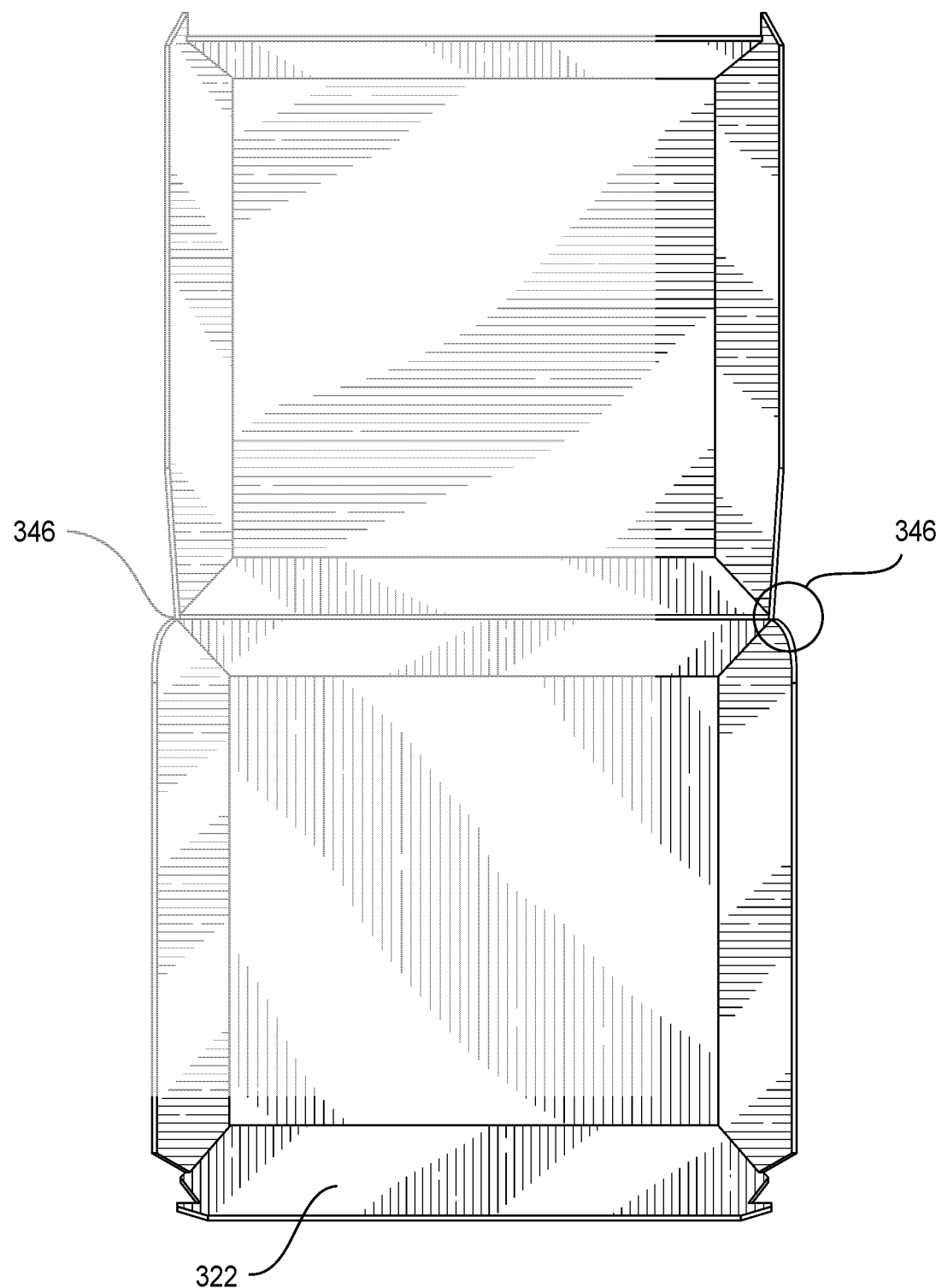
Figure 33:
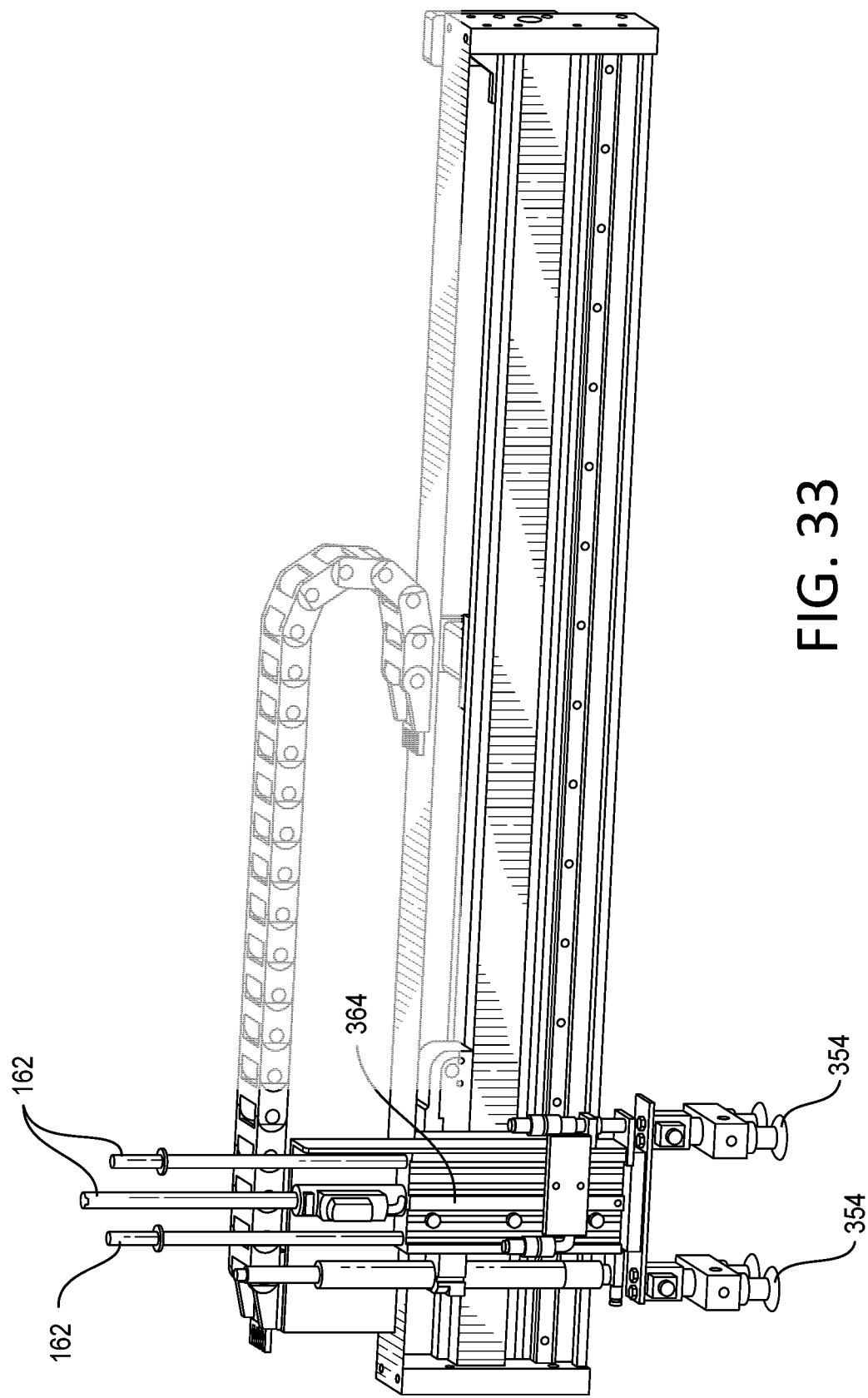
Figure 34:
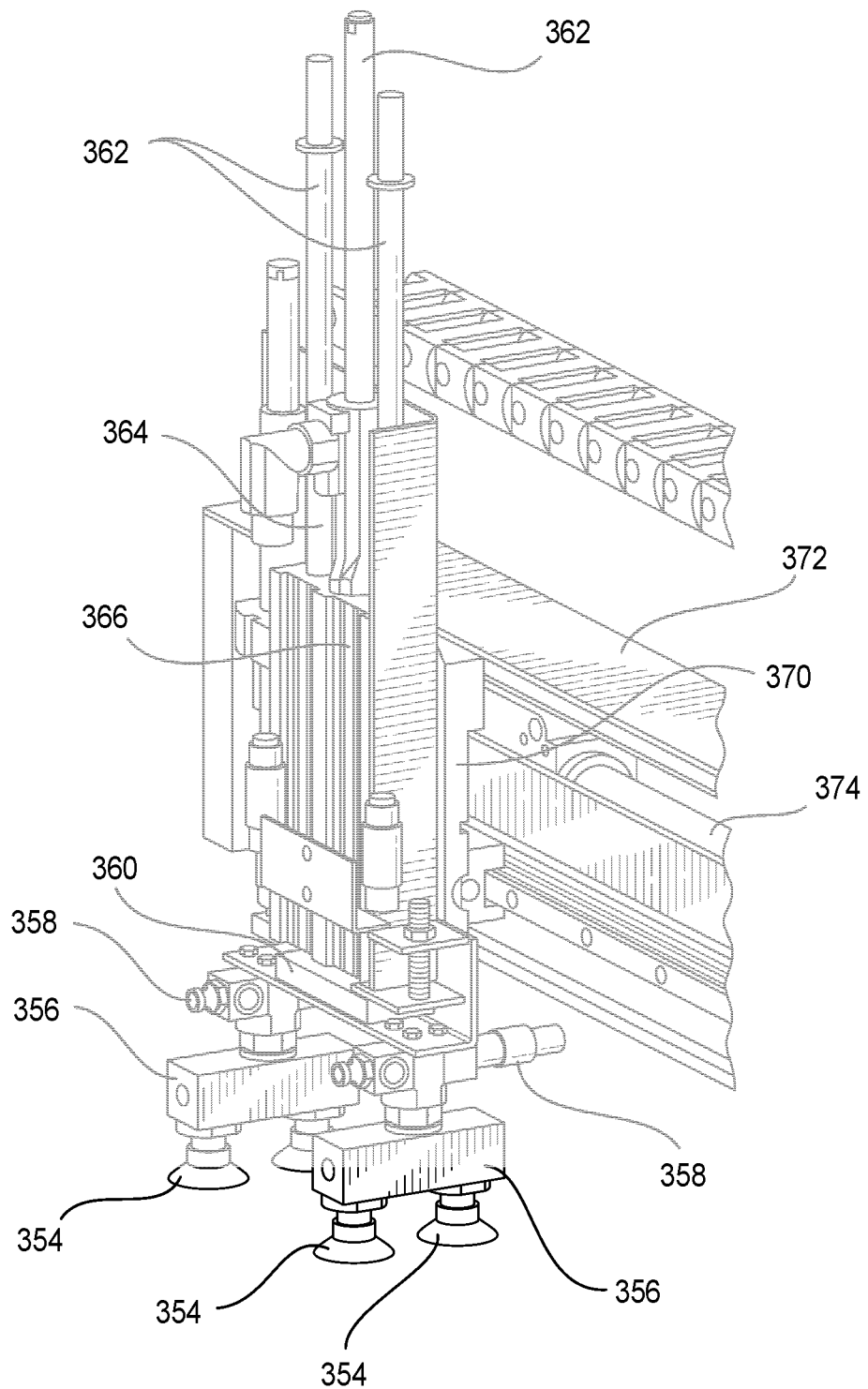
Figure 35:
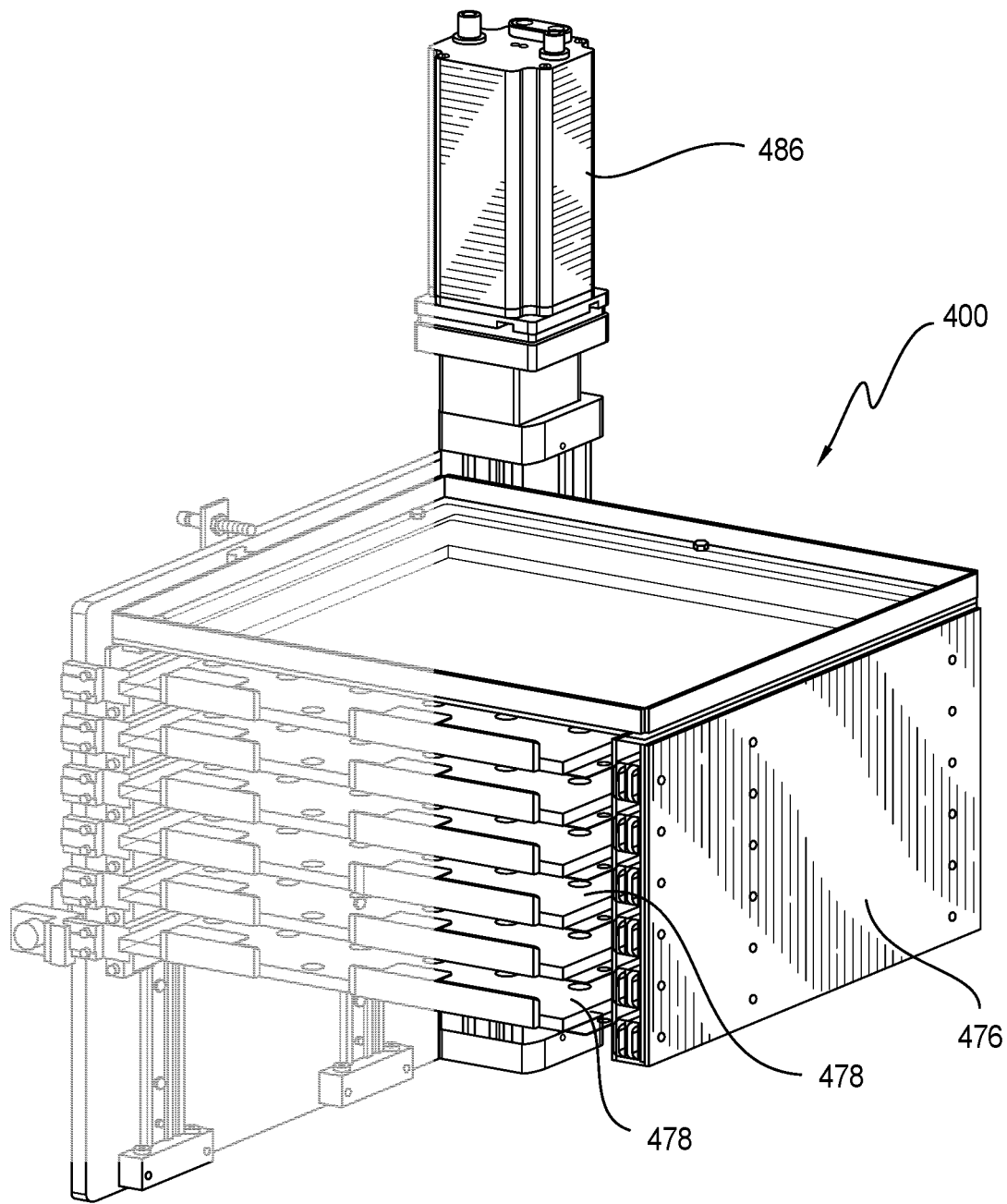
Figure 36:
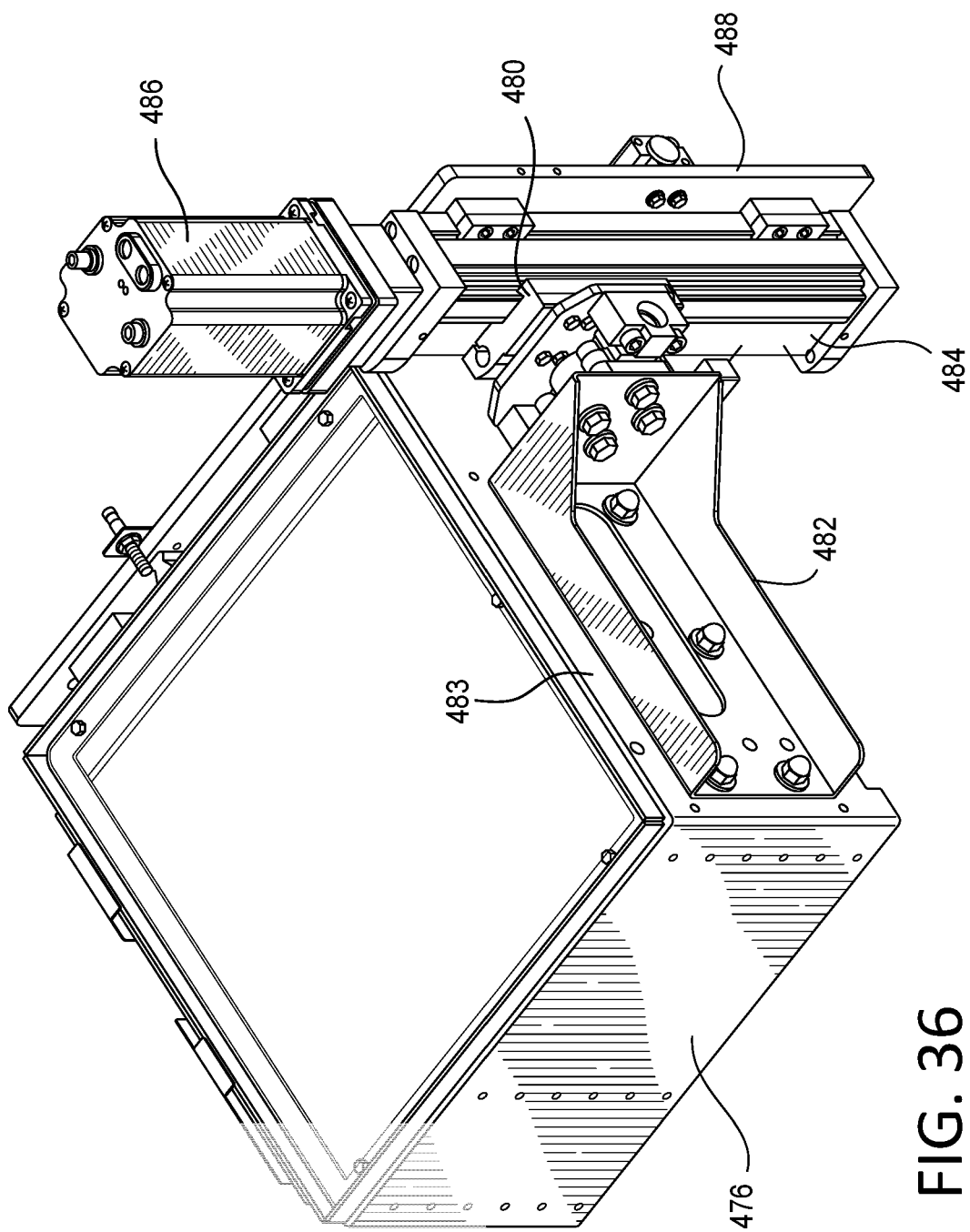
Figure 37:
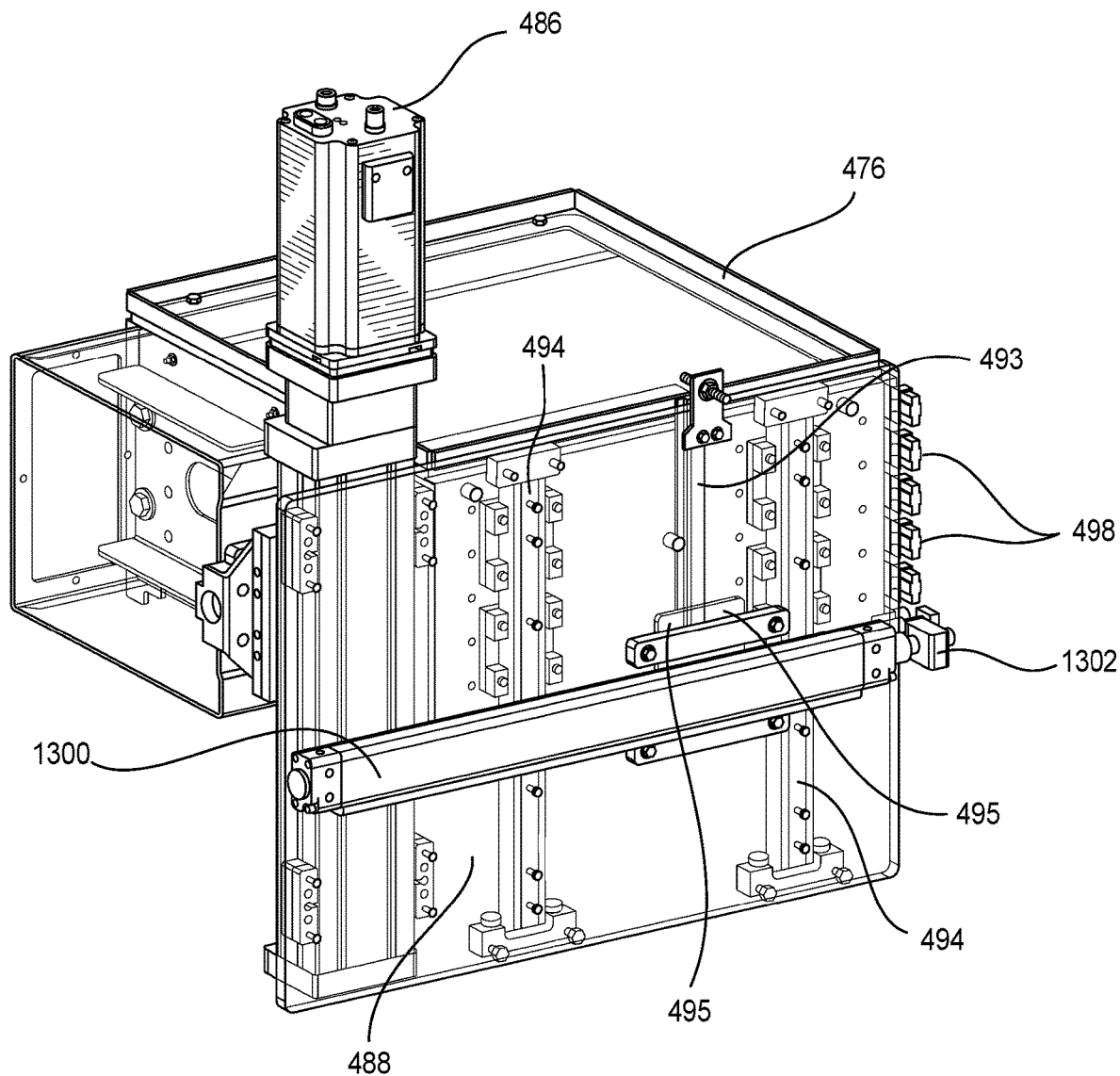
Figure 38:
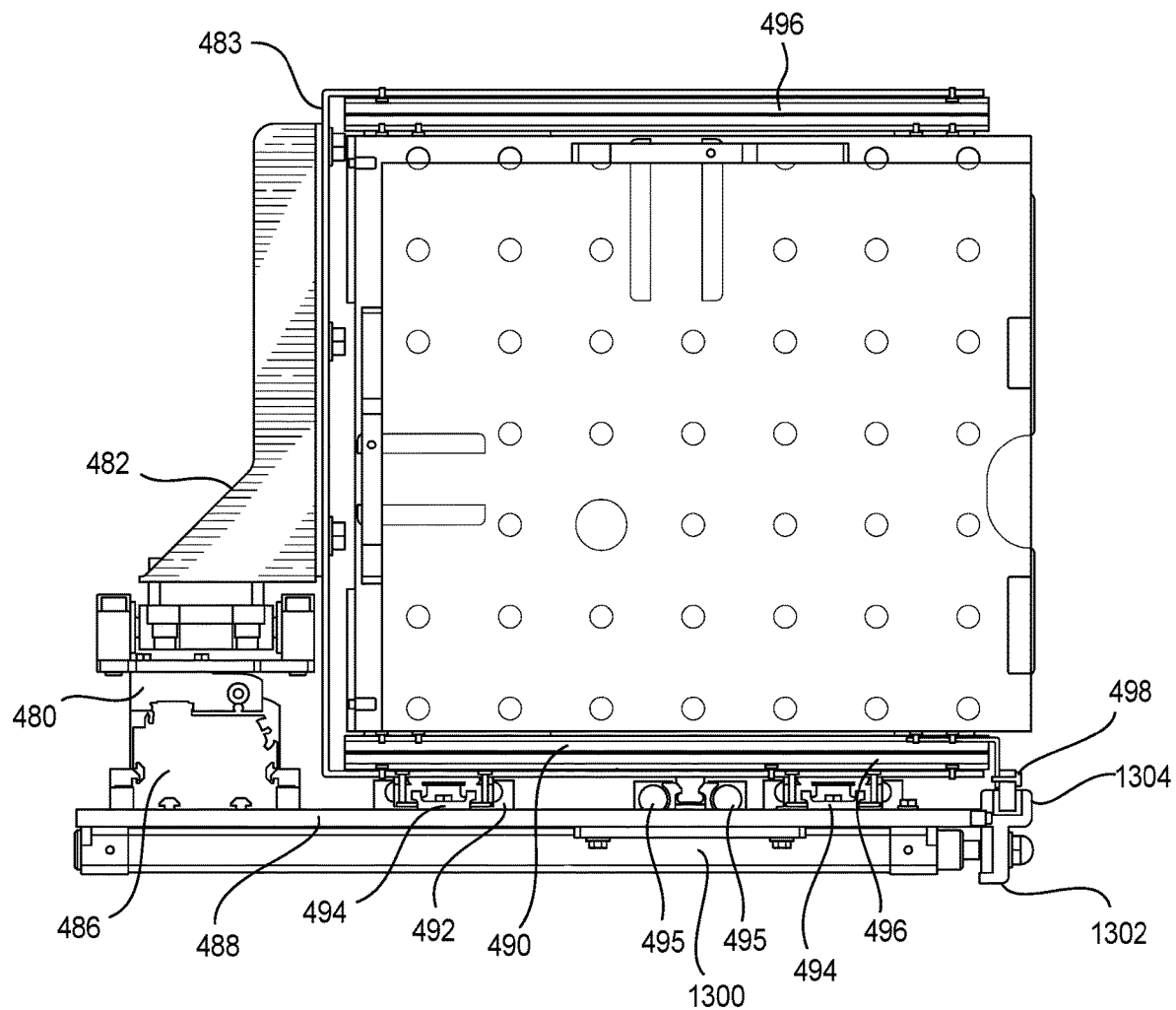
Figure 39:
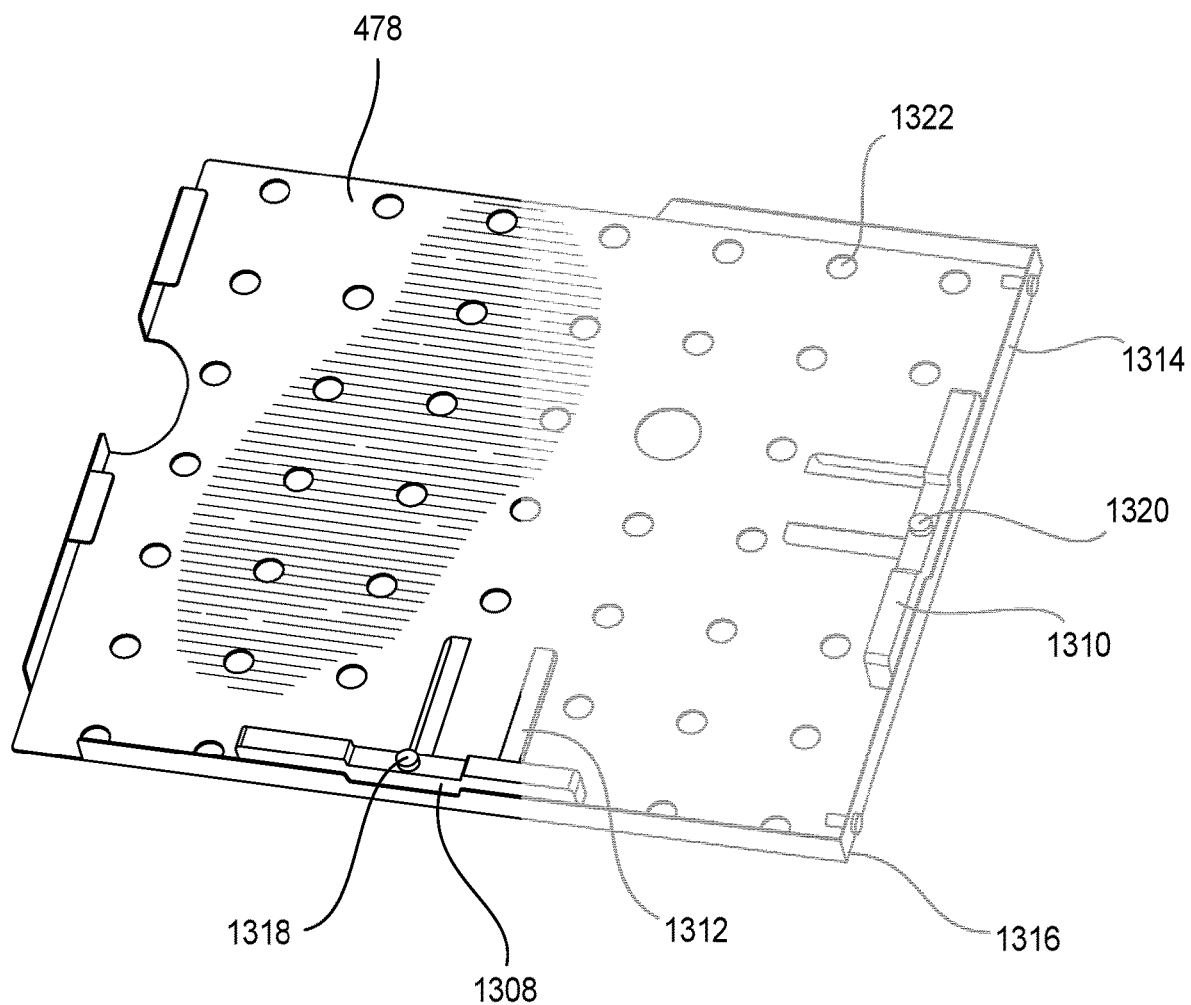
Figure 40:
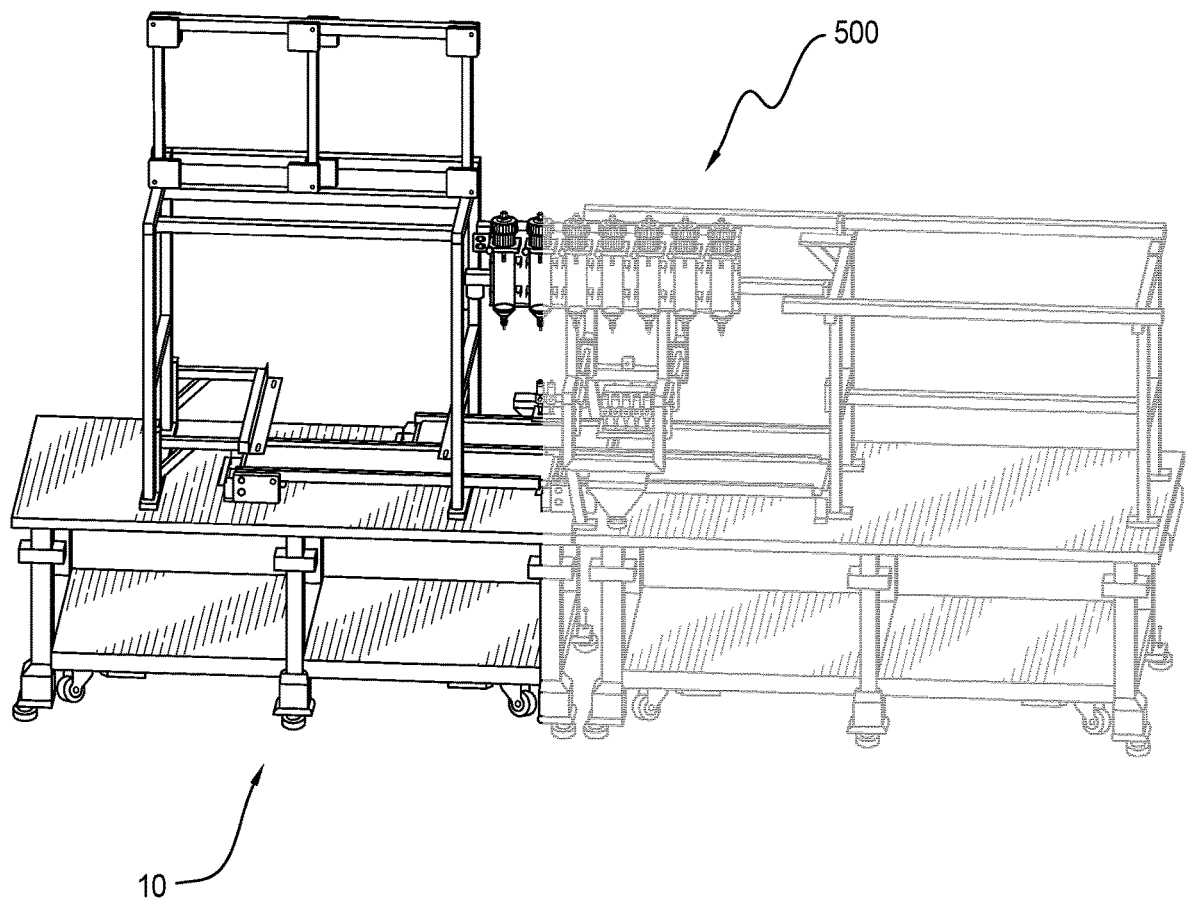
Figure 41:
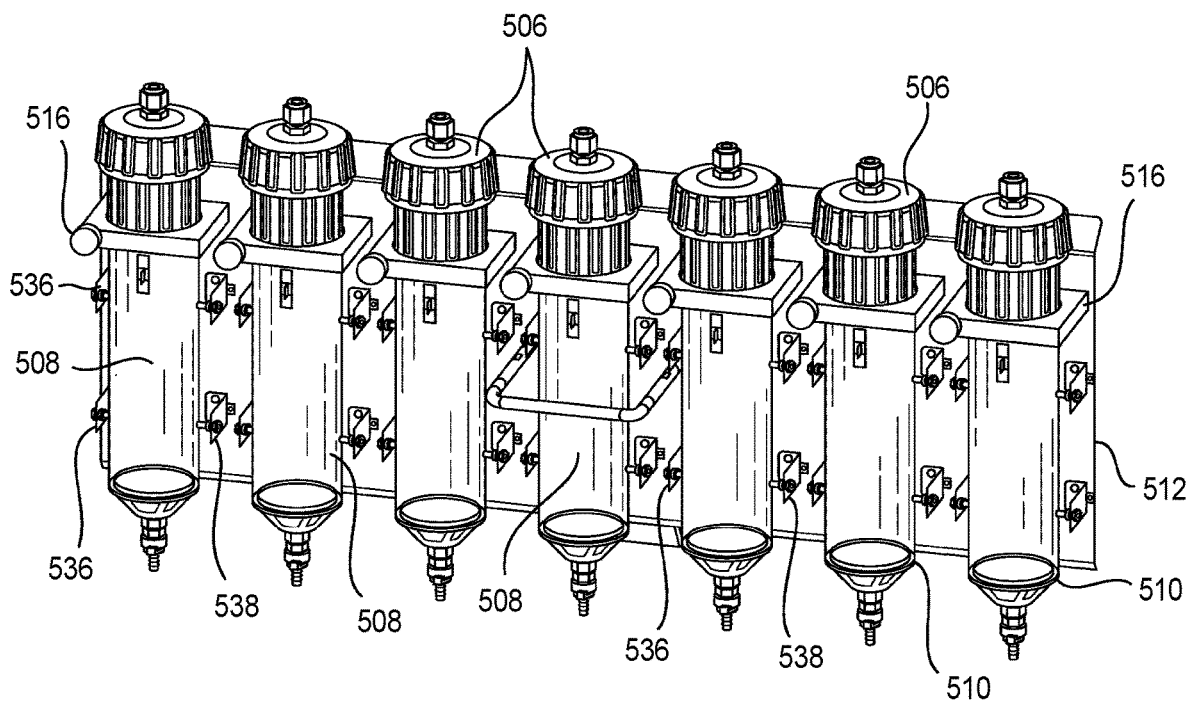
Figure 43:
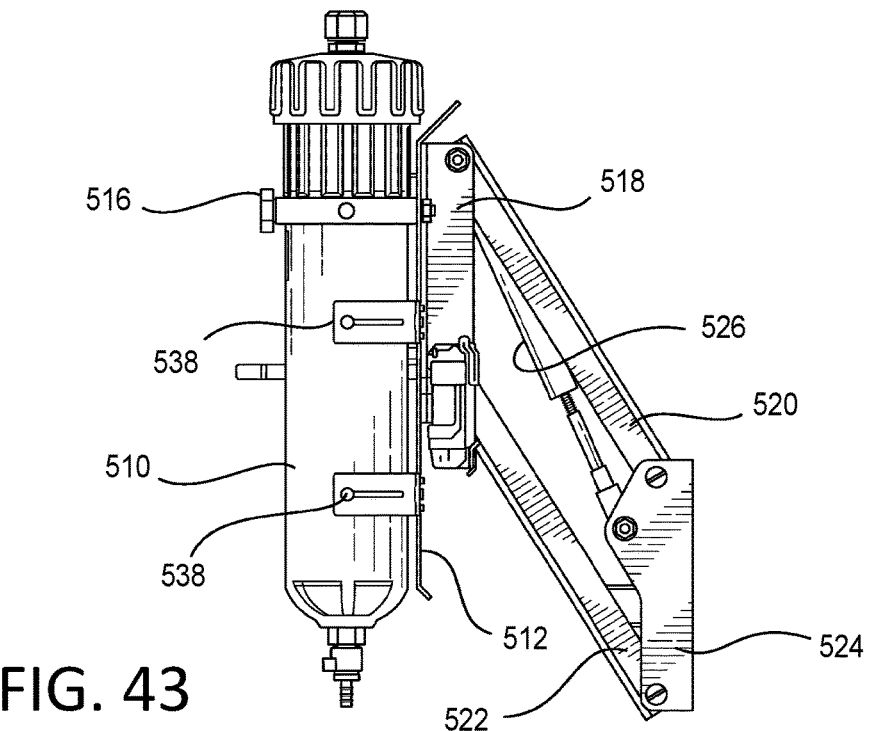
Figure 42:
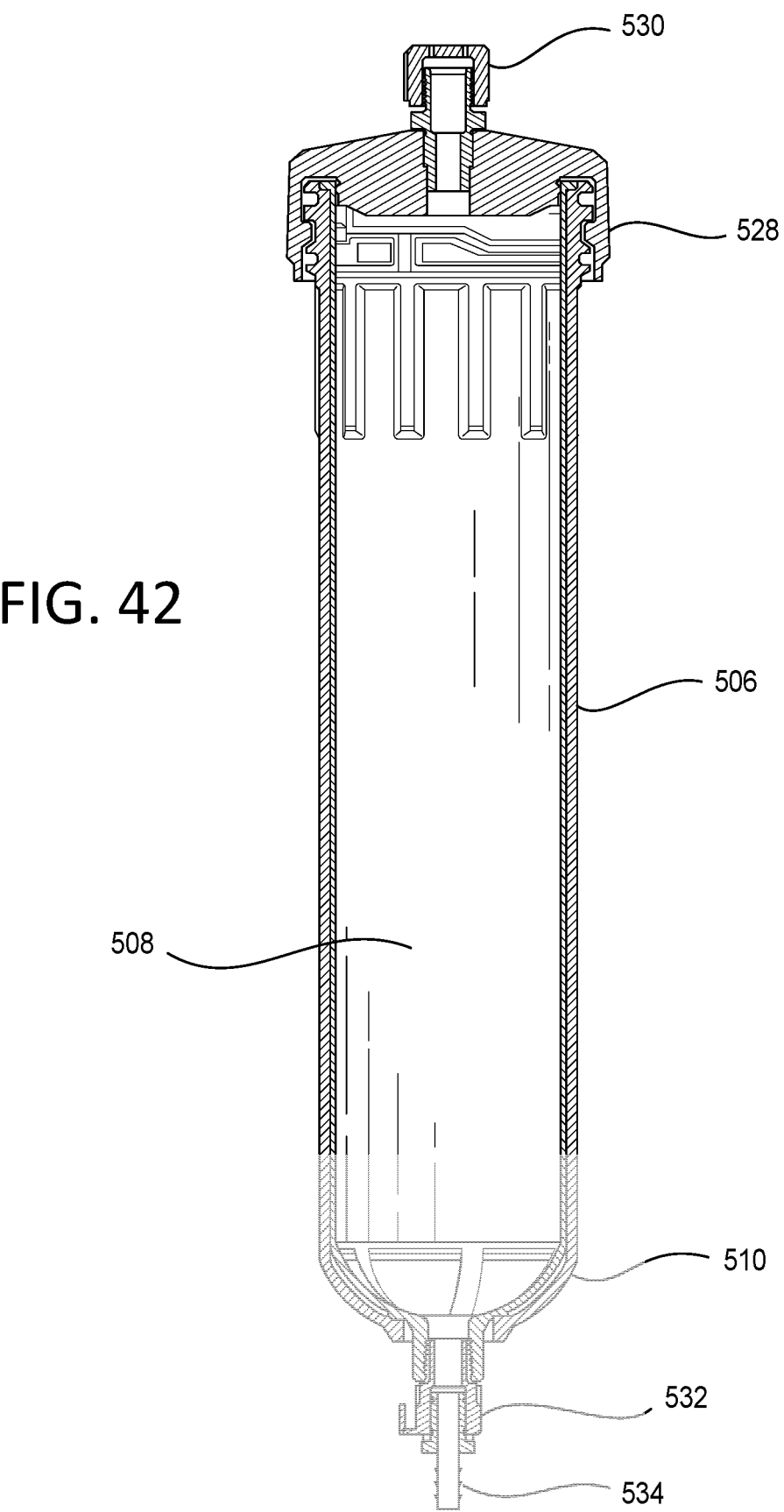
Figure 44:
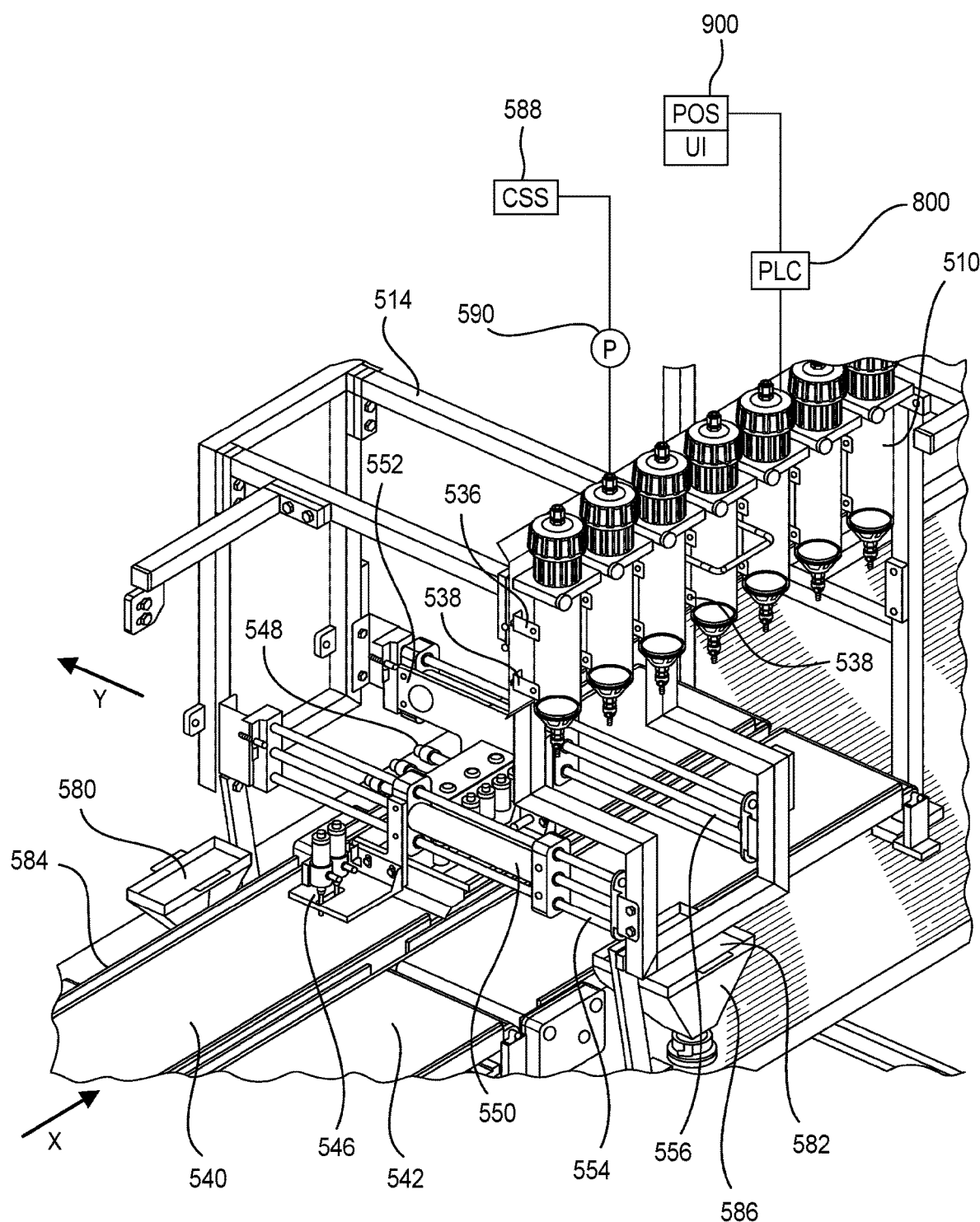
Figure 45:
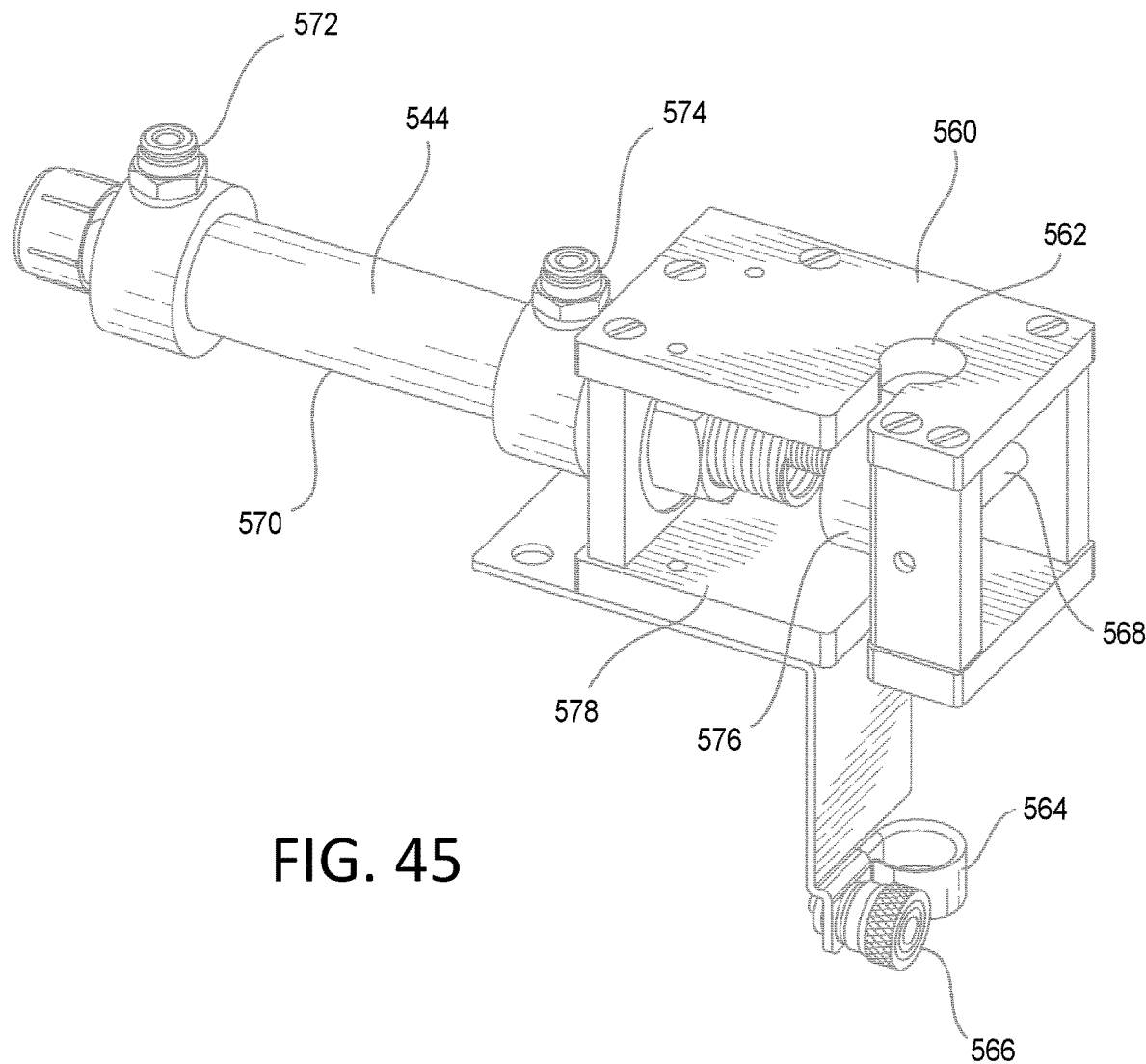
Figure 46:
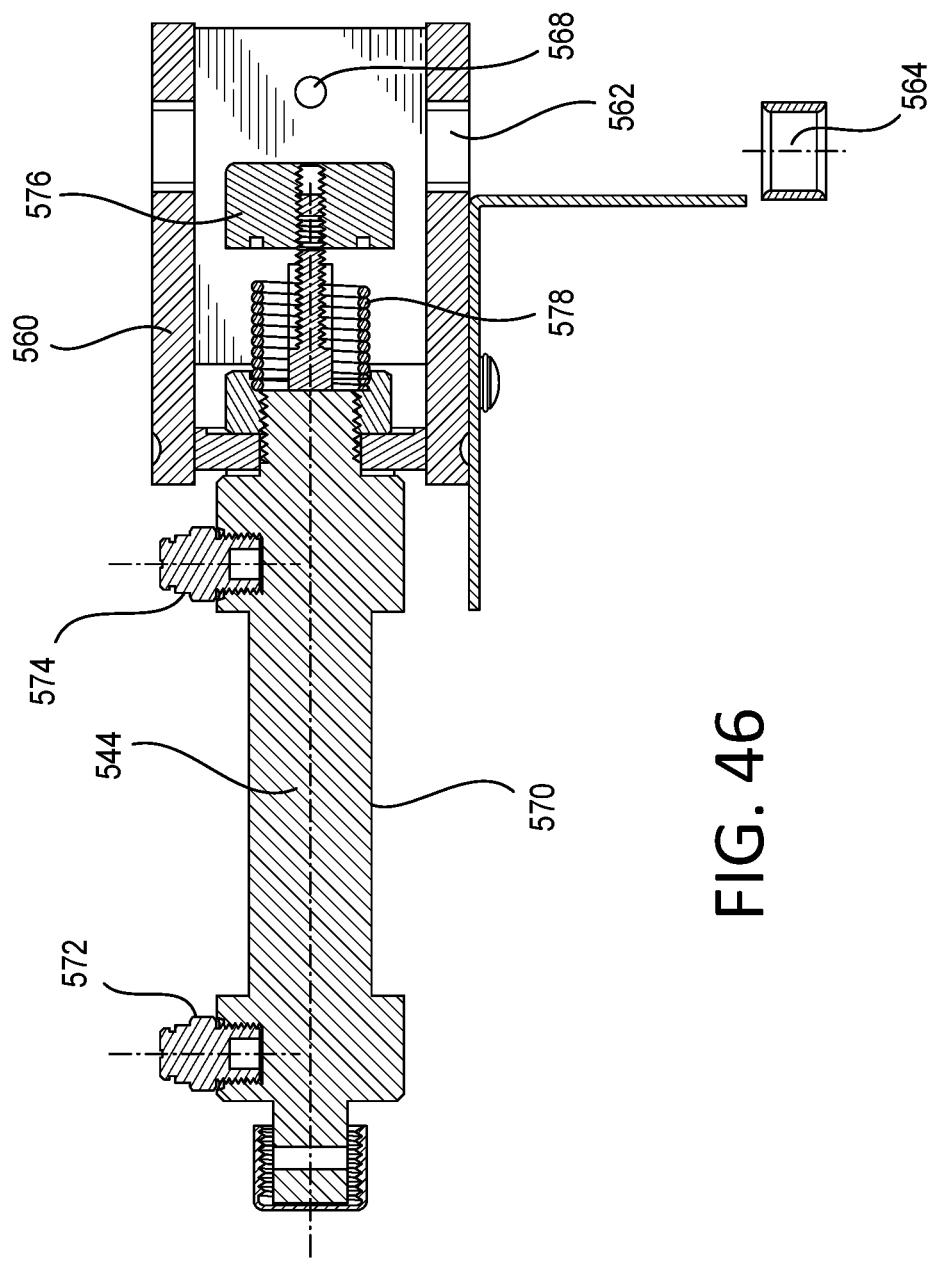
Figure 47:
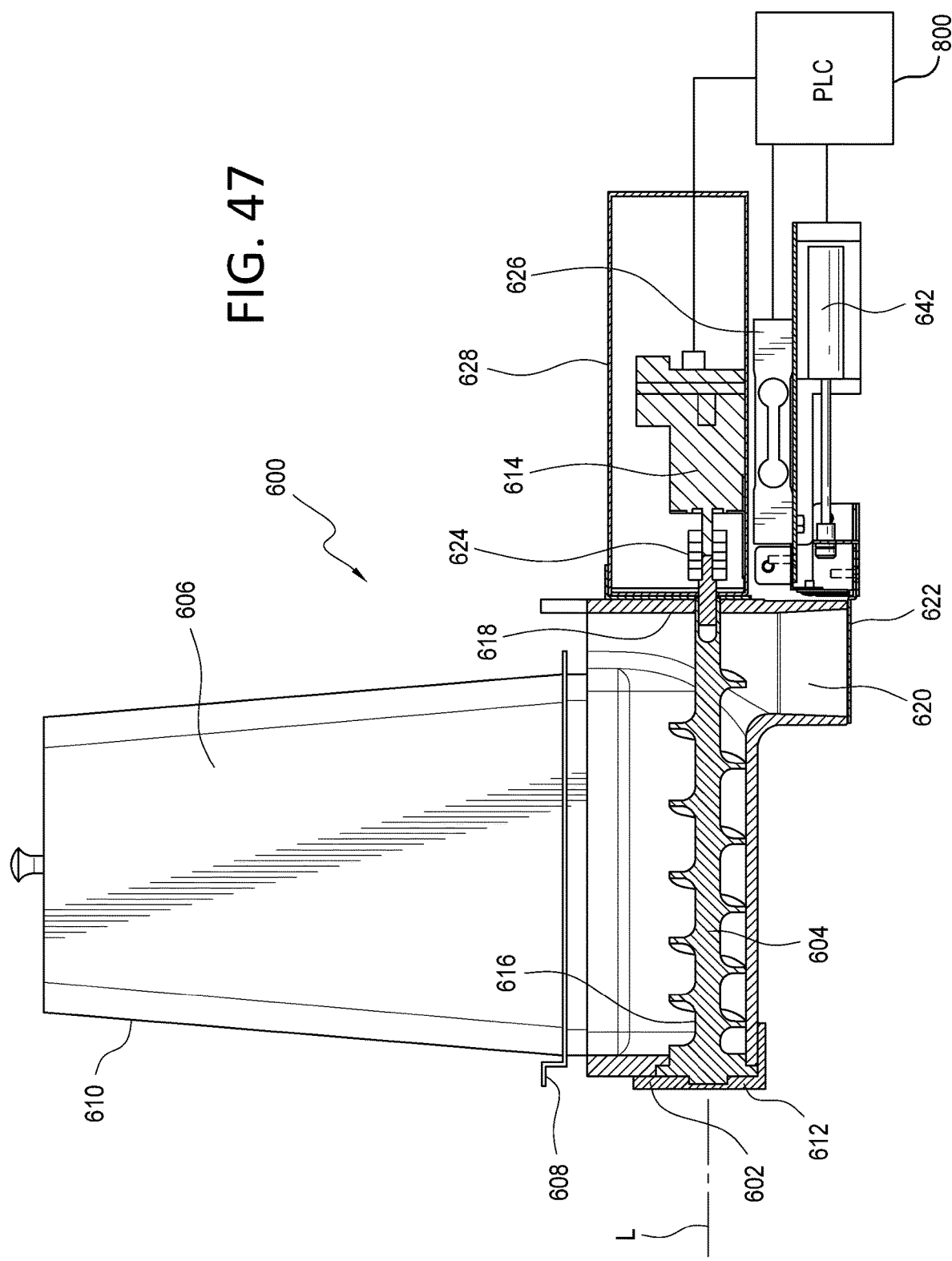
Figure 48:
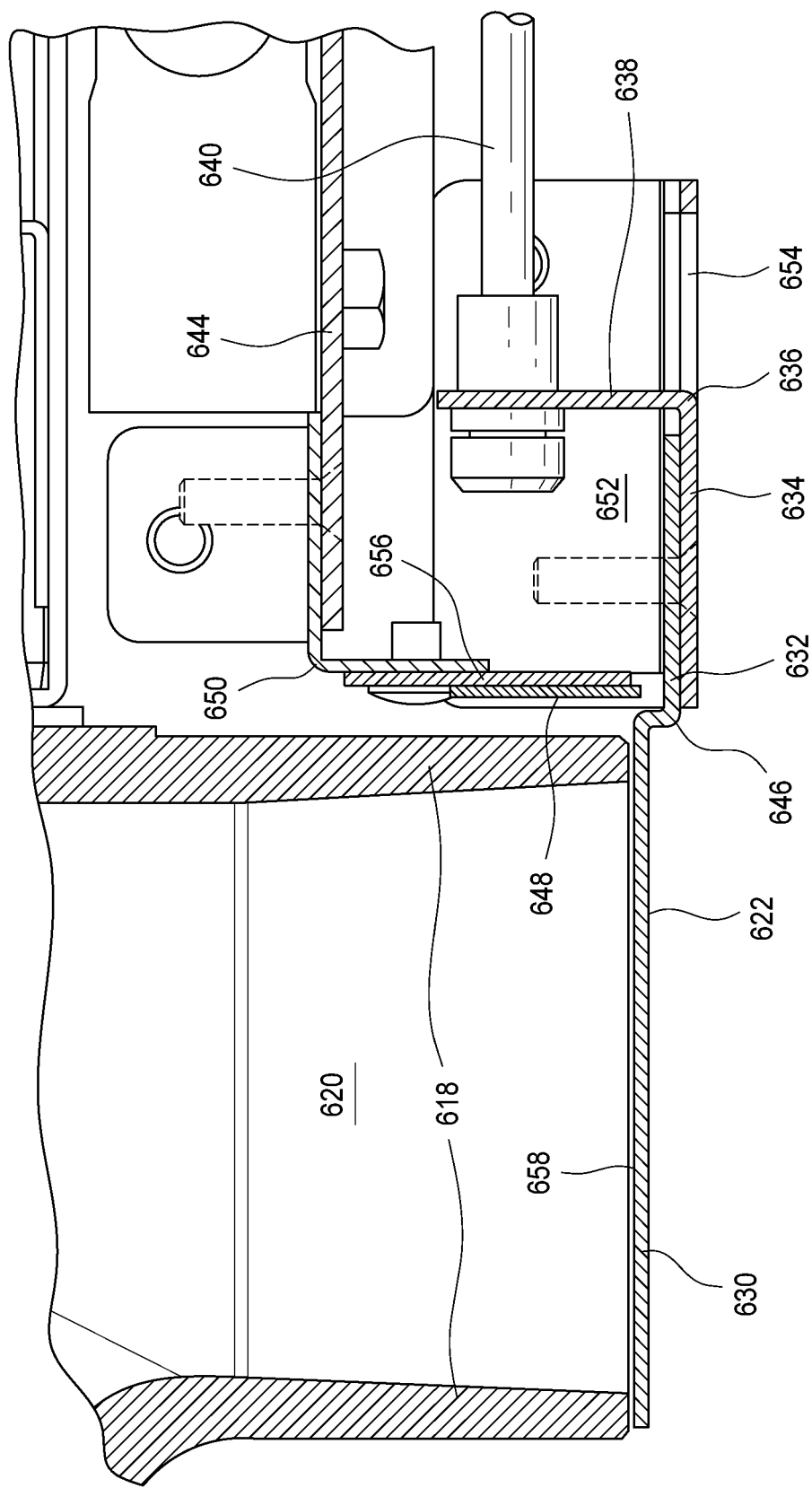
Figure 49:
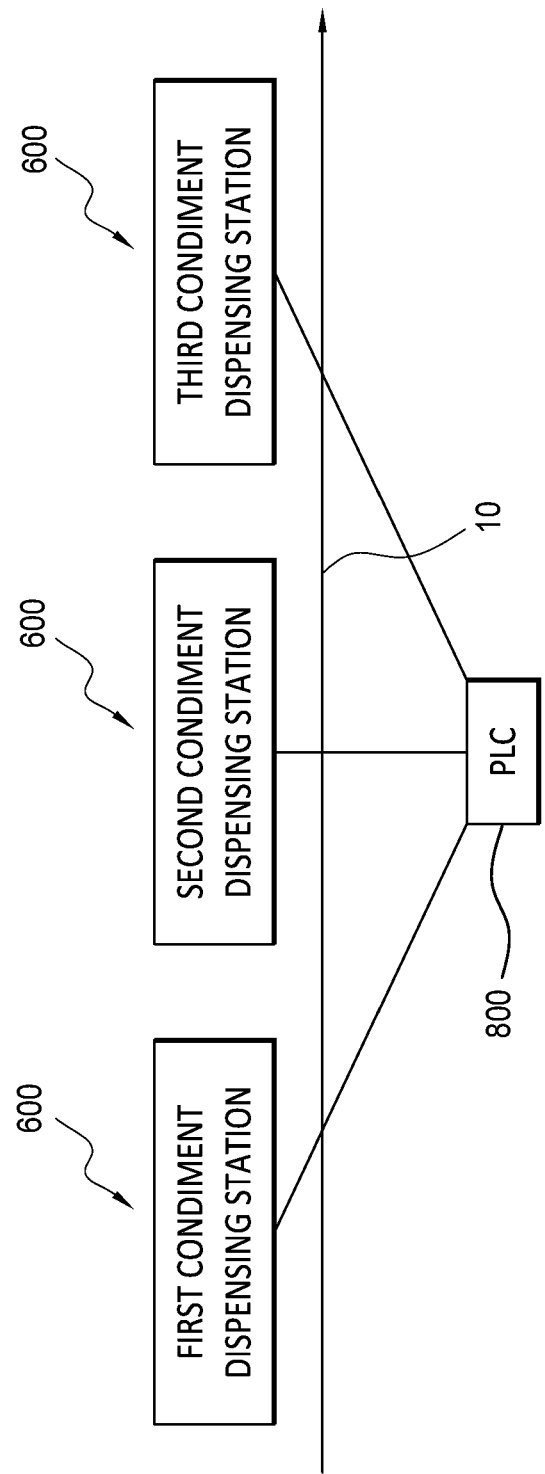
Figure 50:
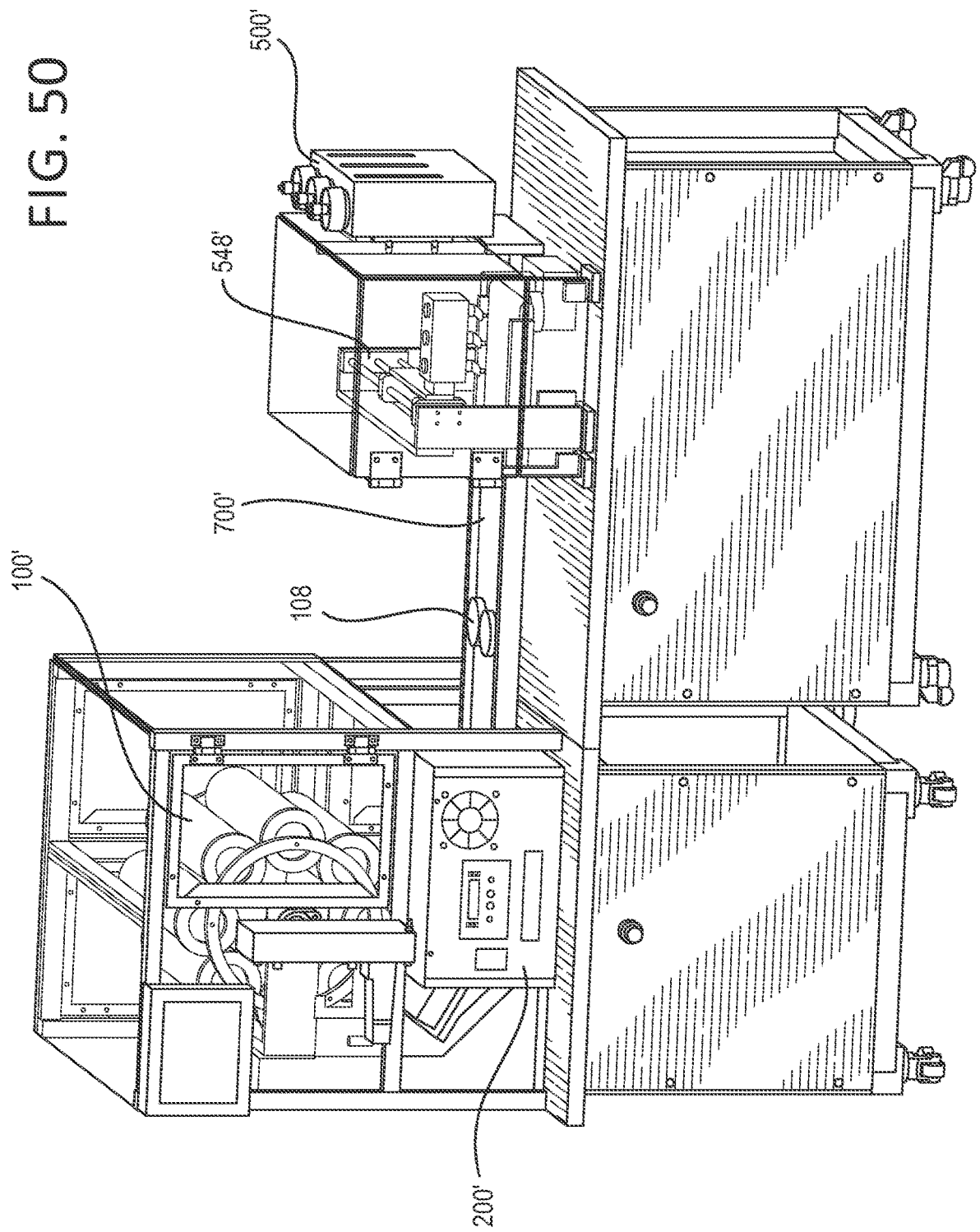
Figure 52:
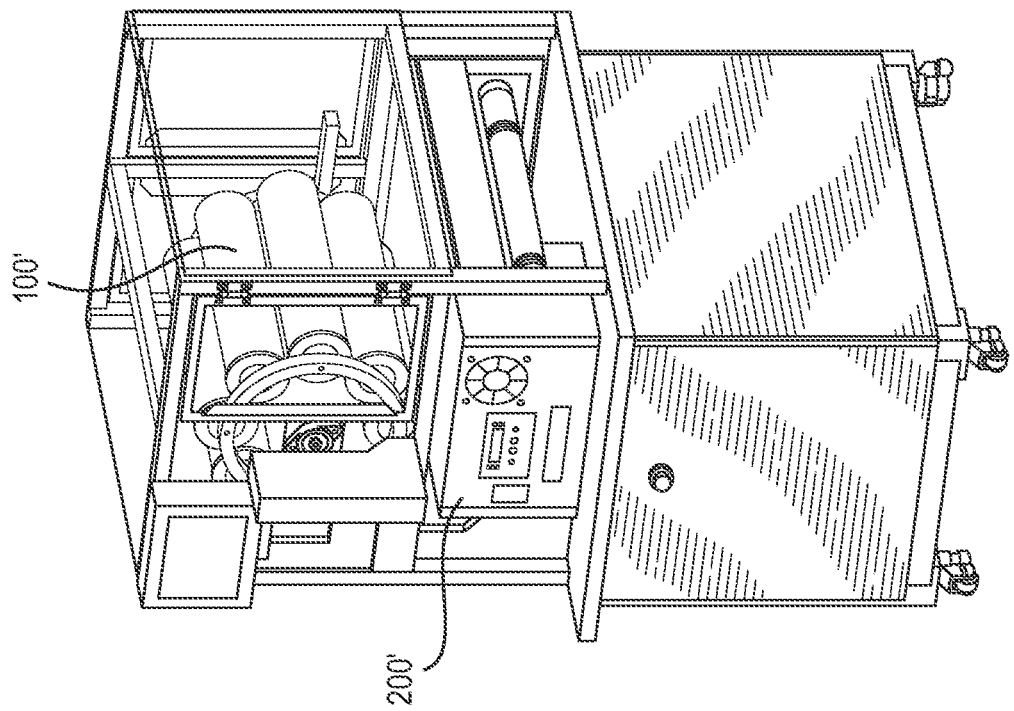
Figure 51:
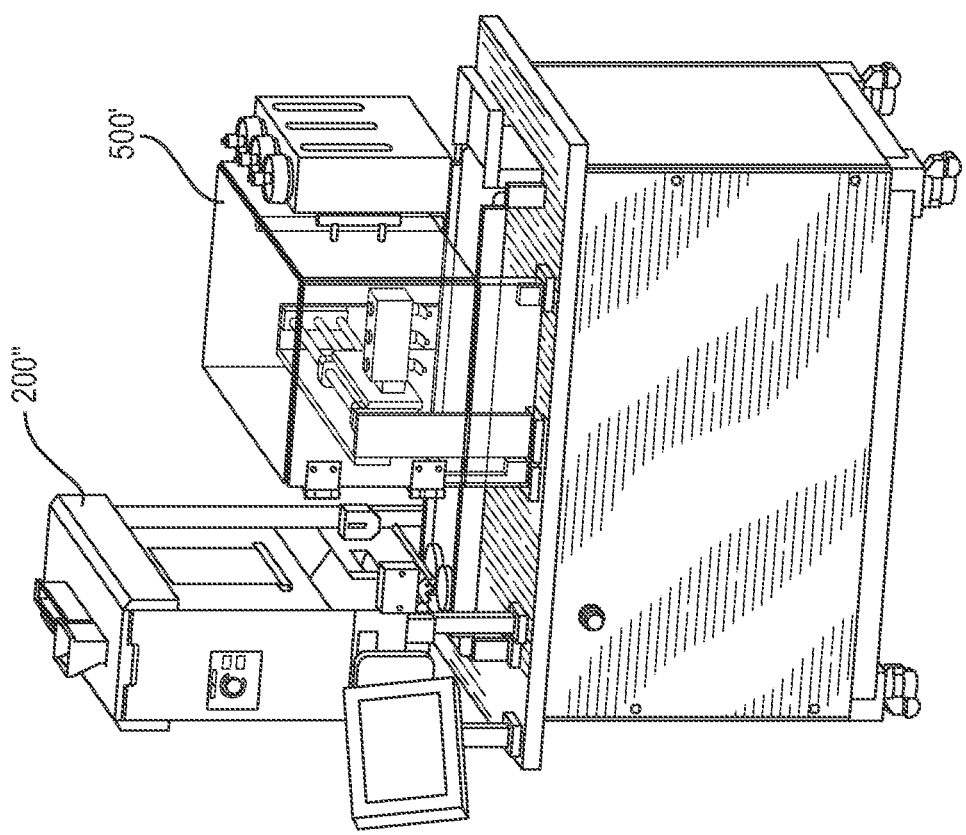

FIG. 5 is an enlarged, partial front view of FIG. 4 wherein the front doors and/or covers of the cabinet have been removed so as to more clearly disclose the vertically oriented carousel or endless conveyor mechanism of the new and improved automated bun feeding system, as well as one of the star wheel components of the carousel or endless conveyor system, the proximity sensor, and its associated flag for initially calibrating the carousel or endless conveyor system;

FIG. 6 is an enlarged, partial rear view of FIG. 4 disclosing the rotary encoder utilized with the timing belt of the carousel or endless conveyor system;

FIG. 7 is a rear perspective view of the carousel or endless conveyor system showing the rotary encoder, the timing belt, and the annular rings upon which the external tubes of the bun storage tubes are disposed in contact with each other so as to collectively be supported within the carousel or endless conveyor system;

FIG. 8 is a cross-sectional, perspective view of the carousel or endless conveyor system disclosing part of the framework within which the carousel or endless conveyor system is disposed;

FIG. 9 is a side-elevational, cross-sectional view similar to that of FIG. 8 disclosing part of the framework within which the carousel or endless conveyor system is disposed;

FIG. 10 is an external perspective view of one of the bun storage tubes;

FIG. 11 is a longitudinal cross-sectional view of the bun storage tube disclosed within FIG. 10;

FIG. 12 is a schematic view disclosing the gripper mechanism utilized for removing and replacing the front end cap of the bun storage tube;

FIG. 13 is a schematic view disclosing the motor drive system utilized for moving the pusher block mechanism adapted to engage the rear end cap of the bun storage tube so as to incrementally advance the buns disposed within the bun storage tube for dispensing or discharge of the buns disposed within the bun storage tube;

FIG. 14 is a cross-sectional view of the motor drive system as disclosed within FIG. 13;

FIG. 15 is a perspective view of the bun separator;

FIG. 16 is a cross-sectional view of the apparatus disclosing the bun gate at its elevated position at which the bun gate is interposed between the uppermost bun storage tube and the bun separator;

FIG. 17 is a cross-sectional view of the crown housing section of the bun separator showing the actuator for the crown shelves as well as the actuator for the rear plate member of the crown housing section of the bun separator;

FIG. 18 is an enlarged perspective view corresponding to that of FIG. 16 disclosing the bun gate and its bun presence sensor;

FIG. 19 is a perspective view of the bun rotator mechanism;

FIG. 20 is a perspective view showing the laterally movable bun separator as suspendingly supported from its mounting rail and movable with respect to the floor angle iron, as well as with respect to the chute member so as to deposit bun sections upon the chute member depending upon the lateral disposition of the bun separator;

FIG. 21 is a cross-sectional view of one of the bun rotators of the rotator assembly;

FIG. 22 is a schematic view showing the mounting of the bun rotator assembly upon its two actuator systems for movement in longitudinal and transverse or XY directions, as well as its connection to a rotary actuator for permitting the bun rotator to be moved in opposite 180° directions;

FIG. 23 is a perspective view of the toaster appliances as well as the conveyor mechanism operatively associated therewith;

FIG. 24 is a first embodiment of a bun pickup device for retrieving a toasted bun from the conveyor mechanism as shown in FIG. 23;

FIG. 25 is a perspective view of a second embodiment of a bun pickup device for retrieving a toasted bun from the conveyor mechanism as shown in FIG. 23;

FIG. 26 is a vertical cross-sectional view of FIG. 25 more clearly showing the operation of the various components of the second embodiment of the bun pickup device for retrieving a toasted bun from the conveyor mechanism as shown in FIG. 23;

FIG. 27 is a front, top perspective view showing the overall automatic packaging dispensing system constructed in accordance with the principles and teachings of the present invention;

FIG. 28 is a front perspective view showing the packaging box sub-system comprising the plurality of packaging box assemblies which are fixedly secured upon a mounting plate which, in turn, is fixedly secured to a linear belt drive such that the plurality of packaging box assemblies can be moved transversely upon guide rails in order to properly position one of the packaging box assemblies beneath the vacuum suction cup gripping system;

FIG. 29 is a rear perspective view of the mounting plate of FIG. 28 illustrating how the mounting plate is fixedly connected to the motor-driven linear belt drive;

FIG. 30 is a perspective view illustrating the various components comprising one of the packaging box assemblies, including the vertically oriented guide rods which will engage side portions of the packaging boxes so as to maintain the packaging boxes stationary within the packaging box assemblies both in longitudinal or forward/backward as well as lateral or side-to-side modes;

FIG. 31 is an enlarged perspective view of the upper ends of the guide rods as mounted within the peripheral framework of the packaging box assemblies so as to permit the guide rods to be adjusted laterally with respect to each other so as to be capable of accommodating different packaging boxes having different width dimensions;

FIG. 32 is a plan view of a typical packaging box showing the corner interconnections between the upper and lower half sections of the packaging box which is where the vertically oriented guide rods of FIG. 30 will be disposed so as to properly engage the packaging boxes;

FIG. 33 is a side perspective view of the vacuum suction cup gripping assembly illustrating the vertically oriented servo drive motor for moving the plurality of suction cups vertically upwardly and downwardly;

FIG. 34 is an enlarged perspective view of the vacuum suction cup gripping assembly as illustrated within FIG. 33 illustrating the mounting of the vertically oriented servo drive motor upon a mounting plate which is fixedly connected to a horizontally oriented servo drive motor which is utilized for moving the vacuum suction cup gripping assembly in forward and backward modes so as to properly position the vacuum suction cup gripping assembly over a packaging box or a wrapping paper packaging sheet disposed within one of the trays of the wrapping paper packaging sub-system;

FIG. 35 is a perspective view of the wrapping paper packaging sub-system illustrating the plurality of horizontally oriented, vertically spaced paper trays mounted within a wrapping paper packaging housing and respectively containing a plurality of different wrapping paper packaging sheets;

FIG. 36 is an enlarged front, right side, perspective view illustrating how the wrapping paper packaging housing is fixedly connected to a vertically oriented actuator whereby actuation of the actuator, the wrapping paper packaging housing is moved upwardly and downwardly;

FIG. 37 is rear view of the wrapping paper packaging sub-system illustrating the mounting of the wrapping paper packaging housing upon vertically oriented guide rods fixedly secured to a rear wall of the sub-system, as well as the tray extension cylinder/actuator for moving a selected one of the plurality of wrapping paper trays outwardly from the wrapping paper packaging housing or for returning the selected tray back into the wrapping paper packaging housing once a particular wrapping paper packaging sheet has been removed from the selected tray;

FIG. 38 is a top plan view of one of the wrapping paper packaging trays illustrating additional details as to how the wrapping paper packaging trays are mounted upon the vertically oriented guide rails for vertical movement;

FIG. 39 is a perspective view of one of the wrapping paper packaging trays illustrating adjustable positioning guides disposed within the wrapping paper packaging tray such that any one of the plurality of wrapping paper packaging trays can accommodate any particularly sized wrapping paper packaging sheets, as well as an aperture which is formed within a relatively central portion of the wrapping paper packaging tray for cooperating with a sensor to indicate that the supply of wrapping paper packaging sheets has been depleted;

FIG. 40 is a schematic view of the new and improved automatic sauce dispensing system as developed by means of the principles and teachings of the present invention and shown incorporated within the automated food preparation line;

FIG. 41 is an enlarged view of the new and improved automatic sauce dispensing system as developed by means of the principles and teachings of the present invention and wherein the plurality of canister/sauce container assemblies are adapted to be mounted upon its mounting plate and have removable canister caps and quick disconnect fittings which are respectively adapted to be connected to a source of air or pneumatic pressure and to fluid conduits or hoses leading to valve banks comprising the solenoid-controlled dispensing valves for dispensing the particular sauces;

FIG. 42 is an enlarged schematic cross-sectional view of one of the canister/sauce container assemblies disclosing the outer canister, the inner sauce container, the upper removable canister cap, and the lower quick disconnect fitting;

FIG. 43 is a schematic side elevational view of one of the canister/sauce container assemblies as mounted upon its pivotable mounting brackets such that the canister/sauce container assembly can be moved between its upper and lower positions;

FIG. 44 is a perspective view of a plurality of canister/sauce container assemblies as mounted upon the automatic sauce dispensing system network wherein it can be appreciated how the plurality of canister or sauce container assemblies are operatively connected to the pair of valve banks containing the plurality of sauce dispensing valves, and how the pair of valve banks, containing the plurality of sauce dispensing valves, are operatively connected to their servo motors for moving the pair of valve banks along their guides in a direction transverse to or across the directional movement of the food product conveyors disposed beneath the pair of valve banks;

FIG. 45 is a schematic perspective view of a pinch valve assembly which is one exemplary type of valve that may be utilized within the valve bank and in conjunction with the lower end portion of the fluid conduit fluidically connecting the sauce container to the valve bank so as to permit dispensing of the particular sauce onto a food product or for preventing the dispensing of the particular sauce onto a food product;

FIG. 46 is a schematic cross-sectional view of the pinch valve disclosed within FIG. 45;

FIG. 47 is effectively a cross-sectional view of the new and improved automated condiment dispensing system as constructed in accordance with the principles and teachings of the present invention and showing the dispensing system when the valve mechanism or weighing gate is disposed at its closed position thereby retaining the condiment within the condiment chamber and preventing the condiment from being discharged onto a food item adapted to be disposed beneath the condiment chamber;

FIG. 48 is an enlarged detailed cross-sectional view disclosing how the valve mechanism or weighing gate, as disclosed within FIG. 47, is operatively connected to an air cylinder actuator such that when actuated, the air cylinder can move the valve mechanism or weighing gate, past a vertically oriented scraper mechanism, such that all condiment material is removed from the valve mechanism or weighing gate and discharged from the lower discharge end portion of the condiment chamber; and FIG. 49 is a schematic drawing showing a plurality of automated condiment dispensing systems, as has been disclosed within FIGS. 47 and 48, which are located at a plurality of condiment dispensing stations located along the automatic food preparation line, and operatively connected to a central programmable logic controller (PLC) such that the programmable logic controller (PLC) and the plurality of automated condiment dispensing systems are able to communicate with each other by means of two-way communication links whereby various operational parameters of the plurality of automated condiment dispensing systems are able to be communicated to the programmable logic controller (PLC) and the programmable logic controller (PLC) can transmit appropriate control signals to the plurality of condiment dispensing systems such that multiple condiment dispensing operations can be achieved simultaneously;

FIG. 50 is a schematic perspective view of a first shortened or abbreviated modular automatic food preparation line wherein, for example, an automatic bun handling system and toaster appliance can be operatively connected to an automatic sauce dispensing system;

FIG. 51 is a schematic perspective view of a second shortened or abbreviated modular automatic food preparation line wherein, for example, a manually-loaded toaster appliance can be operatively connected to an automatic sauce dispensing system; and FIG. 52 is a schematic perspective view of a third shortened or abbreviated modular automatic food preparation line wherein, for example, an automatic bun handling system and toaster appliance are operatively connected together.

DETAILED DESCRIPTION OF THE ILLUSTRATED EMBODIMENTS

Figure 1:
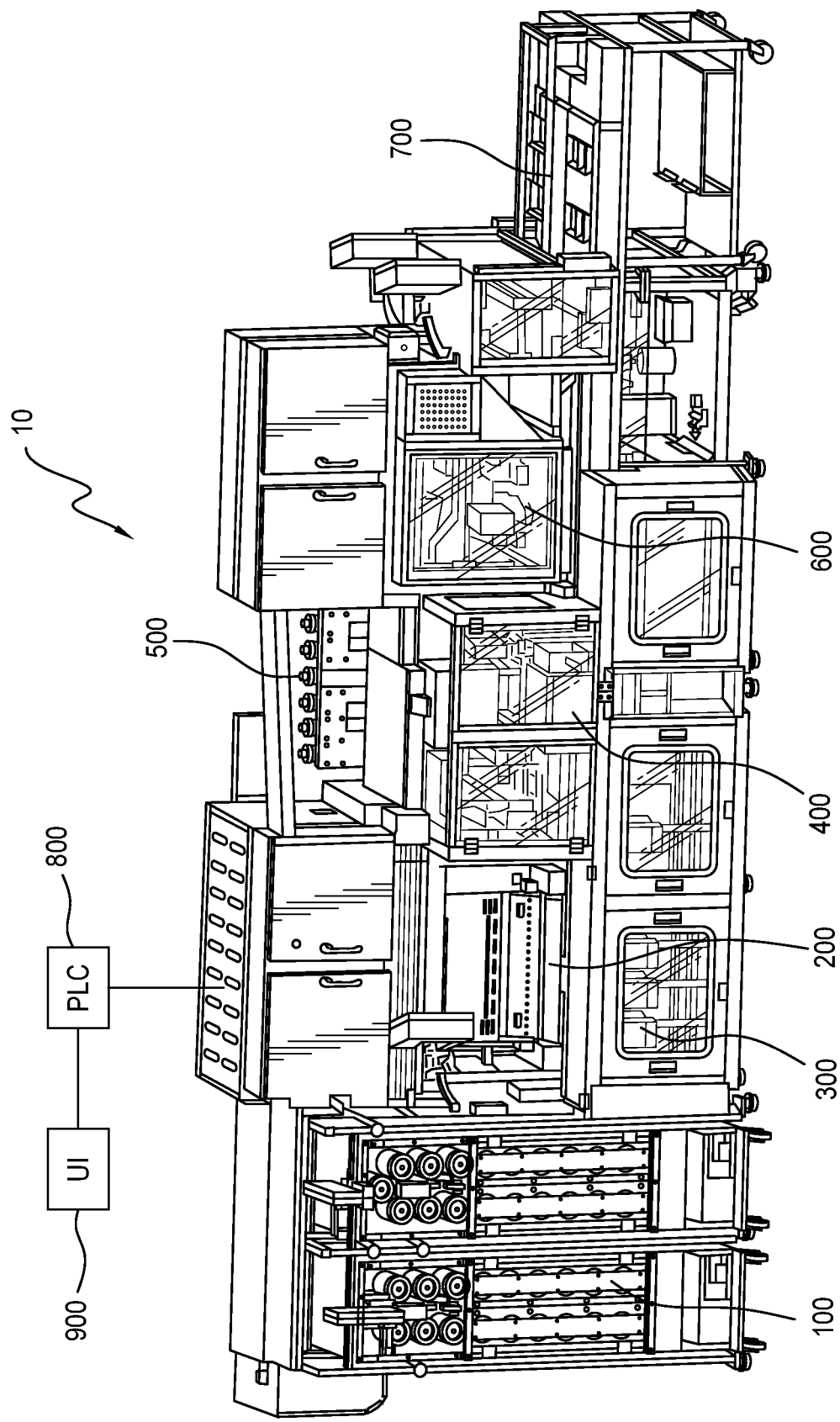
FIG. 1 is a schematic front elevational view of a new and improved automatic food preparation line constructed in accordance with the principles and teachings of the present invention and which includes the bun handling system, the bun toasting equipment, the box packaging system, the paper wrapping packaging system, the sauce dispensing system, and the condiment dispensing system.

Referring now to the drawings, and more particularly to FIG. 1 thereof, the new and improved automatic food preparation line, as invention, is disclosed and is generally indicated by the reference character 10. More particularly, it is seen that the new and improved automatic food preparation line 10 is seen to comprise a bun handling system 100 wherein a plurality of different types of buns are stored and from which particular buns are dispensed, a toaster appliance 200 which is adapted to receive the buns from the bun handling system 100, a box packaging system 300 from which different particular boxes can be retrieved for containing the buns which will become parts of the finished food item, a wrapping paper packaging system 400 from which different wrapping papers can be retrieved for containing the buns which will become parts of the finished food item, a first sauce-type condiment dispensing system 500 for dispensing one or more selected sauces onto the buns after the buns have been placed within the particular box or wrapping paper packaging, a second non-sauce condiment dispensing system 600 for dispensing one or more selected non-sauce condiments onto the buns, a longitudinal conveyor system 700 for conveying the buns along the food preparation line 10, and a programmable logic controller (PLC) 800 which controls all operations of all of the individual systems and their components and into which patrons can order their food items precisely as desired by inputting specific commands into a user interface (UI) 900 operatively connected to the programmable logic controller (PLC) 800. It is to be noted that the second condiment dispensing system 600 can comprise one or more condiment dispensing appliances such that a plurality of different condiments, such as, for example, shredded lettuce, shredded onions, shredded cheese, and the like, can be deposited onto the buns in accordance with preselected or preordered items inputted into the programmable logic controller (PLC) 800 by the patron at the point-of-sale (POS) location using the user interface (UI) 900. Lastly, while the disclosure will effectively be oriented toward buns for hamburgers, it is to be understood that the overall automatic food preparation line 10 can also apply to any bread products for making sandwiches or other types of food items.

Figure 2:
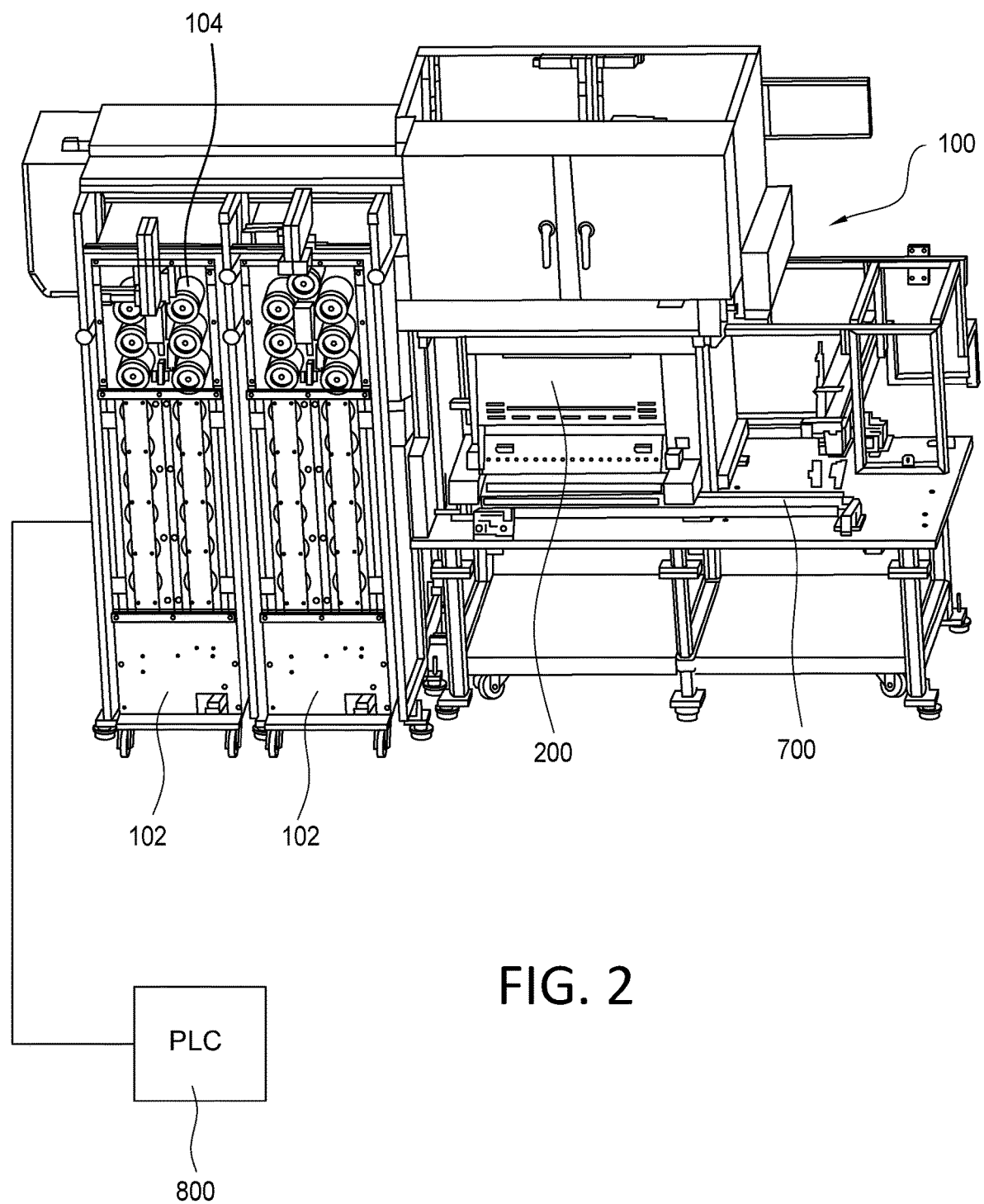
FIG. 2 is a schematic perspective view of a new and improved automated bun feeding and toasting system as constructed in accordance with the principles and teachings of the present invention and is a first major component of the automatic food preparation line.
Figure 3:
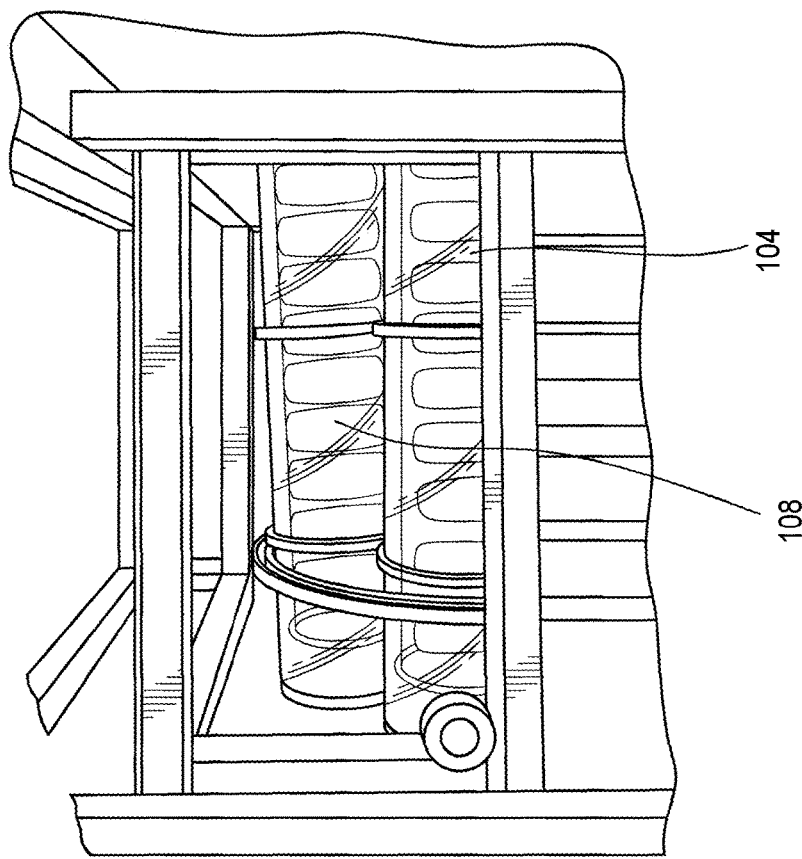
FIG. 3 is a side elevational view showing a plurality of bun storage tubes disposed within the vertically oriented carousel or endless conveyor mechanism of the apparatus of FIG. 2 wherein a multitude or plurality of buns are serially arranged within each bun storage tube.

With reference now being made to FIGS. 2-4, it is seen that the bun handling system 100 comprises a pair of bun storage cabinets 102 for housing a multitude or a plurality of bun storage tubes 104. Of course, it is to be noted that the system 100 may comprise more than two bun storage cabinets 102 as may be deemed desirable or required in connection with the efficient operation of the particular food establishment within which the bun handling system 100 is being utilized. It is seen that the plurality of bun storage tubes 104 are arranged within a substantially vertical, elliptical array effectively forming an endless conveyor or carousel system, which will be described more fully hereinafter, by means of which any particular one of the multitude or plurality of bun storage tubes 104 may be moved from any one of its positions, as disclosed within FIGS. 2-4, to the twelve o'clock or top dead center position, which comprises the bun dispensing position, as can be clearly appreciated from FIGS. 2-4 and which has been denoted by the reference character 106. It is further seen that each bun storage tube 104, comprising a bun storage tube 104 of each set of bun storage tubes disposed within each one of the pair of bun storage cabinets 102, comprises an elongated, horizontally disposed tubular structure within which a plurality of buns 108 are disposed, as best seen in FIG. 3, and may comprise, for example, conventional buns utilized in making hamburgers or Big Macs©. It is to be appreciated that the multitude or plurality of bun storage tubes 104 are adapted to house or contain a variety of buns, such as, for example, a heel or crown type bun which will be used to form a conventional sandwich or hamburger, and/or an intermediate or club bun which can be used, for example, when making a Big Mac® type hamburger sandwich which requires three buns to comprise such type of sandwich. In addition, it is also noted that the multitude or plurality of bun storage tubes 104 can house or contain a diverse variety of buns, such as, for example, whole wheat buns, whole grain buns, multi-grain buns, sour dough buns, and the like, which will be preselected by means of the food patron when the food patron originally places his or her order at the "point of sale" (POS) location within the eatery.

It is further noted that the purpose of having or utilizing a pair of bun storage cabinets 102, effectively disposed in a side-by-side manner within the overall bun-handling system 100, is to enable the overall bun-handling system 100 to simultaneously perform two different operations which are necessary to the overall efficient operation of the food preparation line 10. For example, while the endless conveyor system, operatively associated with a first set of bun storage tubes 104 disposed within a first one of the pair of bun storage cabinets 102, is actuated such that the multitude or plurality of bun storage tubes 104, disposed within the first one of the pair of bun storage cabinets 102, is moved such that a particular one of the bun storage tubes 104 is moved to, or disposed at, the dispensing position or location 106 of the bun storage cabinet 102, which, as previously noted, is effectively defined as being at the twelve o'clock or top dead center position, the endless conveyor system, operatively associated with the second set of bun storage tubes 104 disposed within the second one of the pair of bun storage cabinets 102, can be actuated such that the multitude or plurality of bun storage tubes 104 disposed within the second one of the pair of bun storage cabinets 102 can likewise be moved to its twelve o'clock or top dead center dispensing position or location 106. In this manner, significant operational time is saved as opposed to what would otherwise be required if only a single storage cabinet 102, containing a multitude or plurality of bun storage tubes 104, was employed. More particularly, for example, in such case where only a single storage cabinet 102, containing a multitude or plurality of bun storage tubes 104, was employed, after a particular one of the multitude or plurality of bun storage tubes 104 was disposed at the dispensing position or location 106 such that a first bun could be discharged or dispensed therefrom, then the endless conveyor system, operatively associated with that single set of a multitude or plurality of bun storage tubes 104, would have to be activated so as to now move the same set of the multitude or plurality of bun storage tubes 104 so as to effectively position a second one of the multitude or plurality of bun storage tubes 104 at the dispensing position or location 106 so as to in fact permit a second bun to be discharged from the second one of the multitude or plurality of bun storage tubes 104.

With reference continuing to be made to FIGS. 5-9, the disposition of the multitude or plurality of bun storage tubes 104 within the vertically oriented conveyor system, as well as the operation of the vertically oriented conveyor system, will now be described. As can best be seen from FIGS. 5-9, each one of the multitude or plurality of bun storage tubes 104 is provided with a pair of axially spaced, fore and aft, supporting rings 110 annularly encircling the outer peripheral surface portion of each one of the multitude or plurality of bun storage tubes 104. Accordingly, it can be appreciated that the multitude or plurality of bun storage tubes 104 are effectively disposed in contact with, or are engaged with, each other as a result of each pair of axially spaced, fore and aft, supporting rings 110 of a first one of the multitude or plurality of bun storage tubes 104 being in contact with, or engaged with, the pair of axially spaced, fore and aft, supporting rings 110 of second and third ones of the multitude or plurality of bun storage tubes 104 disposed upon opposite sides of the first one of the multitude or plurality of bun storage tubes 104, as considered in the counterclockwise movement direction of all of the multitude or plurality of bun storage tubes 104. It is to be noted that while the multitude or plurality of bun storage tubes 104 has been generally indicated by the reference character 104, in reality, the actual bun storage tubes 104 are removably disposed within outer tubular structures which are fixedly mounted within the framework of the bun-handling system 100 and upon which the supporting rings 110 are affixed.

This structure permits the actual interior bun storage tubes 104 to be removed from the external tubular structures so that individual bun storage tubes 104 may be refilled with buns 108 when a particular supply of buns 108 within a particular bun storage tube 104 has been depleted, or alternatively, the depleted bun storage tube 104 can be simply removed from the bun-handling system 100 and replaced by means of a new bun storage tube 104 containing a complete, fresh supply of buns 108. Reverting back to the disposition of the bun storage tubes 104 within the carousel or endless conveyor, the only exception to this relative disposition defined between the multitude or plurality of bun storage tubes 104 being disposed in contact with, or engaged with, its oppositely disposed adjacent ones of the multitude or plurality of bun storage tubes 104 is when a particular one of the multitude or plurality of bun storage tubes 104 is disposed at the twelve o'clock or top dead center bun dispensing position 106, as will be explained shortly hereinafter. Furthermore, it is seen that the multitude or plurality of bun storage tubes 104 are additionally, in effect, confined both axially and transversely within a framework formed within each bun storage cabinet 102. More particularly, as can best be appreciated from FIGS. 5-9, each bun storage cabinet 102 comprises left and right side walls 112,114, as viewed, for example, within FIG. 4, and internally within each bun storage cabinet 102, and adjacent to each one of the side walls 112,114, there is provided a pair of axially spaced, vertically extending frame members 116,118, as best seen in FIGS. 6-8, which are fixedly connected together by means of a plurality of horizontally oriented, vertically spaced connectors 120.

In a similar manner, as can best be seen or appreciated from FIG. 7, a pair of axially spaced, vertically extending frame members, only one of which is shown at 122, are interposed between the oppositely disposed vertically oriented serial arrays of bun storage tubes 104, so as to effectively be disposed along the centerline of each bun storage cabinet 102, and are connected together by means of a plurality of horizontally extending, vertically spaced connectors 124, only one of which is shown. In addition, it is also seen that in order to, in effect, complete the framework within which the plurality or multitude of bun storage tubes 104 will be disposed, confined, and moved along their substantially elliptical conveyor path, a pair of axially spaced arcuate frame members 126,128, as can best be seen in FIGS. 4-9, are adapted to engage fore and aft external peripheral surface portions of the three uppermost and three lowermost bun storage tubes 104 as can also be seen and appreciated from FIG. 4. The arcuate frame members 126, 128 are fixedly connected to additional vertically oriented frame members 130,132 which can also be seen in FIGS. 7-9. Still further, as can be best appreciated from FIG. 9, the annular rings 110, surrounding each one of the multitude or plurality of bun storage tubes 104, are engaged with axially forward and aft edge portions of the axially spaced, vertically extending frame members 116,118. Accordingly, it can be readily appreciated that the plurality or multitude of bun storage tubes 104 are effectively locked in position, or at least confined or restrained with respect to any substantial axial or transverse movements, with respect to the framework defined within each bun storage cabinet 102 except for the movements of the plurality or multitude of bun storage tubes 104 along the substantially elliptically defined conveyor path effectively formed within each one of the bun storage cabinets 102 by the frame members 126,128,130, 132.

Continuing further, and with reference being made to FIGS. 4-7 and 9, the drive system for the substantially elliptical endless conveyor system will now be described. As illustrated within FIG. 4, a motor drive 134 is disposed within the bottom portion of each bun storage cabinet 102 and is operatively connected to a gearbox 136 wherein the output shaft of the gearbox 136 is provided with a first small pulley 138. The small pulley 138 is operatively connected to a large pulley 140 by means of a pulley belt 142, and as can best be seen in FIG. 9, the large pulley 140 is mounted upon one end of a first lower rotary shaft 143. A first sprocket shaft 144 is fixedly mounted upon a central portion of rotary shaft 143 and has one end of an endless timing belt 146 disposed therearound. The endless timing belt 146 extends vertically upwardly such that an upper end portion of the endless timing belt 146 is likewise disposed around a second sprocket shaft 148 which is fixedly mounted upon a central portion of a second upper rotary shaft 150 which is operatively connected at one end thereof to a rotary encoder 152 which is enclosed within a covered box 154. As can best be seen from FIGS. 5,6, and 9, a pair of axially spaced star wheels 156,158 are fixedly mounted upon both the first lower rotary shaft 143 and the second upper rotary shaft 150, and the radially outwardly projecting fingers of the star wheels 156,158 are adapted to be inserted between adjacent bun storage tubes 104 so as to effectively separate the bun storage tube 104 that is approaching the uppermost or top dead center position 106 from its next adjacent or trailing bun storage tube 104, as considered in the counterclockwise rotational direction of the apparatus as disclosed within FIG. 4, and thereby move the separated bun storage tube 104 into the uppermost or top dead center position 106 in preparation for the discharge of a bun from such bun storage tube 104 which is now designated as bun tube. A proximity sensor 160 is fixedly mounted within the framework of the bun storage cabinet 102 at a position adjacent to the uppermost or top dead center bun dispensing position 106 as occupied by means of the uppermost bun storage tube 107, and a flag 162 is fixedly mounted upon the star wheel 156 as can best be seen in FIG. 5. When the flag 162 is properly aligned with the proximity sensor 160, then it is assured that the uppermost bun storage tube 107 is in fact precisely located at the uppermost or top dead center bun dispensing position 106, as a result of which the rotary encoder 152 can then precisely cause the movement of any one of the bun storage tubes 104 to the top dead center or bun discharge position 106 under the control of a suitable master controller, such as, for example, the programmable logic controller (PLC) 800 which, of course, is directly linked to, or otherwise in communication with, the "point of sale" (POS) location at which a patron inputs his or her food item order whereby processing of the patron's food item order can then be implemented. In fact, the master controller or programmable logic controller (PLC) 800 controls all movements of all components within the overall system 10 by means of signals sent to the movable components in response to signals received, for example, from various sensors effectively telling the master controller or programmable logic controller (PLC) 800 that a previous operation has been completed and that the next operation needs to be implemented.

With reference then being made to FIGS. 10-14, a detailed description of one of the multitude or plurality of bun storage tubes 104 disposed within the bun storage cabinet 102, the opening of the bun storage tube 104 as a result of the removal of its end cap, and the use of a stepper motor to successively incrementally dispense the lead buns housed within the bun storage tube 104, will now be described. More particularly, it is seen that each bun storage tube 104 comprises a bun storage tube housing 164, within which a plurality of buns, not shown, are to be stored, a front end cap 166 removably disposed upon the front or discharge end of the bun storage tube housing 164, and an annular rear end cap 168 fixedly mounted upon the rear end of the bun storage tube housing 164. The front end cap 166 is provided with an annular bushing 170 which is fixedly mounted within the front end cap 166, and a counterbored region 172 is defined behind the annular bushing 170. As can be seen or appreciated from FIG. 11, the counterbored region 172 has a diametrical extent which is somewhat less than the diametrical extent of the annular bushing 170, but since it comprises a counterbored region, it effectively defines an open space behind the annular bushing 170. In addition, as can best be seen in FIG. 12, a chuck or gripper mechanism 174, comprising, for example, three or four gripper fingers 176 which are movable between radially inner and radially outer positions as a result of pneumatic fluid being alternatively provided to two different fluid ports, not shown, defined within the chuck or gripper mechanism 174, is movable between forward and aft, or left and right, positions, as viewed within FIG. 12, by means of a gripper air cylinder mechanism 178 which is likewise pneumatically actuated.

Accordingly, when it is desired to remove the front end cap 166 of a particular bun storage tube 104, the chuck or gripper mechanism 174 is initially activated such that the plurality of gripper fingers 176 are collectively or simultaneously moved to their radially innermost position. Subsequently, the gripper air cylinder mechanism 178 is activated so as to effectively move the chuck or gripper mechanism 174 to the left, as viewed within FIG. 12, whereby the plurality of gripper fingers 176 will pass axially through the annular bushing 170 and into the counterbored region 172. At this time, the plurality of gripper fingers 176, which are provided with first, radially outwardly extending lip portions 180, will engage the a first annular rear lip portion 182 of the bushing 170 of the front end cap 166 of the bun storage tube 104, and upon reversal of movement of the chuck or gripper mechanism 174, by means of the gripper air cylinder mechanism 178, the chuck or gripper mechanism 174 will remove the front end cap 166 from the bun storage tube 104 as a result of the engagement of the gripper fingers 176 with the rear surface portion of the bushing 170. The buns, not shown, stored within the bun storage tube 104 are now ready to be dispensed or discharged from the front end portion of the bun storage tube 104. It is also noted that the plurality of gripper fingers 176 of the gripper mechanism 174 are also collectively provided with second, radially outwardly extending lip portions 184 which are adapted to engage an annular front lip portion 186 of the bushing 170 so as to permit the end cap gripper mechanism 174 to replace the front end cap 166 onto the bun storage tube 104 as a result of a reversal of the operations previously noted in connection with the removal of the front end cap 166 from the bun storage tube 104.

Continuing further, and with reference again being made to FIGS. 10-14, it is seen that the annular rear end cap 168 is provided with a central opening 188, and that a bun tube puck 190 is disposed within the rear end portion of the bun storage tube 104 such that the leftwardmost surface portion of the bun tube puck 190 is engaged with an interior annular surface portion of the annular rear end cap 168, while the rightward portion 192 of the bun tube puck 190, which has a substantially arcuate or conical configuration as best seen in FIG. 11, is adapted to engage the trailing one of the plurality of buns, not shown, disposed within the bun storage tube 104. The bun tube puck 190 is adapted to be axially movable within the bun storage tube 104, in a precisely controlled incremental manner, so as to successively force or discharge the buns, not shown but disposed within the bun storage tube 104, out from the forward or discharge end of the bun storage tube 104. In order to accomplish this incremental movement of the bun tube puck 190, a pusher block 194, as seen in FIGS. 13 and 14, is adapted to be inserted into the central opening 188 defined within the annular rear end cap 168 of the bun storage tube 104. The pusher block 194 is fixedly connected to one end of a rigid chain 196 which is adapted to be routed around a sprocket wheel 198 which is fixedly mounted upon the rotary shaft 1000 of a stepper motor 1002. It is to be noted that a rigid chain, such as that disclosed at 196, is well known in the art and effectively comprises a chain that can be bent or displaced in only one direction. So, for example, as illustrated within FIG. 14, while the rigid chain 196 can effectively be bent or coiled around the sprocket wheel 198 in a substantially counterclockwise manner as viewed within FIG. 14, the rigid chain 196 cannot be bent in the opposite direction. Therefore, as it extends from the sprocket wheel 198 to its fixed connection with the pusher block 194, the chain 196 will effectively remain rigid and linear, will act as a linear actuator, and will effectively impart linear movement to the pusher block 194 and, in turn, to the bun tube puck 190, as the stepper motor 1002 causes its rotary drive shaft 1000, and the sprocket wheel 198 fixedly mounted thereon, to rotate, so as to in fact cause the incremental successive discharge of buns, not shown, from the discharge end of the bun storage tube 104. It is to be understood that the motor drive 1002 will be controlled by means of a rotary encoder, not shown, which will be under the control of the programmable logic controller (PLC) 800 so as to achieve the incremental movement and discharge of the buns, not shown, With reference now being made to FIGS. 15-18, a bun separator assembly 1100 is disclosed and is seen to comprise three bun housing sections 1102,1104,1106 which are respectively provided to house or accommodate a bottom or heel section of a bun, an intermediate or club section of a bun, and a top or crown section of a bun. All three bun housing sections 1102,1104,1106 are integrally mounted or fixed upon a laterally movable framework 1108, as is the end cap gripper mechanism 174, such that the end cap gripper mechanism 174 moves laterally to the left or right, as viewed within FIG. 15, along with the bun housing framework 1108. Accordingly, when a bun 108 is to be dispensed or discharged from the front end of one of the bun storage tubes 104, the front end cap 166 is initially removed by means of the end cap gripper mechanism 174 as has been previously disclosed and described, and subsequently, the laterally movable framework 1108 is moved laterally toward the left, as viewed within FIG. 15, so as to, for example, now, in effect, coaxially align the heel housing section 1102 with the bun storage tube 104 from which a heel section of a bun 108 may be dispensed or discharged into the heel housing section 1102 as a result of the actuation of the pusher block 194 as has been previously disclosed and described. It is additionally noted that in connection with the dispensing or discharge of any one of the bun sections into any one of its respective housing sections 1102,1104,1106, a bun sensor 1110, one of which is illustrated within FIG. 17 and which may comprise a laser rangefinder or similar type apparatus, is disposed behind each one of the bun separator housing sections 1102,1104,1106. The bun sensors 1110 are adapted to shine or project laser beams, schematically illustrated at 1112 in FIG. 15, through apertures 1114 defined within the rear walls of the bun separator housing sections 1102,1104, 1106 such that the laser beams 1112 will effectively determine the distance that the leading bun, being discharged from the bun storage tube 104, is located from the rear walls of the bun separator housing sections 1102,1104,1106 when a particular one of the bun separator housing sections 1102, 1104,1106 is coaxially aligned with the bun storage tube 104. It is also noted, as can be appreciated from FIG. 15, that the heel and club bun housing sections 1102,1104 are provided with substantially L-shaped cornices 1116 fixedly mounted within the upper left corners of the housing sections, and the purpose of such cornices is to prevent the heel and dub segments of the buns 108 from tilting forwardly and not being disposed substantially vertically.

It is noted at this juncture that when buns 108 are initially baked and packaged within the bun storage tubes 104, despite the fact that the heel, club, and crown sections of the buns 108 have been pre-sliced prior to their disposition or insertion into the bun storage tubes 104, a predetermined amount of adhesion nevertheless exists between the oppositely disposed flat or planar internal surface portions of the heel and club sections of the bun, and between the flat or planar internal surface portions of the club and crown sections of the bun, whereas this adhesion does not exist between the external, substantially semispherical surface portion of a crown section of a first bun and the external flat or planar surface portion of a heel section of a second bun disposed adjacent to, and in contact with, the crown section of the first bun, as may be appreciated from FIG. 3, when the buns 108 are disposed within a bun storage tube 104. Therefore, although, for example, a heel section of the first bun 108 may be advanced, dispensed, or discharged from the bun storage tube 104 and effectively be inserted into the heel housing section 1102 of the bun separator 1100, the heel section of the bun 108 is not actually separated from the club section of the bun 108 until the bun separator assembly 1100 is laterally moved toward the left, as viewed within FIG. 15, whereby the heel section of the bun 108 is effectively severed from the club section of the bun 108 as a result of the bun separator assembly 1100 being moved toward the left whereby the club housing section 1104 will now be brought into coaxial alignment with the bun storage tube 104. The preceding disclosure and description is effectively repeated in connection with the dispensing or discharge of the club and crown sections of the bun 108 into the respective club and crown housing sections 1104,1106 of the bun separator assembly 1100, however, the dispensing or discharge of the crown section of the bun 108 from the bun storage tube 104 is a bit different.

More particularly, let us assume that the heel and club sections of the leading bun 108 have already been discharged from the bun storage tube 104 into their respective housing sections 1102,1104 of the bun separator assembly 1100. Accordingly, the bun separator assembly 1100 is now moved further toward the left so as to effectively coaxially align the crown section housing 1106 of the bun separator assembly 1100 with the bun storage tube 104. Therefore, the motor drive 1002, the sprocket wheel 198, the rigid chain 196, and the pusher block 194 continue to push the serially arranged stack of buns 108 disposed within the bun storage tube 104 forward until the crown section of the bun 108 is disposed within the crown housing section 1106 of the bun separator assembly 1100. It will be recalled, however, that there is effectively no adhesion between the external substantially hemispherical surface portion of the crown segment of the bun 108 and the substantially flat planar external surface portion of the adjacent heel segment of the next or successive trailing bun 108. Accordingly, the crown segment of the bun 108 readily separates from the adjacent heel segment of the next, trailing bun 108 and would therefore immediately drop to the bottom of the crown housing section 1106 which may possibly present additional problems in that the motor drive 1002, and its associated operative components, would try to continue to discharge the next bun segment out from the bun storage tube 104. Therefore, in order to effectively prevent this, or to ensure that such a condition cannot happen, which may result in the destruction of a bun segment as the bun separator assembly 1100 is moved laterally, the crown housing section 1106 is provided with a pair horizontally spaced crown shelf members or rods 1118,1118 which project through apertures 1120,1120 formed within the rear wall of the crown housing section 1106.

As can best be seen in FIG. 17, the rear wall of the crown housing section 1106 is actually formed by means of a movable plate 1122 which is movable in the forward and rearward directions by means of a suitable pneumatic piston-cylinder assembly 1124, and it is to be noted that this movable plate system may likewise be utilized in conjunction with the heel and intermediate club housing sections 1102,1104. In this manner, the effective depth of the housing sections 1102,1104,1106 of the bun separator assembly 1100 can be varied so as to accommodate different segments of different buns 108 having different thickness dimensions. In addition, it is also seen that the crown shelf members or rods 1118, only one of which is seen in FIG. 16, are likewise fixedly attached at their rear ends to a mounting plate 1126 which, in turn, is fixedly attached to the free distal end of a piston rod of a pneumatic piston-cylinder assembly 1128 whereby the crown shelf members or rods 1118 can be moved forwardly to extended positions at which they project into the crown housing section 1106 of the bun separator assembly 1100 so as to support the crown segment of a bun 108 thereon, or they can be moved to retracted positions at which they will no longer project outwardly from the plate 1122 and the crown segment of the bun 108 will fall to the bottom of the crown housing section 1106. As can best be seen in FIG. 16, and as has been noted previously, the bun separator assembly 1100 moves laterally, that is, left and right as viewed in FIG. 15, or into and out from the page as viewed in FIG. 16, and is seen to effectively be disposed atop an angle iron 1130 which effectively forms a floor portion for the bun separator assembly 1100 upon which all of the bun segments will be disposed once they are fully deposited or inserted into their respective housing sections 1102,1104,1.106 of the bun separator assembly 1100. It is also noted, as can best be seen in FIGS. 15 and 17, that bun presence apertures 1132,1134,1136 are respectively defined within the lower regions of the bun separator housing sections 1102,1104,1106, and a plurality of photoeyes 1138, only one of which is seen in FIG. 17, are disposed behind the rear walls of the bun separator housing sections 1102,1104, 1106 so as to detect the presence of the bun segments when they are in fact properly disposed within the lower regions of the bun separator housing sections 1102,1104,1106 and disposed upon the angle iron 1130 which effectively forms the floor of the bun separator housing sections 1102,1104, 1106.

Continuing further, and completing the description of the bun separator assembly 1100 and its operation, reference is now made to FIGS. 16 and 18 wherein it is seen that a bun gate 1140 is effectively interposed between the bun storage tube 104, disposed at the upper dead center dispensing or discharge position, and the bun separator assembly 1100, the bun gate 1140 being vertically movable between a raised position, as illustrated within FIGS. 16 and 18, and a lowered position by means of any suitable actuator, not shown. The bun gate 1140 is provided with a through-aperture 1142 which may be either a hole or a slot, and a bun sensor 1144 is disposed behind the bun separator assembly 1100 such that a laser beam 1146 from the bun sensor 1144 can detect the presence of a bun segment when the bun gate 1140 is disposed at its elevated position and a bun segment has been discharged from the bun storage tube 104. As will now be disclosed and described, the bun gate 1140 serves several purposes. When a first heel segment of the leading bun 108 is to be dispensed or discharged from the bun storage tube 104, the bun separator assembly 1100 is moved all the way to its leftmost position, as viewed within FIG. 15, such that the chuck or gripper mechanism 174, which is fixedly mounted upon the bun separator assembly framework 1108, can engage and remove the end cap 166 of the bun tube 104. Subsequently, the bun gate 1140 is then moved to its elevated position, and at this time, the bun separator assembly 1100 is moved to its rightmost position. The motor drive 1002 is then actuated so as to cause the pusher block 194 to engage the bun tube puck 192, thereby causing the heel segment of the leading bun to be moved out of the bun storage tube 104 and into engagement with the bun gate 1140. The presence of the heel segment of the leading bun against the bun gate 1140 is detected by means of the bun sensor 1144, thereby assuring that the heel segment of the leading bun has in fact been partially discharged from the bun storage tube 104 and is disposed in a proper vertical orientation as a result of it being pressed against the forward vertical surface portion of the bun gate 1140.

Subsequently, the bun separator assembly 1100 is moved in the leftward direction until the first heel housing section 1102 of the bun separator assembly 1100 is coaxially aligned with the bun storage tube 104. The bun gate 1140 is then lowered, and the motor drive 1002 is again actuated so as to fully dispense or discharge the heel segment of the bun 108 into the heel housing section 1102 of the bun separator assembly 1100. It will be recalled that there is some residual adhesion defined between the heel segment of the bun 108 and the club section of the bun 108 whereby the heel section of the bun 108 will not readily separate from the club section of the bun 108 despite its insertion into the heel housing section 1102 of the bun separator assembly 1100, however, upon leftward movement of the bun separator assembly 1100 to its next position at which the club housing section 1104 of the bun separator 1100 is now coaxially aligned with the bun storage tube 104, the heel segment of the bun 108 will be severed from the club section of the bun 108 whereby the heel segment of the bun 108 will drop vertically downward within the heel housing section 1102 of the bun separator assembly 1100 so as to be supported by means of the angle bracket 1130 which effectively defines the floor region for the bun separator assembly 1100. At this time, it is also to be noted that the bun photoeye 1138, operatively associated with the heel housing section 1102 of the bun separator assembly 1100 will detect the presence of the heel segment of the bun 108 within the lower region of the heel housing section 1102 of the bun separator assembly 1100.

As a result of the club housing section 1104 now being disposed coaxially with respect to the bun storage tube 104, the previous operational steps can be repeated so as to dispense or discharge the club segment of the bun 108 into the club housing section 1104 of the bun separator assembly 1100, additional leftward movement of the bun separator housing 1100 resulting in the severance of the club segment of the bun 108 from the crown segment of bun 108 such that, again, in a similar manner, the presence of the club segment of the bun 108 within the lower region of the club housing section 1104 will be detected by means of its bun photoeye 1138. Since the crown housing section 1106 of the bun separator assembly 1100 is now coaxially aligned with the bun storage tube 104, the crown segment of the bun 108 can be dispensed or discharged from the bun storage tube 104, however, it is to be remembered that there is no adhesion defined between the external hemispherical crown surface portion of the crown segment of the bun 108 and the external flat planar heel surface portion of the next or trailing bun 108. Therefore, the crown segment of the leading bun 108, upon being dispensed or discharged from the bun storage tube 104, will tend to immediately separate from the heel segment of the next trailing bun 108 and would also otherwise tend to fall into the bottom region of the crown housing section 1106 of the bun separator assembly 1100 which is not desirable because the motor drive 1002 and the pusher block 194 will tend to keep dispensing or discharging the heel segment of the next or trailing bun 108. Since the bun separator assembly 1100 is now going to be moved to its rightmost position so as to once again coaxially align the chuck or gripper mechanism 174 with the bun storage tube 104 so as to replace the end cap 166 onto the bun storage tube 104, since an entire bun dispensing or discharging cycle has been completed, any further dispensing or discharge of the next or trailing bun segment may effectively be destroyed as a result of being caught or crushed as a result of the lateral, rightward movement of the bun separator assembly 1100 with respect to the bun storage tube 104.

Therefore, to prevent this scenario from occurring, and as has been discussed previously, the crown housing section 1106 of the bun separator assembly 1100 is provided with the crown shelf members or rods 1118 upon which the crown segment will be supported so as to prevent any further dispensing or discharge of a bun segment from the bun storage tube 104. In addition, immediately subsequent to the disposition of the crown segment of the leading bun 108 being disposed upon the crown shelf members or rods 1118, the bun gate 1140 is again moved to its elevated position so as to be interposed between the crown segment of the leading bun 108 from the heel segment of the next or trailing bun 108 and thereby definitively ensure that the crown segment of the leading bun 108 is in fact separated from the heel segment of the next or trailing bun 108. Once the bun gate 1140 has been raised to its elevated position and the crown segment of the leading bun 108 is in fact separated from the heel segment of the next or trailing bun 108, the crown shelf members or rods 1118 are retracted, thereby permitting the crown segment of the bun 108 to fall into the lower region of the crown housing section 1106, the disposition of the crown segment within the lower region of the crown housing section 1106 is confirmed by means of the photoeye 1138 operatively associated with the crown housing section 1106 of the bun separator assembly 1100, the bun gate 1140 is then lowered to its lowermost position, and the bun separator assembly 1100 is moved to its rightmost position so as to coaxially align the chuck or gripper mechanism 174 with the bun storage tube 104 whereby operation of the chuck or gripper mechanism 174, in a reverse mode with respect to that described in connection with the removal of the end cap 166 from the bun storage tube 104, can be achieved.

Once the bun dispensing or discharging operation has been completed and the bun segments are disposed within their respective housing sections of the bun separator assembly 1100, and the end cap 166 has been replaced upon the bun storage tube 104, the bun segments must be transported to the bun rotator assembly and then toaster appliances so that the bun segments can be properly toasted in connection with the preparation of a particular type of sandwich, all of which will be disclosed and described shortly hereinafter. It is to be noted that if the sandwich is to comprise a two bun-segment type sandwich, such as, for example, to create a hamburger, then the heel and crown sections of the bun are inserted into the club housing section 1104 and the crown housing section 1106 such that the bun segment receiving sections of the bun separator assembly 1100 are disposed adjacent to each other—this makes the system more operatively efficient as opposed to inserting the heel segment of the bun into the heel housing section 1102 of the bun separator assembly 1100 while inserting the crown segment of the bun into the crown housing section 1106 of the bun separator assembly 1100 with the central club housing section 1104 being empty and requiring that the linear actuator, not shown, powering the lateral movements of the bun separator assembly 1100, must effectively skip over or bypass the club housing section 1104. Conversely, if the sandwich is to comprise a three bun-segment type sandwich, such as, for example, to create a Big Mac®, then the heel, club, and crown segments of the bun are in fact deposited within their respective heel, club, and crown housing sections 1102, 1104,1106 of the bun separator assembly 1100.

With reference now being made to FIGS. 19-23, and as can best be appreciated from FIG. 20, after the bun segments have been deposited within their respective heel, club, and crown housing sections 1102, 1104,1106 of the bun separator assembly 1100, the bun separator assembly 1100 is moved laterally by means of a suitable linear actuator, not shown, along a horizontally or transversely oriented rail system 1148 in a suspended manner. As the bun separator assembly 1100 is moved from right to left, as viewed within FIG. 20, the various bun segments from the housing sections 1102,1104,1106 of the bun separator assembly 1100 will be disposed above a chute 1150. It will be noted that the angle iron 1130, as disclosed within FIGS. 16 and 20, and which effectively served as a floor over which the bun separator assembly 1100 moves laterally, terminates at the chute 1150 whereby, as the bun separator assembly 1100 continues to move from the right to the left, as viewed within FIG. 20, the successive housing sections 1102,1104,1106 of the bun separator assembly 1100 will successively move beyond the leftward most extent of the angle iron 1130 and therefore, the bun segments, disposed within the housing sections 1102,1104, 1106 of the bun separator assembly 1100, will simply drop onto the chute 1150. As shown within FIGS. 19 and 22, the bun handling system 100 of the present invention also comprises three bun rotators 1152,1154,1156 which are mounted upon a first linear railing and actuating system 1158 for lateral or transverse movement in the leftward and rightward directions as viewed, for example, within FIG. 22. In addition, the three bun rotators 1152,1154,1156 are also mounted upon a second linear railing and actuating system 1160 which is, itself, mounted upon the first linear railing and actuating system 1158 so as to permit the three bun rotators 1152,1154,1156 to be moved in a perpendicular direction with respect to its lateral or transverse direction of movement along the first linear railing and actuating system 1158.

A pair of toaster appliances 1162,1164 are disclosed within FIG. 23, and at least one of the toaster appliances 1162 can also be seen within FIG. 21, and accordingly, it can now be appreciated that the mounting of the three bun rotators 1152,1154,1156 upon the first linear railing and actuating system 1158 not only permits the three bun rotators 1152,1154, 1156 to move toward the rightmost position, as viewed within FIG. 22 such that the three bun rotators 1152,1154,1156 are successively disposed beneath the chute 1150 in order to individually and respectively receive the three bun segments from the chute 1150, but in addition, the three bun rotators 1152,1154,1156 can then be moved along the first linear railing and actuating system 1158 so as to individually and successively deposit the bun segments into proper bun segment reception slots, not shown, defined within either one of the toaster appliances 1162,1164. In addition, it is to be further appreciated that the provision of the second linear railing and actuating system 1160 permits the three bun rotators 1152,1154,1156 to be moved in the noted perpendicular direction, with respect to its movement along the first linear railing and actuating system 1158, so as to enable the three bun rotators 1152,1154,1156 to be effectively moved in XY directions so as to be capable of transferring the bun segments from the three bun rotators 1152,1154,1156 into either one of the toaster appliances 1162,1164 which correspond to the toaster appliance 200 illustrated within FIG. 1 along the automatic food preparation line 10.

Still further, in connection with FIGS. 19,21, and 22 that each one of the three bun rotators 1152,1154,1156 effectively defines a mounting plate system comprising a first, fixed, foam-backed mounting plate 1166, and a second movable mounting plate 1168 to which is respectively attached a pneumatic piston-cylinder assembly 1170,1172, 1174, all three of which are disclosed within FIG. 19 but only one of which is disclosed within FIG. 21. Interior surface portions of the first and second mounting plates 1166,1168 are provided with non-stick sheets 1176,1178 such that when the second movable mounting plate 1168 is actuated so as to move toward the first fixed mounting plate 1166 and thereby secure the bun segment therebetween, the bun segment will not stick or adhere to either one of the mounting plates 1166,1168. It is lastly seen, with reference again being made to FIG. 22, that the three bun rotators 1152,1154,1156 are collectively connected to a rotary actuator mechanism 1180 such that the three bun rotators 1152, 1154,1156 can be collectively rotated 180° in opposite directions. It can be appreciated from FIG. 19 that the three bun rotators 1152,1154,1156 are all fixedly connected to a common transversely oriented mounting bar or rail 1159. This mounting and actuation system permits the three bun rotators 1152,1154,1156 to collectively rotate relative to the toaster appliances 1162,1164 so as to ensure, for example, that when the three segments of the bun 108 are inserted into the proper locations defined within the toaster appliances 1162,1164, the heel and crown segments of the bun will be toasted only upon one side thereof, that is, the interior surface portions of the heel and crown segments, while with respect to the club segment of the bun, both sides of the club segment of the bun 108 will be toasted.

With reference continuing to be made to FIG. 22, after the various bun segments are inserted into either one of the toaster appliances 1162,1164 so as to undergo their toasting operations, the bun segments will be conveyed downwardly through the toaster appliances so as to be toasted to a predetermined degree as the segments travel continuously along their toaster paths. Various bun segment sensors, not shown, may be incorporated internally within the toaster appliances so as to ensure that the bun segments are in fact being properly conveyed in their downward directions through the toaster appliances 1162,1164. When the toasting operation is completed, the toasted bun segments fall onto a bun ramp 1182 which has been illustrated within FIG. 23 for clarity purposes, but normally, such bun ramp 1182 would not be visible because a bun gate 1184 actually covers the bun ramp 1182. The bun gate 1184 is operatively connected to a pair of bun gate rotators 1186,1186 disposed at opposite ends of the bun gate 1184, and a plurality of bun ramp sensors, not shown, are operatively associated with the bun ramp 1182 so as to ensure that all bun segments that have traveled through the toaster appliances 1162,1164, and that have been toasted, have in fact reached the bump ramp 1182. Accordingly, when the bun ramp sensors, not shown, sense the disposition of the bun segments upon the bun ramp 1182, the bun ramp sensors will transmit a signal to the bun ramp rotators 1186,1186 so as to rotate the bun gate 1184 from its normally CLOSED position to an OPEN position whereby the bun segments will fall down onto transversely oriented linear bun conveyors 1188 which are part of the conveyor system 700 illustrated within FIG. 1 and which run along the entire length of the automatic food preparation line 10. At this point in time, the bun conveyors 1188 are activated until a bun segment reaches the end of its bun conveyor 1188 as determined by means of an upstanding bun stop 1190 which has been illustrated both within FIG. 23. Simultaneously therewith, as is illustrated within FIG. 24, a first embodiment of a bun segment gripper assembly 1192, mounted upon an overhead linear actuator and railing assembly 1194 for vertical movement toward and away from the bun conveyor 1188 by means of a suitable actuator 1189, is moved into position above the bun segment which has been stopped at the bun stop 1190, and as guided to the precise position above the stopped bun segment by means of a bun stop sensor 1195 generating a laser beam 1196. The bun segment gripper assembly 1192 is then lowered such that a plurality of fingers 1198 can be moved radially inwardly with respect to each other so as to grasp the bun segment, remove it from the bun conveyor 1188, and move it downstream to the next food item preparation station such as, for example, a packaging dispensing station for dispensing pre-selected box or wrapping paper packaging for housing or containing the bun segment.

With reference lastly being made to FIGS. 25 and 26, an alternative bun segment pickup system 1200, for picking up the bun segments disposed against the upstanding bun stop 1190, is disclosed. In lieu of the bun segment gripper assembly 1192 disclosed within FIG. 24, the bun segment pickup system 1200 comprises an upper mounting plate 1202 which is adapted to be operatively connected upon the lower end of a suitable actuator, not shown but similar to the actuator 1189 illustrated within the system disclosed and described in connection with FIG. 24. Accordingly, the bun segment pickup system 1200 can be moved vertically so as to be lowered or raised relative to the bun segment disposed upon the end of bun conveyor 1188 and disposed at its predetermined location along the bun conveyor 1188 by means of the upstanding bun stop 1190. In addition, it is seen that a bun segment discharge plate 1204 is fixedly mounted to the lower distal end of a piston 1206 which is disposed within a cylinder 1208 of a pneumatic piston-cylinder assembly 1210 which is fixedly secured within a lower mounting plate 1212 which, together with a pair of columns 1214,1214 and the upper mounting plate 1202, effectively form the framework for the bun segment pickup system 1200.

Still further, it is seen that a plurality of vertically oriented, dependent needles 1216, which are fixedly mounted within the lower mounting plate 1212, project downwardly and pass through the bun segment discharge plate 1204 such that the bun segment discharge plate 1204 is movable relative to the plurality of needles 1216. Normally, the bun segment discharge plate 1204 is disposed at an elevated position, as defined by the upward movement of the piston 1206 within the cylinder 1208 of the piston cylinder assembly 1210, and subsequently, the entire bun segment pickup system 1200 is lowered by means of its pneumatic actuator, not shown, to which the upper mounting plate 1202 is connected. It is to be noted that when the bun segments, particular the heel and crown segments of the bun, which are to be toasted only upon their interior surface portions, are inserted into the toaster appliances 1162,1164, the bun segments will be properly oriented so as to in fact ensure that they are only toasted upon their interior surface portions. In addition, when the bun segments are discharged onto the bun ramp 1182, the bun segments will in fact be properly oriented such that the interior toasted surface portions of the bun segments face upwardly. In this manner, or as a result of such lowered movement of the entire bun segment pickup system 1200, the plurality of dependent needles 1216 will penetrate the toasted internal side of the heel or crown segments of the bun, or either toasted side of the club segment of the bun, so as to effectively grasp the bun segment as a result of the penetration of the bun segment by means of the plurality of dependent needles 1216, the penetrated surface of the bun segment being disposed in contact with the undersurface portion of the bun segment discharge plate. The bun segment pickup system 1200 is then moved downstream toward the food packaging or wrapping paper packaging station at which time the piston 1206 will be extended or lowered with respect to the cylinder 1208 which will, in turn, cause the bun segment discharge plate 1204 to move downwardly, relative to the plurality of needles 1216, whereby the bun segment discharge plate 1204 will effectively push the bun segment off the distal end portions of the plurality of needles 1216 such that the bun segment can now be disposed within the proper box or wrapping paper packaging.

With reference now being made to FIGS. 27-31, as has been previously noted, the new and improved automatic box packaging dispensing system of the present invention is disclosed and is generally indicated by the reference character 300 as is also seen in FIG. 1. In a similar manner, a new and improved automatic wrapping paper packaging dispensing system of the present invention is also disclosed and is generally indicated by the reference character 400 as is also seen in FIG. 1. The new and improved automatic box packaging dispensing system of the present invention 300 will be described first. More particularly, it is seen that the new and improved automatic box packaging system 300 is adapted to dispense packaging boxes and therefore comprises a packaging box sub-system 302. The packaging box sub-system 302 comprises a plurality of different types or sizes of packaging boxes that are disposed within different packaging box assemblies 306 which are fixedly mounted at their upper end portions upon a mounting plate 308 which is operatively connected to a linear belt drive 310 by means of a mounting bracket 312 disposed atop a linear slide block 314 which is connected to the linear belt drive 310. A reversible motor 316 is operatively connected to the linear belt drive 310 so that when the reversible motor 316 is actuated in a first mode for a predetermined amount of time, the linear belt drive 310 will move the mounting plate 308 and the plurality of packaging box assemblies 306 mounted thereon a predetermined distance in a first direction, whereas, when the reversible motor 316 is actuated in a second mode for a predetermined amount of time, the linear belt drive 310 will move the mounting plate 308 and the plurality of packaging box assemblies 306 mounted thereon a predetermined distance in a second opposite direction. The mounting plate 308 undergoes its lateral, reciprocating movements as a result of being movably attached to, and supported upon, a horizontally oriented guide rail 318 as can be seen in FIGS. 27 and 28. In this manner, any one of the plurality of packaging box assemblies 306 can be moved so as to be properly positioned relative to, and beneath, a vacuum suction cup pickup and transfer assembly 320, which can be seen in FIG. 27 and which will be more fully discussed hereinafter, such that the vacuum suction cup pickup and transfer assembly 320 can remove the uppermost packaging box, one exemplary box 322 being disclosed within FIG. 32, disposed within the particular packaging box assembly 306 and thereby transfer the packaging box 322 onto the food preparation line conveyor 700, as seen in FIG. 1, such that the particular packaging box may be moved to the next food preparation station of the food preparation line 100, which will be the sauce dispensing station 500 as seen in FIG. 1.

With reference now being made to FIG. 30, one of the packaging box assemblies 306 will be described. More particularly, it is seen that each packaging box assembly 306 comprises a box support platform 328 upon which a plurality of a particular kind or type of packaging boxes 322 are to be stacked so as to effectively form a packaging box magazine from which the uppermost packaging box 322 will be removed by means of the vacuum suction cup assembly 320. The box support platform 328 actually comprises a horizontally oriented component 330, upon which the stack of packaging boxes 322 are actually disposed and supported, and an upstanding bracket 332 to which a pair of laterally spaced constant force springs 334 are adapted to be attached, although the springs 334 are not shown attached in FIG. 30. The springs 334 are mounted upon a horizontal spindle 336, the ends of which are mounted within laterally spaced end brackets 338. The end brackets 338,338, in turn, are connected to a peripheral framework 340 which is mounted upon the mounting plate 308 and to which are attached a plurality, for example, four, leaf-spring type fingers 342, as well as a pair of vertically oriented packaging box guide rods 344 which depend vertically downwardly from opposite sides of the peripheral framework 340.

The peripheral framework 340 and the vertical guide rods 344 are adapted to maintain the stack of packaging boxes 322 upon the stacking platform component 330, with the vertical guide rods 344 engaging corner regions 346 of the packaging boxes 322, as seen in FIG. 32, which are effectively defined between the upper or cover portion of the packaging box 322 and the bottom portion of the packaging box 322. The disposition of the vertical guide rods 344 within the corner regions 346 of the packaging boxes 322 effectively prevents the plurality of packaging boxes 322 from moving forwardly and backwardly as well as laterally from side to side. Furthermore, with reference being additionally made to FIG. 31, it is seen that the upper end portions 341 of the vertical guide rods 344 are bent at an angle of 90° and are seated within slots 343 defined within the peripheral framework 340. Accordingly, the upper end portions 341 of the pair of vertical guide rods 344 may be moved within the slots 343 and relative to each other such that the distance between the pair of vertical guide rods 344 is rendered adjustable. In this manner, different packaging boxes 322, having different width dimensions, can be housed or accommodated within the packaging box assembly 306. It is additionally noted that mounting plates 345 are fixedly secured atop the peripheral framework 340 so as to securely fix the bent end portions 341 of the vertical rods 344 within the slots 343 of the peripheral framework 340 so that, in turn, the pair of vertical rods 344 will remain at their relative desired spacing so as to house or accommodate the differently sized packaging boxes 322.

Accordingly, it can be appreciated that as a stack of packaging boxes 322 are mounted upon the horizontal component 330 of the box support platform 328, the box support platform 328 will be moved downwardly and the constant force springs 334, when attached to the rear upstanding wall component 332 of the box support platform 328, will be extended such that the constant force springs 334 will continuously tend to move the box support platform 328 back toward its uppermost position so as to continuously move the box support platform 328 incrementally upwardly as the uppermost packaging box 322 is removed from the box support platform 328 by means of the vacuum suction cup assembly 320. The box support platform 328 moves vertically downwardly and upwardly along a vertically oriented guide rail 346 which is fixedly secured at its lower end to a mounting bracket 348. The plurality of fingers 342 extending into the central part of the peripheral framework 340 supply a sufficient retaining force to the stack of packaging boxes 322 disposed upon the horizontal component 330 of the packaging box platform 328, however, when the uppermost packaging box 322 is removed by means of the vacuum suction cup assembly 320, the plurality of fingers 342 will flex upwardly, permitting the uppermost packaging box 322 to be withdrawn from the stack of packaging boxes 322 disposed upon the horizontal component 330 of the packaging box platform 328, and will effectively slide along the external surface portions of the uppermost packaging box 322 being withdrawn by means of the vacuum suction cup assembly 320 until the fingers 342 snap back to their original positions, thereby preventing any further packaging boxes 322 from being removed from the packaging box assembly 306. It is lastly noted that the packaging box assembly 306 also includes a packaging box sensor 352 which is adapted to be coaxially aligned with an aperture 354 defined within the horizontal component 330 of the packaging box platform 328. In this manner, in a manner similar to a photocopying machine warning the user that the supply of paper in the paper tray has been depleted, the sensor 352 will sense when the last packaging box 322 has been removed from the packaging box assembly 306 whereby the supply of packaging boxes 322 needs to be replenished.

Continuing further, and with particular reference being made to FIGS. 33 and 34, the vacuum suction cup pickup and transfer system 320 will now be described. A pair of suction cups 354 are fixedly attached to the bottom surfaces of a pair of vacuum manifolds 356 so that the system comprises four suction cups 354. Each one of the vacuum manifolds 356 is fluidically connected to a vacuum generator 358, and the vacuum generators 358,358 are fixedly mounted upon a horizontally oriented mounting bracket 360. A plurality of vertically oriented tubes or guide rods 362 have their lower ends fixedly connected to the mounting bracket 360 and are operatively associated with a servo unit 364 which is fixedly mounted upon a vertically extending housing 366. Accordingly, as the plurality of tubes or guide rods 362 move relative to the servo unit 364, the plurality of suction cups 354 will accordingly be moved upwardly and downwardly. It is to be noted at this juncture that the control of all movable components, the operation of all valving, not necessarily shown, and the like, comprising the automatic box packaging dispensing system 300 are under the control of the programmable logic controller 800 schematically illustrated within FIG. 1, which causes the various operative components to act as described in accordance with patron order data transmitted thereto from the point-of-sale (POS) location through means of the user interface (UI) 900.

Continuing further, it is also seen that the vertically oriented housing 366 is fixedly mounted upon a mounting plate 370 and that the mounting plate 370 is fixedly connected to a servo unit 372 which, in turn, is slidably movable upon a linear slide 374. Accordingly, when the servo unit 372 moves along the linear slide 374, it will cause the suction cup assembly, comprising the mounting plate 370, the housing 366, the tubes 362 and the servo unit 364, and the mounting bracket 360, the vacuum generators 358, the vacuum manifolds 356, and the vacuum suction cups 354 to move laterally toward the left or right as viewed within FIGS. 33 and 34, or to move into or out of the page as viewed within FIG. 27. In a similar manner, the servo unit 364 can effectively cause the tubes or guide rods 362 to move upwardly and downwardly so as to, in turn, cause the mounting bracket 360, the vacuum generators 358, the vacuum manifolds 356, and the vacuum suction cups 354 to move upwardly and downwardly. Accordingly, when these compound movements are properly controlled and timed by means of, for example, the programmable logic controller (PLC) 800, the vacuum pickup and transfer assembly 320 can be moved to a position whereby the plurality of vacuum suction cups 354 will be disposed above a selected one of the plurality of packaging box assemblies 306 which has been moved into position beneath the vacuum suction cups 354 of the vacuum pickup and transfer assembly 320 by means of the linear belt drive 310.

The vacuum control generators 358 can then be actuated, and then the servo unit 364 can be actuated so as to move the vacuum suction cups 354 downwardly such that the vacuum suction cups 354 can remove or extract the uppermost one of the packaging boxes 322 from the selected one of the plurality of packaging box assemblies 306. The servo unit 364 can then be actuated so as to elevate the packaging box 322 that has been removed or extracted from the selected packaging box assembly 306, the servo unit 372 can then be actuated so as to effectively retract the vacuum pickup and suction cup assembly 320 from its forwardmost position above the selected one of the plurality of packaging box assemblies 306 to a predetermined rearwardmost position at which the vacuum suction cups 354 will now be disposed above the food preparation line conveyor 700. The servo unit 364 can then be actuated again so as to lower the vacuum suction cups 354 toward the food preparation line conveyor 700, and when the vacuum suction cups 354 are disposed immediately above the food preparation line conveyor 700, the vacuum generators 358 can be deactivated whereby the packaging box 322 will be released from the vacuum suction cups 354 and deposited onto the food preparation line conveyor 700.

With reference now being made to FIGS. 35-39, the wrapping paper packaging sub-system 400 will now be described. More particularly, it is seen that the wrapping paper packaging sub-system 400 comprises a wrapping paper packaging housing 476 within which there is disposed a plurality of horizontally oriented, vertically spaced trays 478, each one of the trays 478 holding a predetermined number of wrapping paper packaging sheets, and wherein each tray 478 holds a different type or size of wrapping paper packaging sheet. An L-shaped angle iron or angle bracket 482 has its long leg fixedly secured to the rear wall 483 of the housing 476 while the short leg of the L-shaped angle iron or angle bracket 482 is fixedly secured to a slide block 480 which is part of a vertically oriented linear ballscrew actuator 484 which is driven by means of a suitable motor 486, all of which can best be seen in FIG. 36. In addition, it is seen that the vertically oriented ball screw actuator 484 is also fixedly mounted upon a vertically oriented mounting platform or wall 488 which is also shown transparently within FIG. 37 for clarity purposes.

As can best be seen in FIG. 38, the rear wall 483 of the housing 476 is integrally connected to a left wall 490 of the housing 476 from which project a pair of vertically oriented, laterally spaced female track members 492 which are adapted to engage and slide along a pair of vertically oriented, laterally spaced male guide rails 494. In this manner, as the wrapping paper packaging housing 476 is moved vertically upwardly and downwardly by means of the linear ballscrew actuator 484, the movement and support of the wrapping paper packaging housing 476 is provided by means of the operatively cooperative track members 492 and guide rails 494. It is lastly noted, as can also best be seen in FIGS. 37 and 38, that a vertically oriented rail 493 is mounted upon the left wall 490 of the housing 476, while a pair of pneumatic brake components 495,495 are mounted upon the mounting platform or wall 488 so as to be disposed upon opposite sides of the vertically oriented rail 493. These pneumatic brake components 495,495 are provided, and are adapted to be moved toward each other so as to fixedly grasp opposite sides of the vertically oriented rail 493, so as to prevent the entire wrapping paper packaging housing 476 from falling if, for example, power to the motor 486 and the linear ballscrew actuator 484 should be terminated for some reason, such as, for example, a power switch or circuit breaker has been tripped, or the like.

With reference still being made to FIG. 38, it is further seen that each tray 478 is also slidable upon horizontally oriented ball-bearing slides or tracks 496 which extend from the rear wall 483 of the housing 476 toward the front of the housing 476, which is open so as to permit the front edge portions of the plurality of trays 478 to project outwardly therefrom, so that the trays 478 can be easily and readily moved from their normal positions disposed internally within the tray housing 476 to external positions relative to the tray housing 476 when packaging sheets within a particular one of the trays 478 need to be accessed by means of the vacuum suction cups 354 of the vacuum pickup and transfer assembly 320. Each forward end of each wrapping paper tray 478 is provided with a horizontally oriented finger 498, and a horizontally oriented tray extension piston-cylinder assembly 1300 is mounted upon the external surface of the vertically oriented mounting platform or wall 488 such that when the piston of the piston-cylinder assembly 1300 is extended, the piston will encounter the finger 498 of a particular wrapping paper tray 478 and thereby cause that particular tray 478 to be moved out from the interior of the paper tray housing 476 to an external position at which the vacuum suction cups 354 of the vacuum pickup and transfer assembly 320 can engage the uppermost wrapping paper sheet within that particular wrapping paper tray 478 and then transfer that wrapping paper sheet to the food preparation line conveyor 700.

More particularly, it is to be noted that the distal end of the piston of the piston-cylinder assembly 1300 is provided with a head portion 1302 which has a slotted section 1304, which can be seen in FIG. 38, through which the various fingers 498 of the various paper trays 478 can pass as the paper tray housing 476 is moved upwardly or downwardly, however, when the paper tray housing 476 has been moved upwardly or downwardly such that a particular one of the paper trays 478 is located at the correct position for that particular tray 478 to be moved out from the housing 476 such that the wrapping paper packaging sheets disposed within that tray 476 can be accessed, the finger 498 of that particular paper tray 478 will be disposed within the slotted section 1304 defined within the head portion 1302 of the piston of the piston-cylinder assembly 1300 such that when the piston-cylinder assembly 1300 is actuated, the head portion 1302 of the piston of the piston-cylinder assembly 1300 can act upon the finger 498 of that particular paper tray 478 so as to move that particular paper tray 478 outwardly from the paper tray housing 476 whereby the uppermost wrapping paper packaging sheet disposed within that extended tray 478 can now be grasped by means of the vacuum suction cups 354 of the vacuum pickup and transfer assembly 320.

With reference again being made to FIG. 27, a wrapping paper packaging sheet sensor 406 is mounted at a location upon the food preparation line 10 that is adjacent to and disposed above the wrapping paper packaging housing 476 such that when a selected paper tray 478 of the wrapping paper packaging housing 476 is extended outwardly from the wrapping paper packaging housing 476 such that the uppermost wrapping paper packaging sheet disposed within the selected paper tray 478 can in fact be grasped by means of the vacuum suction cups 354 of the vacuum pickup and transfer assembly 320 and transferred to the food preparation line conveyor 700, the wrapping paper packaging sheet sensor 406 can determine the vertical distance to the uppermost wrapping paper packaging sheet disposed within the selected paper tray 478. It is to be appreciated that this distance will vary as the supply of wrapping paper disposed within a particular paper tray 478 is steadily depleted. Accordingly, the sensor 406 will transmit a signal to the vacuum pickup and transfer assembly 320 such that, for example, the tubes and servo system 362,364 will know precisely how far to move the plurality of suction cups 354 downwardly in order to properly engage and extract the uppermost wrapping paper sheet disposed within the extended paper tray 478.

Lastly, as can best be appreciated from FIGS. 38 and 39, each paper tray 478 is seen to have a substantially rectangular configuration so as to house or accommodate the various different wrapping paper packaging sheets. Accordingly, in order to permit any one paper tray 478 to house or accommodate any particularly sized wrapping paper packaging sheet, a pair of adjustable guides 1308,1310 are respectively slidably mounted within a pair of guide slots 1312,1314, all located upon two sides of each paper tray 478 which form a corner section 1316 of the paper tray 478. Set screws 1318,1320, or the like, are mounted within the adjustable guides 1308,1310 so as to fix the adjustable guides 1308,1310 at desired positions according to the particularly sized wrapping paper packaging sheets to be accommodated or housed the particular paper tray 478. Such guides 1308, 1310, guide slots 1312,1314, and set screws 1318,1320 are similar to those components conventionally utilized within photocopying machines for accommodating or housing differently sized photocopy paper sheets such as, for example, letter sized paper or A4 international sized paper. Still yet further, each paper tray 478 is provided with a through-hole 1322 to permit, for example, a light beam or other sensor signal to pass therethrough so as to indicate that the supply of wrapper paper packaging sheets, disposed within the tray 478, has been depleted, such a sensing system again being similar in operation to a paper supply sensor system incorporated within a photocopying machine.

With reference now being made to FIG. 40, a first new and improved automatic sauce-type condiment dispensing system is disclosed and is generally indicated by the reference character 500. As disclosed within FIG. 40, it is to be appreciated that the new and improved automatic sauce dispensing system 500 can be integrally incorporated within the automated food preparation line 10 as will be more fully discussed hereinafter. More particularly, with reference being made to FIGS. 41 and 42, it is seen that the new and improved automatic sauce dispensing system 500 comprises a plurality of vertically oriented sauce dispensing canisters 506 respectively having sauce dispensing containers 508 removably disposed therein so as to effectively form canister or sauce container assemblies 510. It is seen that the plurality of canister or sauce container assemblies 510 are fixedly mounted in a side-by-side manner upon a vertically oriented mounting plate 512 which is, in turn, fixedly mounted upon an automatic sauce dispensing system framework 514 as shown in FIG. 44.

The canister or sauce container assemblies 510 are adapted to be mounted upon the mounting plate 512 by means of mounting blocks 516, and as can best be seen in FIG. 43, the mounting plate 512 is fixedly mounted upon a vertically oriented mounting bracket 518. The mounting bracket 518 is, in turn, mounted upon distal end portions a pair of pivotable legs or arms 520,522 which have their lower or proximal ends pivotally connected to a fixed actuator bracket 524. An actuator 526, which may be, for example, a pneumatic actuator, has its lower end portion pivotably mounted upon the actuator bracket 524 while its upper end portion is pivotally connected to the upper end portion of the mounting bracket 518. In this manner, depending upon whether or not the actuator 526 is extended or contracted, the canister/sauce dispensing container assemblies 510 will be moved between raised and lowered positions so as to be disposed at upper dispensing positions or locations or at lower positions or locations which will facilitate the exchange of depleted sauce containers 508 with new or fresh sauce containers 508 containing full supplies of the particular sauces which are to be disposed at the sauce dispensing station of the sauce dispensing system 500 and along the automatic food preparation line 10.

With reference again being made to FIGS. 41-43, it is further seen that each one of the canister/sauce container assemblies 510 includes an upper removable canister cap 528 which may be attached to the canister 506 by means of any suitable quick disconnect type fastener such as, for example, complementary threads, a quarter turn type fastener, a bayonet type fastener, or the like. In conjunction with the removable canister cap 528, there is also provided a pneumatic air fitting 530 which effectively passes through the removable canister cap 528 so as to be in fluidic communication with the interior of the sauce container 508. In this manner, when the pneumatic air fitting 530 is fluidically connected to a source of pressurized air, not shown, the pressurized air will act upon the sauce contained within the sauce container 508 so as to pressurize the same and thereby cause the same to be dispensed out from the lower end portion of the sauce container 508 through means of a nipple or suitable connector 532 which likewise passes through the lower end portion of the canister 506. Accordingly, when a suitable fluid conduit or hose, also not shown, is connected to the nipple or connector 532 by means of a quick disconnect fitting 534, the sauce from the sauce container 508 will be able to pass out from the sauce container 508 and into the fluid hose or conduit, not shown, so as to be conveyed to a dispensing valve disposed within a valve bank, as will be discussed more fully hereinafter, such that the sauce can in fact be dispensed and deposited onto a food product as will also be more fully discussed and better appreciated hereinafter.

With reference again being made to FIGS. 41 and 43, it is seen that at least one pair of level sensors are respectively employed with each canister/sauce container assembly 510 so as to provide warning signals to food preparation personnel that the volumetric amount of sauce remaining within a particular sauce container 508 has reached a predetermined level. The level sensors comprise, for example, a first light beam transmitter 536 which can, for example, send a light beam through the canister/sauce container assembly 510, and a light beam receiver 538 which is disposed diametrically opposite the light beam transmitter 536 so as to receive the light beam signal from the light beam transmitter 536 which passes through the canister/sauce container assembly 510. One or more sets of light beam transmitters 536 and receivers 538 may be utilized so as to provide food preparation personnel with different alarms or warnings as to how much sauce remains within a particular sauce container 508. For example, as shown in FIGS. 41 and 43, two pairs of light beam transmitters 536 and light beam receivers 538 are being utilized. Therefore, for example, when the level of the sauce remaining within the sauce container 508 reaches the upper pair of level sensors 536,538, an alarm or signal will be transmitted so as to warn food preparation personnel that the particular sauce container 508 will soon need to be replaced. In a similar manner, when the level of the sauce remaining within the sauce container 508 reaches the lower pair of level sensors 536,538, an alarm or signal will be transmitted so as to warn food preparation personnel that the particular sauce container 508 must be replaced in view of the fact that the volumetric amount of sauce contained within the sauce container 508 has been completely depleted and that a new or fresh sauce container 508 must replace the depleted sauce container 508. It is to be noted that the light sensing system is attuned or calibrated in such a manner that the sensor system can determine the difference between a sufficient supply of sauce remaining within the sauce container 508 and a film of sauce which may remain upon interior peripheral wall portions of the sauce container 508 as the sauce container 508 becomes depleted.

With reference now being made to FIG. 44, it is noted that the number of individual canister/sauce container assemblies 510 may be, for example, seven, however a fewer or greater number of canister/sauce container assemblies may be employed depending upon the particular needs of the particular food establishment. In addition, it is seen that two, side-by-side food product conveyors 540,542, comprising component conveyors of the overall automatic food preparation line conveyor system 700, are being utilized to convey food products along the food preparation line, although, again, depending upon the particular needs of the particular food establishment, a fewer or greater number of food product conveyors can be utilized. As has been noted hereinbefore, each one of the sauce containers 508 is adapted to be fluidically connected to a sauce dispensing valve assembly 544, which is more clearly illustrated within FIGS. 45 and 46 and which will be more fully discussed hereinafter, by means of a suitable flexible hose or conduit, not shown. The plurality of sauce dispensing valve assemblies 544 are disposed within two valve banks 546,548 wherein, for example, the first valve bank 546 may house three sauce dispensing valve assemblies 544 which are to be fluidically connected to three of the seven illustrated canister/sauce container assemblies 510, while the second valve bank 548 may house four sauce dispensing valve assemblies 544 so as to be fluidically connected to the remaining four of the seven illustrated canister/sauce container assemblies 510. First and second servo motor drives 550,552 are mounted upon three horizontally oriented, vertically spaced guide rods 554,556, and the valve banks 546,548 are respectively mounted in a dependent manner upon the servo motor drives 550,552 so that as the servo motor drives 550,552 are driven and moved along the guide rods 554,556, the valve banks 546,548 will move correspondingly.

Accordingly, if we consider the food product conveyors 540,542 to be moving in the "x" direction, and since the guide rods 554,556 extend in a direction perpendicular to the "x" direction as a result of the guide rods 554,556 extending transversely across the food product conveyors 540,542 wherein the valve banks 546,548 are disposed above the food product conveyors 540,542 as a result of being suspended from the guide rods 554,556, then the valve banks 546,548, containing the sauce dispensing valve assemblies 544, will effectively be movable in a "y" direction. Therefore, the sauce dispensing valve assemblies 544 can effectively be located at any predetermined "xy" coordinate relative to the food product conveyors 540,542, and relative to any food product located upon the food product conveyors 540,542 as a result of the movement of the food product conveyors 540,542 in the "x" direction and the movement of the valve banks 546,548 in the "y" direction. Accordingly, at any moment in time, a predetermined amount of sauce from a particular sauce dispensing valve assembly 544 of one of the valve banks 546,548 can in fact be deposited onto a particular food product at any time and at any location, and in various manners or modes, as a result of the predeterminedly timed coordination of the movement of the food product conveyors 540,542 and the valve banks 546,548. It is to be noted further that the servo drive motor 550 is mounted upon the guide rods 554 such that the first valve bank 546 is disposed above the first food product conveyor 540 so as to be moved in the "y" direction across the first food product conveyor 540, while in a similar manner, the servo drive motor 552 is mounted upon the guide rods 556 such that the second valve bank 548 is disposed above the second food product conveyor 540 so as to be moved in the "y" direction across the second food product conveyor 542. It is also to be noted that the entire operation of the automatic sauce dispensing system 500, and the various operative components thereof, are under the control of the programmable logic controller (PLC) 800.

With reference now being made to FIGS. 45 and 46, a description of one of the solenoid-controlled, pneumatically operated sauce dispensing valve assemblies 544 will now be provided. While any of many suitable valve mechanisms may of course be utilized, the sauce dispensing valve assemblies 544 comprise pinch valves type assemblies. More particularly, the valve assembly 544 comprises a housing 560 within which a key-hole shaped slot 562 is provided for permitting the particular sauce hose or conduit, not shown, to be passed therethrough whereby the distal end portion of the hose or conduit will be disposed within an adjustable C-clamp or C-clip 564. A thumb screw 566 is operatively associated with the C-clamp or C-clip 564 such that as the thumb screw 566 is rotated in one direction, the diametrical extent of the C-clamp or C-clip 564 is contracted, thereby tightly engaging the distal end portion of the sauce hose or conduit, while when the thumb screw 566 is rotated in the opposite direction, the diametrical extent of the C-clamp or C-clip 564 is expanded so as to accommodate different sized sauce hoses or conduits. In addition to the foregoing, a horizontally oriented bar 568 is disposed within the housing 560 at a position adjacent to where the sauce hose or conduit passes through the key-hole shaped slot 562 such that the lower distal end thereof is disposed within the C-clamp or C-clip 564. A pneumatic actuator, not shown, is disposed internally within an actuator housing 570, and it is seen that the actuator housing 570 is provided with a pair of pneumatic air inlet/outlet fittings 572,574 disposed at opposite ends of the actuator housing 570.

In this manner, when, for example, air is introduced into the air inlet fitting 572, the actuator, disposed internally within the actuator housing 570, will be forced to move toward the right as viewed within FIGS. 45 and 46, thereby causing a plunger or actuator head 576, fixedly mounted upon the distal end of the actuator, to be moved toward the right and into contact with the transversely oriented bar 568 so as to thereby pinch the sauce hose or conduit to a closed position, thereby terminating any dispensing of the sauce from the sauce hose or conduit. As the actuator is moved within the actuator housing 570, air disposed in front of the actuator disposed within the actuator housing 570 will of course be expelled through means of the outlet fitting 574. Conversely, when air is admitted into the air inlet fitting 574, the actuator head 576 will be retracted toward the left so as to effectively relieve the pinching of the sauce hose or conduit, thereby permitting sauce to be dispensed from the sauce dispensing valve assembly 544. While the actuator is being moved toward the left, air behind the actuator will of course be permitted to be expelled or exhausted through means of air outlet fitting 572. It is lastly noted that a coil spring 578 is disposed around the shaft of the actuator so as to normally bias the actuator, and the actuator head 576, toward the right so as to normally maintain the sauce dispensing valve assembly 544 at its closed position. This is to prevent undesirable leakage or dispensing of the sauce in the event that the control air of the pneumatic control system experiences a failure.

Lastly, with reference again being made to FIG. 44, it is seen that the automatic sauce dispensing system also includes a self-cleaning system which cleans the canisters, the conduits or hoses, and the valves disposed within the valve banks such that food preparation personnel do not have to be involved in the cleaning of the system which is automatically rendered clean at specified intervals such that the sauces being dispensed are always fresh and do not become contaminated. More particularly, for example, first and second drip trays 580,582 are disposed along the sides of the food product conveyors 540,542 and are adapted to be linearly aligned with the first and second valve banks 546,548 when the first and second valve banks 546,548 are disposed at their end-of-travel positions along their respective guide rods 554,556. In this manner, when the first and second valve banks 546,548 are not effectively being utilized such that the various dispensing valve assemblies 544 are not actually dispensing sauce onto food products, the first and second valve banks 546,548 will be respectively disposed above the first and second drip trays 580,582 such that if any residual leakage, dripping, or dropping of sauce from any one of the plurality of dispensing valve assemblies 544 mounted upon either one of the first and second valve banks 546,548 occurs, such leakage, dripping, or dropping of such sauce will be caught by means of the first and second drip trays 580,582.

Continuing further, it is also seen that the first and second drip trays 580,582 are adapted to be removably mounted atop first and second cleaning funnels or drains 584,586. As has been previously noted, the automatic sauce dispensing system 500 of the present invention automatic food preparation line 10 includes an automatic cleaning system wherein the first and second funnels or drains 584,586 are component parts of such automatic cleaning system. More particularly, when it is desired to clean the automatic sauce dispensing system 500, the first and second drip trays 580,582 are removed from the first and second cleaning funnels or drains 584,586, the pneumatic air lines are disconnected from the pneumatic air fittings 530 provided at the upper end of each canister/sauce container assembly 510, and cleaning solution tubes, hoses, conduits, or the like, not shown, are fluidically connected to such fittings 530. A cleaning solution supply CSS is generally indicated at 588 so as to contain a supply of cleaning solution which may comprise, for example, a suitable cleaning solution, a degreater or sanitizer, and heated water with enhances the degreasing or sanitizing agents within the solution, and a pump P, generally indicated by the reference character 590, is interposed fluidically between the cleaning solution supply 588 so as to pump the cleaning solution into the canister or sauce container assemblies 510 through means of the fittings 530. The cleaning solution will then flow through the cleaning solution hoses or conduits, not shown, through the sauce containers 508, and through the conduits or hoses, also not shown, fluidically connecting the canister/sauce container assemblies 510 to the valve banks 546,548, and through the valve mechanisms 544 of the valve banks 546,548 such that the cleaning solution can then exit the valve banks 546,548 and be discarded into the cleaning funnels or drains 584,586.

With reference now being made to FIGS. 47-49 thereof, a second new and improved automatic non-sauce condiment dispensing system, as constructed in accordance with the principles and teachings of the present invention, is disclosed and is generally indicated by the reference character 600. More particularly, it is seen that the new and improved automatic condiment dispensing system 600 comprises a hopper mechanism 602 within the bottom portion of which a progressive auger-type conveyor 604 is rotatably disposed. A condiment charging bin 606 is removably disposed atop the hopper mechanism 602 so as to contain a charge of condiment therein which may be discharged into the hopper mechanism 602 when a horizontally oriented panel, valve, or gate mechanism 608 is opened. The condiment charging bin 606 has a vertically downward, elongated, outwardly tapered configuration such that the largest diametrical portion of the charging bin 606 is disposed adjacent to the hopper mechanism 602. In this manner, condiments can be freely deposited into the hopper mechanism 602 and fully engaged with the auger-type conveyor 604 without encountering any vertical movement impediments. Lastly, the uppermost portion of the condiment charging bin 606 has a cover or lid 610 removably attached thereto so as to permit a fresh charge of condiment to be charged into the charging bin 606 and thereafter maintain the condiment, disposed within the charging bin 606, in a relatively fresh state as a result of the charging bin 606 not being open to the ambient atmosphere.

With reference continuing to be made to FIG. 47, it is also seen that the left or upstream end portion of the auger-type conveyor 604 is adapted to be mounted within a rotary bearing 612 provided upon the hopper mechanism 602 so as to be capable of being rotated around its longitudinal axis L by means of a suitable drive motor 614, as a result of which the auger-type conveyor 604 will move condiments, disposed within the condiment hopper mechanism 602, from the left or upstream end 616 of the hopper mechanism 602 to an oppositely disposed downstream or discharge end 618 of the hopper mechanism 602. A vertically oriented condiment chamber 620 is integrally connected to, or defined within, the discharge end 618 of the hopper mechanism 602 wherein it is appreciated that the vertically oriented condiment chamber 620 defined within the discharge end 618 of the hopper mechanism 602 effectively forms a tubular end portion which is open at its lower or bottom end portion and is adapted to hold or retain a predetermined amount or quantity of the particular condiment as a result of a horizontally oriented, movable valve or weighing gate 622 effectively closing off the open bottom end portion of the condiment chamber 620 of the hopper mechanism 602 when the horizontally oriented, movable valve or weighing gate 622 is disposed at its leftwardmost position as illustrated within FIGS. 47 and 48. More particularly, as can best be appreciated from FIG. 48, the horizontal diametrical extent of the valve or weighing gate 622 effectively bridges diametrically opposite wall portions of the discharge end 618 of the hopper mechanism 602 which define the condiment chamber 620. Examples of suitable condiments may be shredded lettuce, shredded onions, shredded cheese, and the like, although other food items can be envisioned such as, for example, cold cereals, tortilla chips, and the like.

The drive motor 614 may be a suitable, electric drive motor and is operatively connected to the auger-type conveyor 604 by means of a rotary bearing connector 624. A load cell 626 is electronically connected to the valve or weighing gate 622 so as to accurately determine the amount or quantity or weight of the condiment disposed within the condiment chamber 620 and disposed atop the valve or weighing gate 622, the load cell 626 being fixedly mounted beneath the electric drive motor housing 628. As is well-known, the load cell 626 may of course be pre-calibrated to a predetermined load or weight. Accordingly, when the load cell 626 determines that the condiment disposed within the holding chamber 620 is approaching the predetermined amount or quantity or load or weight of the condiment that is desired to be dispensed onto a food item, the load cell 626 will transmit a suitable electrical signal to a central controller or programmable logic controller (PLC) 800, as is illustrated within FIG. 47, whereby the programmable logic controller (PLC) 800 will, in turn, send a signal to the drive motor 614 so as to gradually reduce the rotational speed at which the drive motor 614 is rotating the auger conveyor 604. Subsequently, when the load cell 626 determines that the precise amount or quantity or load or weight of the condiment disposed within the condiment holding chamber 620 and disposed upon the valve or weighing gate 622 has in fact reached the desired predetermined load or weight level, the activation of the drive motor 614 will be terminated as will the rotation of the auger-type conveyor 604 such that no additional condiment is moved into the condiment holding chamber 620 and onto the valve or weighing gate 622.

In addition, as can again best be appreciated from FIG. 48, it is seen that the valve or weighing gate 622 effectively comprises a plate wherein a distal end portion 630 of the plate 622 is disposed beneath the discharge end 618 of the condiment holding chamber 620, when the valve or weighing gate 622 is disposed at its leftwardmost position, as illustrated within FIGS. 47 and 48, so as to effectively close off the discharge end 618 of the condiment holding chamber 120, however, the proximal end portion 632 of the plate 622 is fixedly secured to a horizontally oriented leg portion 634 of an L-shaped bracket 636 which is adapted to be moved in a reciprocal manner within a horizontal plane as a result of a vertically oriented leg portion 638 of the L-shaped bracket 636 being fixedly connected to a piston rod 640 of a dual-movement or dual-actuated pneumatic piston-cylinder assembly 642 as can best be seen in FIG. 47. It is also to be appreciated from FIG. 47 that the pneumatic piston-cylinder assembly 642 is fixedly mounted beneath the load cell housing 644 as can best be seen in FIG. 48, and is also electronically connected to the programmable logic controller (PLC) 800. It is lastly noted that the plate 622 also has an intermediate bent portion 646 next to which there is disposed a vertically oriented scraper 648 which is fixedly mounted to an L-shaped mounting bracket 650 which serves to mount the pneumatic piston-cylinder assembly housing 652 to the bottom wall of the load cell housing 644, and wherein it is also seen that the horizontally oriented leg portion 634 of the L-shaped bracket 636 is movable within a slot 654 of the piston-cylinder assembly housing 652. The scraper 648 may be fabricated from any suitable metal, such as, for example, stainless steel or aluminum, and is adapted to engage the intermediate bent portion 646 of the valve or weighing gate or plate 622.

It is also to be noted, however, that the scraper 648 is fixedly mounted upon a flexible mounting plate 656 which may be fabricated from, for example, a suitable rubber, neoprene, TEFLON® or polytetrafluoroethylene (PTFE), or the like. Accordingly, the scraper 648, as mounted upon the flexible mounting plate 656, is adapted to be pivoted toward the right, when the valve/weighing gate/plate 622 is caused to be moved toward the right by means of the piston rod 640 of the pneumatic piston-cylinder assembly 642 when the pneumatic piston-cylinder assembly 642 causes the entire valve/weighing gate/plate 622 to be moved toward the right when the open discharge end 618 of the hopper mechanism 602 is to be uncovered so as to permit the dispensing or deposition of the condiment from the condiment holding chamber 620 onto a food item. This movement of the piston rod 640 of the piston-cylinder assembly 642 is also under the control of the programmable logic controller (PLC) 800, and it is also to be particularly noted that due to the inherent resiliency of the flexible mounting plate 656, the scraper 648 will always be maintained in contact with the upper, surface portion 658 of the valve or weighing gate 622, throughout the entire retraction stroke of the piston 640 of the piston-cylinder assembly 642, so as to ensure that all of the condiment initially disposed upon the upper surface portion 658 of the valve or weighing gate 622 will in fact be scraped off the upper surface portion 658 of the valve or weighing gate 622, forced into the condiment holding chamber 620, and will be permitted to be deposited onto the food item disposed at the condiment dispensing station.

It is also noted, as can best be appreciated from FIG. 49, that an all-encompassing condiment dispensing system of the present invention can include a plurality of condiment dispensing systems 600 under the control of a central programmable logic controller (PLC) 800 which is not only adapted to be electronically connected to individual condiment dispensing systems 600 which may be located at predetermined condiment dispensing stations located at predetermined locations along a food preparation line so as to control the various operations of the various different mechanisms at a particular one of the condiment dispensing stations, such as, for example, the operation of the auger conveyor 604, the processing of signals from the load cell 626 so as to, in turn, control the valve or weighing gate 622 as a result of activating the rotary drive motor 120 and the piston-cylinder assembly 642, but in addition, the central programmable logic controller (PLC) 800 is also adapted to be electronically connected to the plurality of condiment dispensing systems 600 which may be located at a multitude of condiment dispensing stations located at a multitude of predetermined locations along the automatic food preparation line 10 so that the various different condiment dispensing systems 600 can in fact dispense various different condiments or combinations of condiments onto the food items as order at the original point-of-sale (POS) patron order location 900. It is therefore to be appreciated further that not only does the central programmable logic controller (PLC) 800 control each condiment dispensing system 600 located at each condiment dispensing station, but in addition, the central programmable logic controller (PLC) 800 controls the conveyance of a food item to a particular food preparation station or between the multitude of food preparation stations along the automatic food preparation line 10 such that food items are properly prepared in accordance with a patron's food order. This arrangement of multiple stations can of course be implemented for other operations as may be desired or required.

For example, let's examine how a hamburger may be prepared to order. The food preparation line 10 would therefore include, for example, multiple food preparation stations in order to complete the hamburger preparation operation, such as, for example, the hamburger bun handling station 100, the bun toaster station 200, the box packaging station 300, the wrapping paper packaging station 400, the sauce dispensing station 500, and one or more condiment dispensing stations 600. Considering such a hamburger preparation procedure further, let's assume that a particular food patron has ordered his or her hamburger with shredded lettuce and shredded cheese but no shredded onions. Therefore, after the hamburger bun has been toasted, and after the hamburger has been properly grilled to either be rare, medium rare, medium, medium-well, or well-done, then in accordance with the food patron's preference, the central programmable logic controller (PLC) 800 advances the conveyor system 700 carrying the hamburger bun to the first condiment dispensing station 500 which comprises a plurality of different sauces to be applied to the hamburger bun. However, this particular patron has elected not to have any sauces dispensed onto the hamburger bun.

Accordingly, the conveyor system 700 conveys the hamburger bun to a first one of a plurality of condiment dispensing stations 600 which may be, for example, a shredded lettuce condiment dispensing station. A predetermined amount of shredded lettuce will be deposited onto the hamburger bun. After the deposition of the shredded lettuce onto the hamburger bun, the programmable logic computer (PLC) 800 will advance the conveyor system of the food preparation line 10 to the second condiment dispensing station 600, however, the second condiment dispensing station 600 may be, for example, a shredded cheese condiment dispensing station, but in accordance with the patron's food order, the patron does not want shredded cheese on his or her hamburger bun. This data or information will have been programmed into the overall food preparation system when the patron initially placed his or her order. Accordingly, the programmable logic controller (PLC) 800 will effectively know to bypass this second condiment dispensing station 600 and will move the conveyor system 700 further along the food preparation line 10 such that the hamburger bun is now located at a third condiment dispensing station 600 which is a shredded onion dispensing station. In this manner, food items may be prepared freshly, quickly, and accurately in accordance with multiple food orders ordered by multiple food patrons.

It is also noted in accordance with additional teachings and principles of the present invention that a particular condiment dispensing station may effectively comprise a condiment dispensing station wherein such condiment dispensing station will dispense a combination of condiments. For example, data may be derived from hundreds or thousands of patron orders that patrons often desire shredded cheese and shredded lettuce to be deposited onto their hamburgers. Therefore, a particular condiment dispensing station will have its hopper mechanism charged with a mixture of shredded cheese and shredded lettuce. In this manner, not only does the patron obtain his or her desired hamburger with the specified condiments, but the operational speed is enhanced since the food preparation conveyor need only be halted at a single condiment dispensing station in lieu of multiple condiment dispensing stations. In addition, while a particularly configured condiment charging bin has been disclosed, other condiment charging bins, having different configurations or sizes, are possible. Still further, thermal devices may be employed in connection with the condiment charging bins so as to maintain the condiments relatively hot or relatively cold, depending upon the particular condiment.

Still yet further, while it has been noted that each canister/sauce container assembly has been fluidically connected to a single dispensing valve assembly through means of its dedicated fluid hose or conduit, more than one fluid hose or conduit may be connected to a particular dispensing valve assembly so that the volumetric output of that particular dispensing valve assembly may be increased as may be desired. In a similar manner, while it has been noted that each canister or sauce container assembly will contain a particular sauce or condiment such as, for example, mustard, ketchup, or the like, two hoses or conduits, carrying different sauces, may likewise effectively be fluidically connected together at a particular dispensing valve assembly such that a combination of sauces is simultaneously dispensed onto a particular bun. In addition, the sauce containers can be pre-heated or pre-cooled. In this manner, for example, if cheese is to be deposited onto nacho food products, patrons may prefer that the cheese be warmed or heated to above ambient or room temperature.

It is also to be appreciated that the cabinets comprise various doors which can be opened whereupon food preparation personnel can extract an exhausted or depleted bun storage tube and can be manually refilled or replaced by means of a new or fresh bun storage tube such that the plurality of bun storage tubes are always properly stocked in order to permit the system to be operated in a continuous manner without any operational downtime. Still yet further, it is to be noted that the various surfaces of the system components, such as, for example, the interior surface portions of the bun storage tubes, and/or the internal surface portions of the housing sections of the bun separator assembly, can be provided with non-stick surface coatings so as to prevent any of the bun segments from sticking or adhering to such surfaces.

With reference now being made to FIGS. 50-52, still further modifications or embodiments are possible in accordance with the basic principles and teachings of the present invention. For example, a particular food establishment may have to contend with predetermined spatial constraints, or, for example, financial constraints, whereby, for one reason or another, the entire automatic food preparation line 10 as illustrated within FIG. 1, cannot be erected and utilized within the particular establishment. For these reasons, abbreviated, shortened, or partial automatic food preparation lines can nevertheless be erected and utilized within a particular food establishment as a result of making each one of the primary components of the automatic food preparation line 10, that is, the bun handling system 100, the toaster appliance 200, the box packaging system 300, the wrapping paper packaging system 400, the sauce dispensing system 500, the condiment dispensing system 600, and the conveyor system 700, as modular components which can be used solely or in conjunction with other modular components. So, for example, as illustrated within FIG. 50, there is shown a modular or compact automatic bun handling system 100' being utilized in conjunction with a modular or compact automatic toaster appliance 200', a modular or compact automatic conveyor system 700', and a modular or compact automatic sauce dispensing system 500', which includes the valve banks 548', which will receive the buns 108 conveyed thereto by means of the automatic conveyor system 700'. Alternatively, for example, as illustrated within FIG. 51, a manually operated toaster appliance may be utilized with a modular or compact automatic sauce dispensing system 500'. Lastly, as illustrated within FIG. 52, a modular or compact automatic bun handling system 100' may be utilized with a modular or compact automatic toaster appliance 200'.

Obviously, many other variations and modifications of the present invention are possible in light of the above teachings. It is therefore to be understood that within the scope of the appended claims, the present invention may be practiced otherwise than as specifically described herein.

What is claimed as new and desired to be protected by Letters Patent, is:

1. An automatic food preparation line for preparing bread products for hamburgers and sandwiches, comprising:
    a user interface for inputting various different selections by a patron concerning how a bread product for a food item is to be prepared;
    an automatic bread product handling system comprising a vertically oriented endless conveyor carousel rotatable around a horizontally oriented axis and upon which a plurality of horizontally oriented bread product storage tubes are mounted for storing a plurality of different types of bread products, and a dispensing assembly for automatically dispensing a particularly selected bread product, from said plurality of different types of bread products, stored within a particular one of said plurality of horizontally oriented bread product storage tubes in a horizontally oriented direction and in accordance with the selections inputted by the patron using said user interface;
    an automatic condiment dispensing system, comprising a plurality of different condiments, for automatically dispensing one or more condiments onto the bread product in accordance with the selections inputted by the patron using said user interface;
    an automatic conveyor system for conveying the bread products from said automatic bread product handling system to said automatic condiment dispensing system, and from said automatic condiment dispensing system to a downstream food preparation station at which a food item is disposed atop the bread product; and
    a computer control system for controlling all automatic operations of said automatic bread product handling system, said automatic condiment dispensing system, and said automatic conveyor system.

2. The automatic food preparation line as set forth in claim 1, wherein said dispensing assembly comprises:
    a pusher block disposed within each one of said plurality of horizontally oriented bread product storage tubes; and
    a motor drive for incrementally advancing said pusher block within a particular one of said horizontally oriented bread product storage tubes so as to dispense a particular one of said selected bread products from a selected one of said plurality of horizontally oriented bread product storage tubes.

3. The automatic food preparation line as set forth in claim 2, wherein:
    said plurality of bread product storage tubes are disposed upon said vertically oriented endless conveyor carousel such that a particular one of said plurality of bread product storage tubes is moved to a predetermined bread product discharge location defined upon said vertically oriented endless conveyor carousel.

4. The automatic food preparation line as set forth in claim 2, wherein:
    said motor drive comprises a stepper motor.

5. The automatic food preparation line as set forth in claim 1, wherein:
    said automatic bread product handling system comprises a bread product separator comprising a housing having at least two housing sections for respectively accommodating heel and crown segments of a bun-type bread product.

6. The automatic food preparation line as set forth in claim 1, wherein:
    said automatic bread product handling system comprises a bread product separator housing comprising three housing sections for respectively accommodating heel, intermediate club, and crown segments of a bun-type bread product.

7. The automatic food preparation line as set forth in claim 1, further comprising:
an automatic toaster appliance operatively connected to said automatic bread product handling system for automatically toasting bread products automatically dispensed by said automatic bread product handling system and for automatically discharging the toasted bread products from said automatic toaster appliance when the bread products have been properly toasted.

8. The automatic food preparation line as set forth in claim 1, further comprising:
an automatic package dispensing system for automatically dispensing a particular package within which the bread products dispensed by said bread product handling system can be disposed.

9. The automatic food preparation line as set forth in claim 8, wherein:
said automatic package dispensing system comprises a box packaging system comprising a plurality of vertically oriented stacks of box packages to be dispensed depending upon the type of packaging required for the particular food item selected by the patron inputting the patron's selections into said user interface.

10. The automatic food preparation line as set forth in claim 9, further comprising:
a vacuum suction cup assembly for extracting an uppermost box package from one of said plurality of vertically oriented stacks of box packages.

11. The automatic food preparation line as set forth in claim 8, wherein:
said automatic package dispensing system comprises a wrapping paper packaging system comprising a vertical array of trays within which various different types of wrapping paper packaging are stored so as to be dispensed depending upon the type of packaging required for the particular food item selected by the patron inputting the patron's selections into said user interface.

12. The automatic food preparation line as set forth in claim 11, further comprising:
a vacuum suction cup assembly for extracting an uppermost sheet of wrapping paper packaging from a stack of wrapping paper packaging from one of said plurality of vertically oriented trays of wrapping paper packaging.

13. The automatic food preparation line as set forth in claim 1, further comprising:
an automatic condiment dispensing system for automatically dispensing at least one type of condiment onto a bread product in accordance with a selection inputted by the patron using said user interface.

14. The automatic food preparation line as set forth in claim 13, wherein:
said automatic condiment dispensing system comprises a first automatic condiment dispensing system for dispensing at least one of a plurality of different sauces onto the bread product in accordance with the selections inputted by the patron using said user interface and comprises a plurality of different sauce containers for containing said plurality of different sauces, a plurality of sauce dispensing valves for dispensing one or more of said plurality of different sauces from said plurality of different sauce containers onto a bun, and a plurality of fluid conduits fluidically connecting said plurality of sauce containers to said plurality of sauce dispensing valves.

15. The automatic food preparation line as set forth in claim 14, wherein:
wherein said plurality of sauce dispensing valves are mounted upon sauce dispensing valve banks which are movable in XY directions relative to said automatic conveyor system so as to precisely locate a particular one of said plurality of sauce dispensing valves above a bread product disposed upon said automatic conveyor system.

16. The automatic food preparation line as set forth in claim 14, wherein:
said plurality of sauces are selected from the group comprising mustard, ketchup, mayonnaise, and melted cheese.

17. The automatic food preparation line as set forth in claim 1, wherein:
said automatic condiment dispensing system comprises a second condiment dispensing system for dispensing at least one of a plurality of different non-sauce condiments onto the bread product in accordance with the selections inputted by the patron using said user interface.

18. The automatic food preparation line as set forth in claim 17, wherein:
said plurality of different non-sauce condiments are selected from the group comprising shredded lettuce, shredded onions, shredded cheese, and shredded onions.

* * * * *